(12) United States Patent  
Kume et al.

(10) Patent No.: US 7,697,099 B2  
(45) Date of Patent: Apr. 13, 2010

(54) LIQUID CRYSTAL DISPLAY DEVICE AND FABRICATION METHOD THEREOF

(75) Inventors: Yasuhiro Kume, Kawachinagano (JP); Noriaki Onishi, Nara (JP); Kazuhiko Tamai, Nabari (JP); Nobukazu Nagae, Tenri (JP); Hiroaki Kojima, Kashiba (JP); Takashi Kurihara, Ikoma (JP); Nobuaki Yamada, Higashiosaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 158 days.

(21) Appl. No.: 10/980,867

(22) Filed: Nov. 4, 2004

(65) Prior Publication Data

US 2005/0117108 A1    Jun. 2, 2005

(30) Foreign Application Priority Data

Nov. 7, 2003   (JP) ............................ 2003-379078  
Dec. 3, 2003   (JP) ............................ 2003-405225  
Mar. 18, 2004  (JP) ............................ 2004-077503

(51) Int. Cl.  
*G02F 1/1333* (2006.01)  
*G02F 1/1339* (2006.01)

(52) U.S. Cl. ..................... 349/138; 349/110; 349/156

(58) Field of Classification Search ................. 349/139, 349/129–130, 155–156, 110, 138  
See application file for complete search history.

(56) References Cited

U.S. PATENT DOCUMENTS

| | | | |
|---|---|---|---|
| 5,408,345 A | 4/1995 | Mitsui et al. ................. 349/113 |
| 5,666,179 A | 9/1997 | Koma ........................... 349/143 |
| 6,072,557 A * | 6/2000 | Kishimoto .................... 349/156 |
| 6,195,140 B1 | 2/2001 | Kubo et al. ................... 349/114 |
| 6,323,921 B1 * | 11/2001 | Kurauchi et al. ............. 349/106 |
| 6,335,780 B1 | 1/2002 | Kurihara et al. ............. 349/156 |
| 6,339,460 B1 | 1/2002 | Saitoh |
| 6,384,889 B1 | 5/2002 | Miyachi et al. ............. 349/143 |
| 6,433,852 B1 | 8/2002 | Sonoda et al. .............. 349/156 |
| 6,452,654 B2 | 9/2002 | Kubo et al. .................. 349/114 |

(Continued)

FOREIGN PATENT DOCUMENTS

JP          9-90426         4/1997

(Continued)

OTHER PUBLICATIONS

U.S. Appl. No. 10/952,480, filed Sep. 29, 2004.

*Primary Examiner*—Dung T. Nguyen  
(74) *Attorney, Agent, or Firm*—Nixon & Vanderhye P.C.

(57) ABSTRACT

A liquid crystal display device including a first substrate 110a, a second substrate 110b placed to face the first substrate, a liquid crystal layer 120 interposed between the first and second substrates, a first electrode 111 formed on the first substrate, a second electrode 131 formed on the second substrate, an interlayer insulating film 115a placed between the first electrode and the first substrate, and a wall structure 115b formed integrally with the interlayer insulating film. The liquid crystal display device has a plurality of pixels each including the first electrode, the second electrode and the liquid crystal layer interposed between the first and second electrodes. A shading region surrounds each of the plurality of pixels, and the wall structure is placed regularly in the shading region. A groove structure 415a may be formed in place of the wall structure.

31 Claims, 20 Drawing Sheets

U.S. PATENT DOCUMENTS

| | | |
|---|---|---|
| 6,466,296 B1 | 10/2002 | Yamada et al. .............. 349/160 |
| 6,583,836 B2 * | 6/2003 | Kim et al. ................... 349/129 |
| 6,661,488 B1 | 12/2003 | Takeda et al. |
| 6,753,939 B2 | 6/2004 | Jisaki et al. ................. 349/114 |
| 6,788,375 B2 | 9/2004 | Ogishima et al. ........... 349/130 |
| 6,850,299 B2 | 2/2005 | Tanaka et al. ............... 349/114 |
| 6,864,945 B2 * | 3/2005 | Fujimori et al. ............. 349/156 |
| 6,908,796 B2 * | 6/2005 | Furusawa ................... 438/149 |
| 7,256,872 B2 * | 8/2007 | Wu et al. ..................... 355/77 |
| 2002/0075441 A1 | 6/2002 | Fujimori et al. |
| 2005/0007533 A1 * | 1/2005 | Tanaka et al. ............... 349/139 |

FOREIGN PATENT DOCUMENTS

| | | |
|---|---|---|
| JP | 2000-075302 | 3/2000 |
| JP | 2003-186023 | 7/2003 |
| JP | 2003-255372 A | 9/2003 |
| KR | 2003-058012 A | 7/2003 |
| WO | WO03/029891 A1 * | 4/2003 |

* cited by examiner

During Non-voltage Application

During Voltage Application

During Non-voltage Application

During Voltage Application

LIQUID CRYSTAL DISPLAY DEVICE AND FABRICATION METHOD THEREOF

BACKGROUND OF THE INVENTION

The present invention relates to a liquid crystal display device, and more particularly, to a liquid crystal display device suitably used for portable information terminals (for example, PDAs), mobile phones, car-mounted liquid crystal displays, digital cameras, PCs, amusement equipment, TVs and the like.

In recent years, liquid crystal display (LCD) devices have found widespread use for notebook PCs, mobile phones, information equipment such as electronic personal organizers, LC monitor-equipped camera built-in VTRs and the like, thank to their features of being thin and consuming low power.

A vertical alignment mode using a vertically aligned liquid crystal layer has increasingly received attention as a display mode permitting high contrast and a wide viewing angle. A vertically aligned liquid crystal layer is generally obtained using a vertical alignment film and a liquid crystal material having negative dielectric anisotropy.

For example, Japanese Laid-Open Patent Publication No. 6-301036 (Literature 1) discloses an LCD device in which a tilt electric field is generated around an opening formed in a counter electrode that faces a pixel electrode via a liquid crystal layer, so that liquid crystal molecules surrounding liquid crystal molecules existing in the opening, which are in the vertically aligned state, are aligned in tilt directions around the opening as the center, to thereby improve the visual angle characteristics.

However, in the device described in Literature 1, it is difficult to generate a tilt electric field over the entire region of each pixel. Therefore, each pixel has a region in which liquid crystal molecules delay in response to a voltage, and this causes a problem of occurrence of an afterimage phenomenon.

To solve the above problem, Japanese Laid-Open Patent Publication No. 2000-47217 (Literature 2) discloses an LCD device in which openings are provided regularly in a pixel electrode or a counter electrode, to form a plurality of liquid crystal domains each having radially tilt alignment in each pixel.

Japanese Laid-Open Patent Publication No. 2003-167253 (Literature 3) discloses a technique in which a plurality of projections are provided regularly in each pixel to stabilize the aligned state of liquid crystal domains having radially tilt alignment formed around the projections. This literature also discloses using a tilt electric field generated at openings formed in an electrode, together with the alignment regulating force of the projections, to regulate the alignment of liquid crystal molecules, and thus improve the display characteristics.

Japanese Laid-Open Patent Publication No. 2000-98393 (Literature 4) discloses a technology on an LCD device in which a groove structure is provided inside each pixel (at least inside a region to which a voltage for display is applied) to form axisymmetrically aligned domains in the regions of the pixel divided with the groove structure using the alignment regulating force of the side faces of the groove structure. When this technology is applied to a plasma-address LCD device, in which a voltage will be easily applied across this thick portion of the liquid crystal layer having the groove structure, lowering in drive voltage and improvement in response speed can be attained.

In recent years, a type of LCD device permitting high-quality display both outdoors and indoors has been proposed (see Japanese Patent Gazette No. 2955277 (Literature 5) and U.S. Pat. No. 6,195,140 (Literature 6), for example). In this type of LCD device, called a transflective (transflective) LCD device, each pixel has a reflection region in which display is done in the reflection mode and a transmission region in which display is done in the transmission mode.

The currently available transflective LCD devices adopt an ECB mode, a TN mode and the like. Literature 3 described above discloses adoption of the vertical alignment mode for a transflective LCD device, not only for a transmissive LCD device. Japanese Laid-Open Patent Publication No. 2002-350853 (Literature 7) discloses a technique in which in a transflective LCD device having a vertically aligned liquid crystal layer, the alignment (multi-axis alignment) of liquid crystal molecules is controlled with depressions formed on an insulating layer that is provided to double the thickness of the liquid crystal layer in a transmission region compared with that in a reflection region. This literature discloses that the depressions are in the shape of a regular octagon, for example, and projections or slits (electrode openings) are formed at positions opposing the depressions via the liquid crystal layer (see FIGS. 3 and 16 of Literature 7, for example).

To improve the display quality in the reflection mode, a technique of forming a diffuse reflection layer excellent in diffuse reflection characteristics has been examined. For example, Japanese Laid-Open Patent Publication No. 6-75238 (Literature 8) discloses a technique in which fine projections and depressions are formed randomly on the surface of a reflection electrode in a photolithography step using a two-layer photosensitive resin film to thereby obtain good diffuse reflection characteristics. Japanese Laid-Open Patent Publication No. 9-90426 (Literature 9) discloses a technique in which a reflection electrode having fine projections and depressions is formed by exposing a one-layer photosensitive resin film to light via a photomask for formation of contact holes and fine projections and depressions and developing the resin, for simplification of the fabrication process.

The technologies disclosed in Literature 2 and 3 have the following problems. In these technologies, projections or openings are provided in each pixel to form a plurality of liquid crystal domains in the pixel (that is, divide the pixel into domains), to thereby strengthen the alignment regulating force on liquid crystal molecules. According to examinations conducted by the inventors of the present invention, however, to obtain-sufficient alignment regulating force, the alignment regulating structure such as projections and openings must be placed on both sides of a liquid crystal layer (on the surfaces of a pair of opposing substrates facing the liquid crystal layer), and this complicates the fabrication process. The effective aperture ratio of each pixel having such an alignment regulating structure inside the pixel may decrease, and also the contrast ratio may decrease due to light leakage occurring in the peripheries of the projections in the pixel. The decrease of the effective aperture ratio and/or the decrease of the contrast ratio will become further eminent when the alignment regulating structure is provided on both substrates because the substrate alignment margin must be taken into consideration.

The technology disclosed in Literature 4, in which the groove structure is formed inside each pixel (at least inside a region to which a voltage for display is applied), has the problems that light leakage occurs near the inclined faces of the groove structure during non-voltage application, decreasing the contrast ratio, and that the effective aperture ratio decreases.

In the technology disclosed in Literature 7, it is necessary to provide projections or electrode openings at positions opposite to the depressions formed for control of the multi-axis alignment. This technology therefore has the same problems as those described above.

The fabrication process will be complicated if the methods disclosed in Literature 8 and 9 are employed to form reflection electrodes to improve the display quality in the reflection mode of a transflective LCD device, for example. That is, it is necessary to form fine projections and depressions for improving the diffuse reflection characteristics, in addition to the projections for alignment regulation, and this increases the cost of the LCD device.

SUMMARY OF THE INVENTION

In view of the above, an object of the present invention is providing a liquid crystal display device in which the alignment of liquid crystal molecules can be stabilized sufficiently with a comparatively simple construction having a wall structure or a groove structure for alignment control only on one substrate and the fabrication process is simple compared with the conventional ones. Another object of the present invention is providing a fabrication method for such a liquid crystal display device.

The liquid crystal display device of the present invention includes a first substrate, a second substrate placed to face the first substrate, a liquid crystal layer interposed between the first substrate and the second substrate, a first electrode formed on the first substrate, a second electrode formed on the second substrate, an interlayer insulating film placed between the first electrode and the first substrate, and a wall structure formed integrally with the interlayer insulating film, wherein the liquid crystal display device has a plurality of pixels each including the first electrode, the second electrode and the liquid crystal layer interposed between the first electrode and the second electrode, a shading region is provided to surround each of the plurality of pixels, and the wall structure is placed regularly in the shading region.

In one embodiment, the liquid crystal display device further includes a plurality of switching elements formed on the first substrate, each of the switching elements being electrically connected to the first electrode, wherein at least part of each of the switching elements is covered with the interlayer insulating film.

In another embodiment, the first electrode included in each of the plurality of pixels includes a transparent electrode and a reflective electrode.

In yet another embodiment, the wall structure has an inclined side face, and the first electrode extends up to on the side face.

In yet another embodiment, the liquid crystal layer is a vertically aligned liquid crystal layer, and when at least a predetermined voltage is applied, at least one liquid crystal domain including liquid crystal molecules aligned in different directions is formed in the liquid crystal layer of each pixel.

In yet another embodiment, the first electrode and/or the second electrode of each pixel have a plurality of openings and/or cuts formed at predetermined positions.

In yet another embodiment, the first electrode and/or the second electrode of each pixel have at least two openings and at least one cut formed at predetermined positions.

In yet another embodiment, the plurality of openings and/or cuts are formed in only the first electrode.

In yet another embodiment, the liquid crystal layer is a vertically aligned liquid crystal layer, at least two liquid crystal domains each having axisymmetric alignment are formed in the liquid crystal layer of each pixel when at least a predetermined voltage is applied, and the center axes of the axisymmetric alignment of the at least two liquid crystal domains are formed in or near the plurality of openings.

In yet another embodiment, the wall structure has walls isolated from each other with a wall gap.

In yet another embodiment, the length of the wall gap existing along the circumference of one pixel is 40% or less of the length of the circumference of the pixel.

In yet another embodiment, supports for defining the thickness of the liquid crystal layer are placed regularly in the shading region.

In yet another embodiment, the wall structure has walls isolated from each other with wall gaps, and the supports are placed in the wall gaps.

In yet another embodiment, a placement density D defined by WL×N/PL, where WL ($\mu$m) is the diameter of the supports, N (pcs.) is the number of supports placed per regular unit (0.12 mm$^2$), and PL ($\mu$m) is the pitch of the plurality of pixels in the longitudinal direction, satisfies the relationship $0.01 \leq D \leq 0.3$.

In yet another embodiment, the liquid crystal layer is a vertically aligned liquid crystal layer, and at least when a predetermined voltage is applied, at least one liquid crystal domain having axisymmetric alignment is formed in the liquid crystal layer of each pixel, and the wall structure has an inclined side face, and the cross section of the wall structure and the interlayer insulating film in the plane vertical to the first substrate gives a continuous shape having its bottom in a region in which the center axis of axisymmetric alignment of the at least one liquid crystal domain is formed.

In yet another embodiment, the wall structure has an inclined side face, and the tilt angle of the inclined side face with respect to the surface of the first substrate is 45° or less.

In yet another embodiment, the liquid crystal display device further includes: a pair of polarizing plates placed to face each other via the first substrate and the second substrate; and at least one biaxial optical anisotropic medium layer placed between the first substrate and/or the second substrate and the pair of polarizing plates.

In yet another embodiment, the liquid crystal display device further includes: a pair of polarizing plates placed to face each other via the first substrate and the second substrate; and at least one uniaxial optical anisotropic medium layer placed between the first substrate and one of the pair of polarizing plates and/or between the second substrate and the other polarizing plate.

The fabrication method for a liquid crystal display device of the present invention is a fabrication method for a liquid crystal display device including a first substrate, a second substrate placed to face the first substrate, a liquid crystal layer interposed between the first substrate and the second substrate, a first electrode formed on the first substrate, circuit elements each electrically connected to the first electrode, a second electrode formed on the second substrate, an interlayer insulating film placed between the first electrode and the first substrate, and a wall structure formed integrally with the interlayer insulating film, the liquid crystal display device having a plurality of pixels each including the first electrode, the second electrode and the liquid crystal layer interposed between the first electrode and the second electrode, a shading region being provided to surround each of the plurality of pixels, the wall structure being placed regularly in the shading region. The method includes the steps of: forming the circuit elements on the first substrate; forming a positive photosensitive resin film covering the circuit elements; exposing the photosensitive resin film to light to form predetermined regions having different exposures; forming the interlayer insulating film having contact holes each exposing part of the circuit element, integrally with the wall structure, by developing the light-exposed photosensitive resin film; and forming the first electrode on the interlayer insulating film.

In one embodiment, the step of forming the interlayer insulating film includes the step of forming a first region having a substantially flat surface and a second region having an uneven surface, and the step of forming the first electrode includes the steps of: forming a transparent electrode on the interlayer insulating film in the first region; and forming a reflective electrode on the interlayer insulating film in the second region.

In another embodiment, the step of exposing the photosensitive resin film to light includes: a first exposure step of forming a region to become the wall structure and the remaining region using a first photomask; and a second exposure step of forming the first region and the second region in the remaining region using a second photomask.

In yet another embodiment, the step of forming the first electrode and/or the second electrode includes the steps of forming a conductive film and patterning the conductive film, and the step of patterning the conductive film includes the step of forming a plurality of openings and/or cuts at predetermined positions of the first electrode and/or the second electrode.

The liquid crystal display device of the present invention described above has a wall structure formed on the surface of the first substrate facing the liquid crystal layer, on which the first electrode (for example, a pixel electrode) is formed. The wall structure is formed integrally with the interlayer insulating film that is provided between the first substrate and the first electrode. An inclined side face of the wall structure exerts anchoring action (alignment regulating force) to define the directions in which liquid crystal molecules tilt with an electric field. As a result, at least when a predetermined voltage (voltage equal to or more than a threshold value) is applied, at least one liquid crystal domain including liquid crystal molecules having different alignment directions is formed stably in the region substantially surrounded with the wall structure. Thus, the alignment of liquid crystal molecules can be sufficiently stabilized, and display quality as high as or higher than the conventional ones can be obtained with the construction simpler than the conventional ones. Moreover, since the wall structure is formed integrally with the interlayer insulating film, the liquid crystal display device can be fabricated in a process simpler than the conventional ones.

An opening and/or a cut may be provided in the first electrode and/or the second electrode in each pixel. With such an opening and cut, the alignment of liquid crystal molecules can be further stabilized under the influence of a tilt electric field generated around the opening and the cut. A vertically aligned liquid crystal layer can be suitably used as the liquid crystal layer, which can form stable axisymmetrically aligned domains with the existence of the wall structure (and an opening and/or a cut). At least one liquid crystal domain may be formed in each pixel. Depending on the size and shape of the pixel, however, two or more liquid crystal domains may be formed. For a typical rectangular pixel, formation of two or more liquid crystal domains is preferred.

The opening has an effect of fixing/stabilizing the position of the center axis of an axisymmetrically aligned domain. The opening may be formed in either the first electrode or second electrodes, but the effect of fixing/stabilizing the position of the center axis can be enhanced by forming an opening in both the first and second electrodes. These openings formed in the first and second electrodes preferably roughly overlap each other when viewed from the normal to the substrate. The cut is preferably formed only in the first electrode. Unlike the structural alignment regulating means such as the wall structure and a projection, the opening and the cut can be formed in an electrode during the step of patterning the electrode, and thus no additional fabrication step is required. According to the present invention, stable axisymmetrically aligned domains can be formed without the necessity of providing the alignment regulating structure such as the wall structure and a projection on the second substrate.

Alternatively, the liquid crystal display device of the present invention includes a first substrate, a second substrate placed to face the first substrate, a liquid crystal layer interposed between the first substrate and the second substrate, a first electrode formed on the first substrate, a second electrode formed on the second substrate, and an interlayer insulating film placed between the first electrode and the first substrate, the interlayer insulating film having a groove structure, wherein the liquid crystal display device has a plurality of pixels each including the first electrode, the second electrode and the liquid crystal layer interposed between the first electrode and the second electrode, a shading region is provided to surround each of the plurality of pixels, and the groove structure is formed regularly at least in the shading region.

In one embodiment, the liquid crystal display device further includes a plurality of switching elements formed on the first substrate, each of the switching elements being electrically connected to the first electrode, wherein at least part of each of the switching elements is covered with the interlayer insulating film.

In another embodiment, the liquid crystal layer is a vertically aligned liquid crystal layer, and at least when a predetermined voltage is applied, at least one liquid crystal domain including liquid crystal molecules aligned in different directions is formed in the liquid crystal layer of each pixel.

In yet another embodiment, the first electrode and/or the second electrode of each pixel have a plurality of openings and/or cuts formed at predetermined positions.

In yet another embodiment, the first electrode and/or the second electrode of each pixel have at least two openings and at least one cut formed at predetermined positions.

In yet another embodiment, the plurality of openings and/or cuts are formed in only the first electrode.

In yet another embodiment, the liquid crystal layer is a vertically aligned liquid crystal layer, at least two liquid crystal domains each having axisymmetric alignment are formed in the liquid crystal layer of each pixel at least when a predetermined voltage is applied, and the center axes of the axisymmetric alignment of the at least two liquid crystal domains are formed in or near the plurality of openings.

In yet another embodiment, the liquid crystal layer is a vertically aligned liquid crystal layer, at least two liquid crystal domains each having axisymmetric alignment are formed in the liquid crystal layer of each pixel at least when a predetermined voltage is applied, and the groove structure is also formed along the boundary between a pair of adjacent liquid crystal domains among the at least two liquid crystal domains.

In yet another embodiment, an additional shading region is formed in each of the plurality of pixels, and the groove structure formed along the boundary is in the additional shading region.

In yet another embodiment, the first electrode in each of the plurality of pixels includes a transparent electrode defining a transmission region and a reflective electrode defining a reflection region.

In yet another embodiment, the groove structure is also formed along the boundary between the transmission region and the reflection region.

In yet another embodiment, the liquid crystal display device further includes: a pair of polarizing plates placed to face each other via the first substrate and the second substrate; and at least one biaxial optical anisotropic medium layer placed between the first substrate and one of the pair of polarizing plates and/or between the second substrate and the other polarizing plate.

In yet another embodiment, the liquid crystal display device further includes: a pair of polarizing plates placed to face each other via the first substrate and the second substrate; and at least one uniaxial optical anisotropic medium layer placed between the first substrate and one of the pair of polarizing plates and/or between the second substrate and the other polarizing plate.

The fabrication method for a liquid crystal display device of the present invention is a fabrication method for a liquid crystal display device including a first substrate, a second substrate placed to face the first substrate, a liquid crystal layer interposed between the first substrate and the second substrate, a first electrode formed on the first substrate, circuit elements each electrically connected to the first electrode, a second electrode formed on the second substrate, and an interlayer insulating film placed between the first electrode and the first substrate, the interlayer insulating film having a groove structure, the liquid crystal display device having a plurality of pixels each including the first electrode, the second electrode and the liquid crystal layer interposed between the first electrode and the second electrode, a shading region being provided to surround each of the plurality of pixels, the groove structure being placed regularly at least in the shading region. The method includes the steps of: forming the circuit elements on the first substrate; forming a positive photosensitive resin film covering the circuit elements; exposing the photosensitive resin film to light to form predetermined regions having different exposures; forming the interlayer insulating film having contact holes each exposing part of the circuit element and also having the groove structure by developing the light-exposed photosensitive resin film; and forming the first electrode on the interlayer insulating film.

In one embodiment, the step of forming the interlayer insulating film includes the step of forming a first region having a substantially flat surface and a second region having an uneven surface, and the step of forming the first electrode includes the steps of: forming a transparent electrode on the interlayer insulating film in the first region; and forming a reflective electrode on the interlayer insulating film in the second region.

In another embodiment, the step of exposing the photosensitive resin film to light includes: a first exposure step of forming the second region, a region to become the groove structure and the remaining region using a first photomask; and a second exposure step of forming the first region and the contact hole in the remaining region using a second photomask.

In yet another embodiment, the step of forming the first electrode and/or the second electrode includes the steps of forming a conductive film and patterning the conductive film, and the step of patterning the conductive film includes the step of forming a plurality of openings and/or cuts at predetermined positions of the first electrode and/or the second electrode.

The liquid crystal display device of the present invention described above has a groove structure formed on the surface of the first substrate facing the liquid crystal layer, on which the first electrode (for example, a pixel electrode) is formed. The groove structure is formed on the interlayer insulating film that is provided between the first substrate and the first electrode, to be located at least in a shading region surrounding each pixel. An inclined side face of the groove structure exerts anchoring action (alignment regulating force) to define the directions in which liquid crystal molecules tilt with an electric field. As a result, at least when a predetermined voltage (voltage equal to or more than a threshold value) is applied, at least one liquid crystal domain including liquid crystal molecules having different alignment directions is formed stably in the region substantially surrounded with the groove structure. Thus, the alignment of liquid crystal molecules can be sufficiently stabilized, and display quality as high as or higher than the conventional ones can be obtained with the construction simpler than the conventional ones. Moreover, since the groove structure is formed on the interlayer insulating film, the liquid crystal display device can be fabricated in a process simpler than the conventional ones. Light leakage that occurs near the groove structure formed outside each pixel is free from causing reduction of the contrast ratio. Since no application of a voltage for display is required for the non-pixel portion of the liquid crystal layer, it is not actually required to form the pixel electrode on the groove structure provided outside each pixel. Therefore, the adjacent pixel electrodes can be placed close to each other as long as occurrence of a short circuit between these pixel electrodes is prevented, and thus a high effective aperture ratio can be obtained.

An opening and/or a cut may be provided in the first electrode and/or the second electrode in each pixel. With such an opening and cut, the alignment of liquid crystal molecules can be further stabilized under the influence of a tilt electric field generated around the opening and the cut. A vertically aligned liquid crystal layer can be suitably used as the liquid crystal layer, which can form stable axisymmetrically aligned domains with the existence of the groove structure (and an opening and/or a cut). At least one liquid crystal domain may be formed in each pixel. Depending on the size and shape of the pixel, however, two or more liquid crystal domains may be formed. For a typical rectangular pixel, formation of two or more liquid crystal domains is preferred.

In the case of forming two or more liquid crystal domains in each pixel, the groove structure may also be formed along the boundary between a pair of adjacent liquid crystal domains. If an additional shading region (for example, a storage capacitance line) exists in each pixel, the groove structure may be formed in this additional shading region, to thereby suppress reduction of the contrast ratio due to light leakage.

The opening has an effect of fixing/stabilizing the position of the center axis of an axisymmetrically aligned domain. The opening may be formed in either the first electrode or second electrodes, but the effect of fixing/stabilizing the position of the center axis can be enhanced by forming an opening in both the first and second electrodes. These openings formed in the first and second electrodes preferably roughly overlap each other when viewed from the normal to the substrate. The cut is preferably formed only in the first electrode. Unlike the structural alignment regulating means such as the wall structure and a projection, the opening and the cut can be formed in an electrode during the step of patterning the electrode, and thus no additional fabrication step is required. According to the present invention, stable axisymmetrically aligned domains can be formed without the necessity of providing the alignment regulating structure such as the wall structure and a projection on the second substrate.

BRIEF DESCRIPTION OF THE DRAWINGS

FIGS. 1A and 1B diagrammatically show one pixel of a transmissive LCD device 100 of Embodiment 1 of the present invention, in which FIG. 1A is a plan view and FIG. 1B is a cross-sectional view taken along line 1B-1B' in FIG. 1A.

FIGS. 4A and 4B diagrammatically show one pixel of a transflective LCD device 200 of Embodiment 1 of the present invention, in which FIG. 4A is a plan view and FIG. 4B is a cross-sectional view taken along line 4B-4B' in FIG. 4A.

FIGS. 10A and 10B are schematic views for demonstrating the operation principle of the LCD devices of Embodiment 1 of the present invention, in which FIG. 10A shows the state during non-voltage application and FIG. 10B shows the state during voltage application.

FIGS. 13A and 13B diagrammatically show one pixel of a transmissive LCD device 400 of Embodiment 2 of the present invention, in which FIG. 13A is a plan view and FIG. 13B is a cross-sectional view taken along line 13B-13B' in FIG. 13A.

FIGS. 15A and 15B diagrammatically show one pixel of a transflective LCD device 500 of Embodiment 2 of the present invention, in which FIG. 15A is a plan view and FIG. 15B is a cross-sectional view taken along line 15B-15B' in FIG. 15A.

FIGS. 20A and 20B are schematic views for demonstrating the operation principle of the LCD devices of Embodiment 2 of the present invention, in which FIG. 20A shows the state during non-voltage application and FIG. 20B shows the state during voltage application.

DETAILED DESCRIPTION OF THE INVENTION

Embodiment 1

The liquid crystal display (LCD) device of Embodiment 1 of the present invention includes: a first substrate (for example, a TFT-mounted glass substrate); a second substrate (for example, a color filter-mounted glass substrate) placed to face the first substrate; a liquid crystal layer (for example, a vertically aligned liquid crystal layer) interposed between these substrates; a first electrode (for example, pixel electrodes) formed on the first substrate; a second electrode (for example, a counter electrode) formed on the second substrate; an interlayer insulating film formed between the first electrode and the first substrate; and a wall structure formed integrally with the interlayer insulating film. Each of a plurality of pixels of the LCD device includes the first electrode, the second electrode and the liquid crystal layer interposed between the first and second electrodes. A shading region surrounds each of the pixels, and the wall structure is placed regularly in the shading region. The shading region is defined by gate signal lines and source signal lines connected to switching elements (for example, TFTs) provided on the first substrate, for example.

In Embodiment 1 of the present invention, an LCD device permitting high-contrast display and a wide viewing angle can be attained particularly when a vertically aligned liquid crystal layer is used and a plurality of axisymmetrically aligned domains are formed in each pixel. Therefore, in the following description of Embodiment 1 of the present invention, an LCD device using a vertically aligned liquid crystal layer (a VA mode LCD device) is exemplified. It should however be noted that the present invention is not limited to this but is applicable to any LCD devices in which at least one liquid crystal domain including liquid crystal molecules aligned in different directions is formed in each pixel at least when a predetermined voltage is applied. From the standpoint of the viewing angle characteristics, it is preferred to have a liquid crystal domain including liquid crystal molecules aligned in four or more different directions. In the following description, an axisymmetrically aligned domain is exemplified.

In this embodiment, transmissive and transflective LCD devices are described as examples. Note however that the present invention is also applicable to a reflective display device.

Hereinafter, the LCD devices of Embodiment 1 of the present invention will be described concretely with reference to the relevant drawings.

(Transmissive Liquid Crystal Display Device)

Figure 1A:
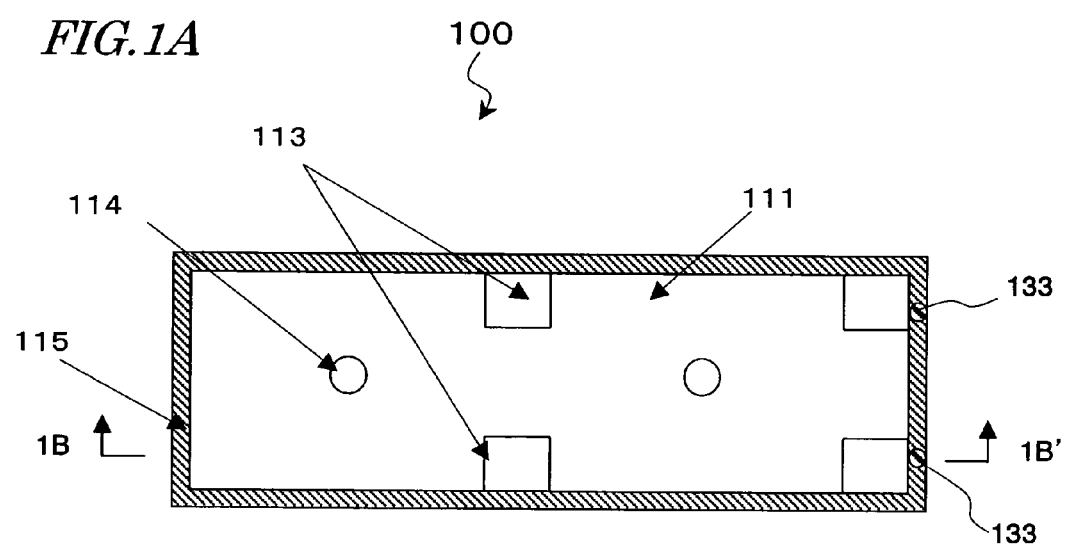
Figure 1B:
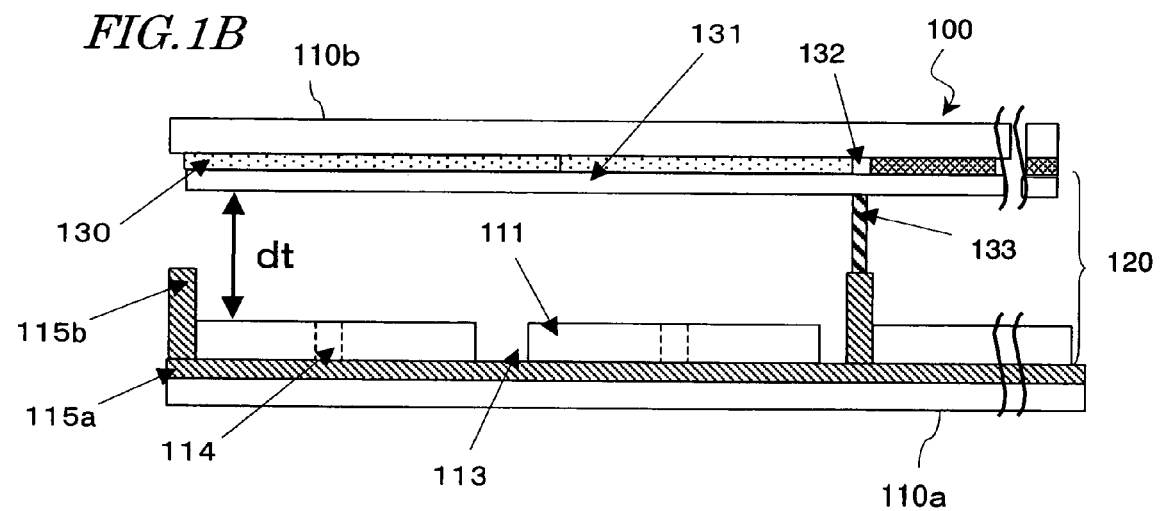

A transmissive LCD device 100 of Embodiment 1 of the present invention will be described with reference to FIGS. 1A and 1B. FIGS. 1A and 1B diagrammatically show one pixel of the transmissive LCD device 100, in which FIG. 1A is a plan view and FIG. 1B is a cross-sectional view taken along line 1B-1B' in FIG. 1A.

The LCD device 100 includes a transparent substrate (for example, a glass substrate) 110a, a transparent substrate 110b placed to face the transparent substrate 110a, and a vertically aligned liquid crystal layer 120 interposed between the transparent substrates 110a and 110b. Vertical alignment films (not shown) are formed on the surfaces of the substrates 110a and 110b facing the liquid crystal layer 120. During non-voltage application, therefore, liquid crystal molecules in the liquid crystal layer 120 are aligned roughly vertical to the surfaces of the vertical alignment films. The liquid crystal layer 120 includes a nematic liquid crystal material having negative dielectric anisotropy and also includes a chiral agent as required.

The LCD device 100 further includes pixel electrodes 111 formed on the transparent substrate 110a and a counter electrode 131 formed on the transparent substrate 110b. Each pixel electrode 111, the counter electrode 131 and the liquid crystal layer 120 interposed between these electrodes define a pixel. In the illustrated example, both the pixel electrodes 111 and the counter electrode 131 are formed of a transparent conductive layer (for example, an ITO layer). Typically, color filters 130 (the entire of the plurality of color filters may also be called a color filter layer 130) provided for the respective pixels, as well as a black matrix (shading layer) 132 formed in the gaps between the adjacent color filters 130, are formed on the surface of the transparent substrate 110b facing the liquid crystal layer 120, and the counter electrode 131 is formed on the color filters 130 and the black matrix 132. Alternatively, the color filters 130 and the black matrix 132 may be formed on the counter electrode 131 (on the surface thereof facing the liquid crystal layer 120).

The LCD device 100 has a shading region around each pixel, and a wall structure 115b extends on the transparent substrate 110a in the shading region. The wall structure 115b is formed integrally with an interlayer insulating film 115a covering circuit elements (including not only active elements such as switching elements but also interconnections and electrodes; not shown in FIGS. 1A and 1B) formed on the transparent substrate 110a. In a transmissive LCD device having TFTs as circuit elements, for example, providing an interlayer insulating film permits overlap formation of pixel electrodes with gate signal lines and/or source signal lines, as will be described later, and this improves the aperture ratio.

The shading region as used herein refers to a region shaded from light due to the presence of TFTs, gate signal lines and source signal lines formed on the peripheries of the pixel electrodes 111 on the transparent substrate 110a, or the presence of the black matrix formed on the transparent substrate 110b, for example. Since this region does not contribute to display, the wall structure 115b formed in the shading region is free from adversely affecting the display.

The illustrated wall structure 115b is a continuous wall surrounding the pixel. Alternatively, the wall structure 115b may be composed of a plurality of separate walls. The wall structure 115b, which serves to define a boundary of a liquid crystal domain located near the outer edge of the pixel, should preferably have a length of some extent. For example, when the wall structure is composed of a plurality of walls, each wall is preferably longer than the gap between the adjacent walls.

The illustrated pixel electrode 111 has two openings 114 and four cuts 113 formed at predetermined positions. When a predetermined voltage is applied across the liquid crystal layer, two liquid crystal domains each having axisymmetric alignment are formed, with the center axes of the axisymmetric alignment being in or near the openings 114. As will be described later, the openings 114 of the pixel electrode 111 act to fix the positions of the center axes of the axisymmetric alignment. The cuts 113, provided near the boundaries of the axisymmetrically aligned domains, define the directions in which liquid crystal molecules fall with an electric field, and thus act to form the axisymmetrically aligned domains. A tilt electric field is generated around the openings 114 and the cuts 113 with the application of a voltage between the pixel electrode 111 and the counter electrode 113. With this tilt electric field, the directions of tilt of liquid crystal molecules are defined, to enable the action described above. In the illustrated example, a total of four cuts 113 are given point-symmetrically with respect to the opening 114 (in this case, the right opening as viewed from FIG. 1A) corresponding to the center axis of a liquid crystal domain formed in the pixel (in this case, the entire pixel is a transmission region).

By providing the cuts 113 as described above, the directions in which liquid crystal molecules fall during voltage application are defined, allowing formation of two liquid crystal domains. The reason why no cuts are provided on the left side of the pixel electrode 111 as viewed from FIG. 1A is that substantially the same function is obtained from cuts provided on the right side of the adjacent pixel electrode (not shown) located left to the illustrated pixel electrode 111, and thus cuts, which may decrease the effective aperture ratio of the pixel, are omitted on the left side of the pixel electrode 111. Also, in the illustrated example, the wall structure 115b described above gives the alignment regulating force. Therefore, with no cuts provided on the left side of the pixel electrode 111, the resultant liquid crystal domain is as stable as a liquid crystal domain having such cuts.

Although a total of four cuts 113 were formed in the illustrated example, at least one cut between the adjacent liquid crystal domains is sufficient. For example, an elongate cut may be formed in the center of the pixel and the other cuts may be omitted.

The shape of the openings 114 formed to fix the center axes of the axisymmetrically aligned domains is preferably circular as illustrated although not limited to this. To exert roughly equal alignment regulating force in all directions, the shape is preferably a polygon having four or more sides and also preferably a regular polygon. The shape of the cuts 113 acting to define the directions in which liquid crystal molecules in the axisymmetrically aligned domains fall with the electric field is determined so that roughly equal alignment regulating force is exerted for the adjacent axisymmetrically aligned domains. For example, a square is preferred.

Supports 133 for defining the thickness of the liquid crystal layer 120 (also called the cell gap) are preferably formed in the shading region (in the illustrated example, the region defined by the black matrix 132) to avoid degradation in display quality due to the supports. Although the supports 133 are formed on the wall structure 115b provided in the shading region in the illustrated example, the supports 133 may be formed on either transparent substrate 110a or 110b. In the case of forming the supports 133 on the wall structure 115b, setting is made so that the sum of the height of the wall structure 115b and the height of the supports 133 is equal to the thickness of the liquid crystal layer 120. If the supports 133 are formed in a region having no wall structure 115b, setting is made so that the height of the supports 133 is equal to the thickness of the liquid crystal layer 120. The supports 133 can be formed by photolithography using a photosensitive resin, for example.

In the LCD device 100, when a predetermined voltage (voltage equal to or higher than a threshold voltage) is applied between the pixel electrode 111 and the counter electrode 131, two axisymmetrically aligned domains with their center axes stabilized in or near the two openings 114 are formed. The pair of cuts 113 provided in the center of the pixel electrode 111 in the length direction define the directions in which liquid crystal molecules in the two liquid crystal domains fall with an electric field, while the wall structure 115b and the cuts 133 provided at corners of the pixel electrode 111 define the directions in which liquid crystal molecules in the portions of the liquid crystal domains located near the outer edges of the pixel fall with the electric field. The alignment regulating forces of the wall structure 115b, the openings 114 and the cuts 113 are considered to act cooperatively to stabilize the alignment of the liquid crystal domains.

On the surface of the transparent substrate 110a facing the liquid crystal layer 120, provided are active elements such as TFTs and circuit elements such as gate signal lines and source signal lines connected to TFTs (all of these elements are not shown). Herein, the transparent substrate 110a, together with the circuit elements and the pixel electrodes 111, the wall structure 115b, the supports 133, the alignment film and the like described above formed on the transparent substrate 110a, are collectively called an active matrix substrate in some cases. Likewise, the transparent substrate 110b, together with the color filter layer 130, the black matrix 132, the counter electrode 131, the alignment film and the like formed on the transparent substrate 110b, are collectively called a counter substrate or a color filter substrate in some cases.

Although omitted in the above description, the LCD device 100 further includes a pair of polarizing plates placed to face each other via the transparent substrates 110a and 110b. The polarizing plates are typically placed so that their transmission axes are orthogonal to each other. The LCD device 100 may further include a biaxial optical anisotropic medium layer and/or a uniaxial optical anisotropic medium layer, as will be described later.

Figure 2A:
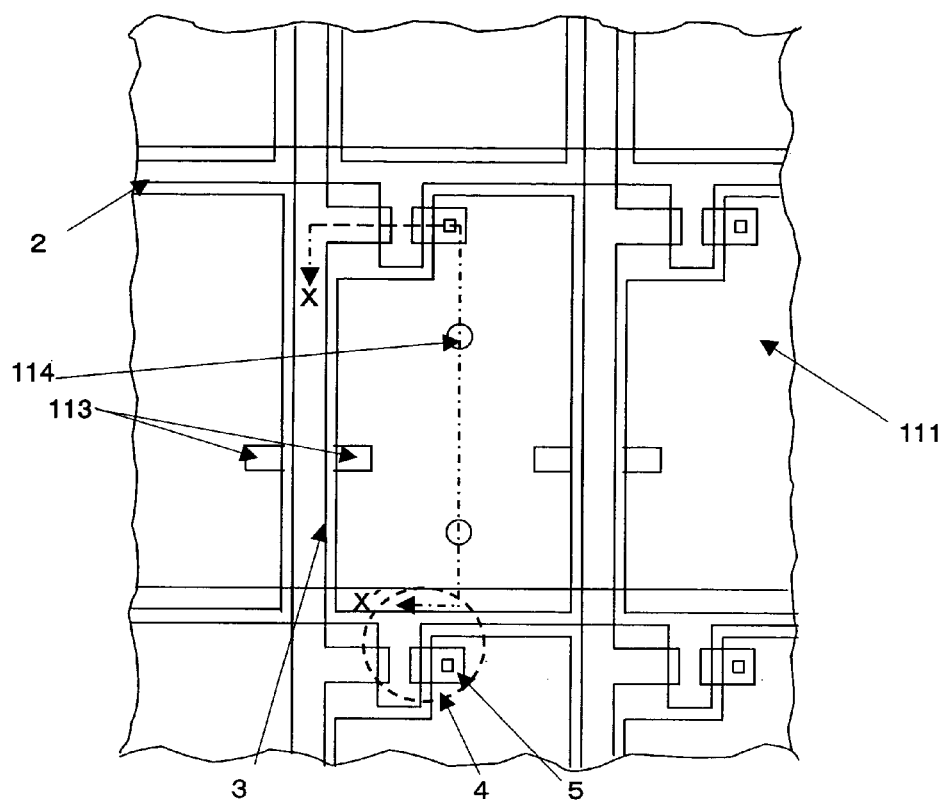
FIG. 2A is a plan view diagrammatically showing an active matrix substrate of a transmissive LCD device of Embodiment 1 of the present invention.
Figure 2B:
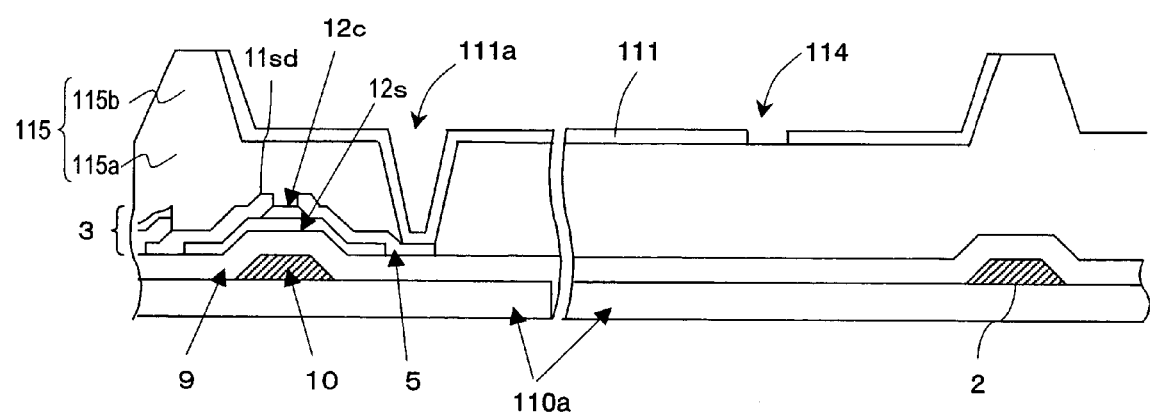
FIG. 2B is a cross-sectional view diagrammatically showing the active matrix substrate shown in FIG. 2A.

Next, referring to FIGS. 2A and 2B, an example of the structure of an active matrix substrate suitably used for the transmissive LCD device 100 will be described. FIG. 2A is a partial enlarged view of the active matrix substrate, and FIG. 2B is a cross-sectional view taken along line X-X' in FIG. 2A. The active matrix substrate shown in FIGS. 2A and 2B can be the same in construction as the active matrix substrate shown in FIGS. 1A and 1B, except that the number of the cuts 113 is small.

The active matrix substrate shown in FIGS. 2A and 2B has a transparent substrate 110a made of a glass substrate, for example. Gate signal lines 2 and source signal lines 3 run on the transparent substrate 110a to cross each other at right angles. TFTs 4 are formed near the crossings of these signal lines 2 and 3. Drain electrodes 5 of the TFTs 4 are connected to corresponding pixel electrodes 111.

The active matrix substrate has an interlayer insulating film 115a covering the gate signal lines 2, the source signal lines 3 and the TFTs 4. A wall structure 115b is formed integrally with the interlayer insulating film 115a. Therefore, the interlayer insulating film 115a and the wall structure 115b can be formed of a single photosensitive resin film 115, and thus the fabrication process can be simpler than the conventional ones.

The pixel electrodes 111, which are transparent electrodes formed of a transparent conductive layer such as an ITO layer, are formed on the interlayer insulating film 115a. Each pixel electrode 111 is connected, at a contact portion 111a thereof in a contact hole formed in the interlayer insulating film 115a, to the corresponding drain electrode 5. Cuts 113 and openings 114 are formed at predetermined positions of the pixel electrode 111 for control of the alignment of axisymmetrically aligned domains as described above.

The pixel electrode 111 overlaps the gate signal line for the next row via a gate insulating film 9. Each TFT 4 has a multilayer structure including the gate insulating film 9, a semiconductor layer 12s, a channel protection layer 12c and an $n^+$-Si layer 11sd (source/drain electrodes) formed in this order on a gate electrode 10 branched from the gate signal line 2.

The illustrated TFT is of a bottom gate type. The TFT is not limited to this type, but a top gate type TFT may also be used. Any switching elements other than the TFT (for example, MIM) may be used.

Figure 3:
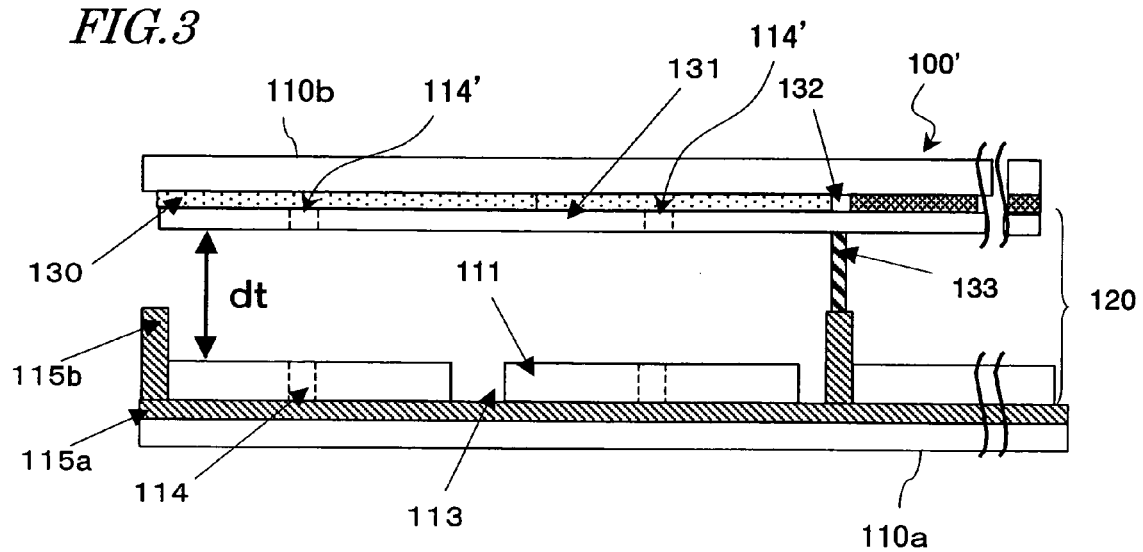
FIG. 3 is a cross-sectional view diagrammatically showing another transmissive LCD device 100' of Embodiment 1 of the present invention.

In the LCD 100, the cuts 113 and the openings 114 are formed in the pixel electrodes 111 formed on the interlayer insulating film 115a that is integral with the wall structure 115a, and no alignment regulating structure is provided on the counter substrate 110b. This embodiment is therefore advantageous in that stable axisymmetrically aligned domains can be formed with such a simple construction. Alternatively, the counter substrate 110b may also be provided with an alignment regulating structure, as in an LCD device 100' shown in FIG. 3, for example. With this construction, the alignment of liquid crystal molecules can be further stabilized.

The LCD device 100' is substantially the same in construction as the LCD device 100, except that the counter electrode 131 has openings 114'. Therefore, the common components are denoted by the same reference numerals, and the description thereof is omitted here.

The openings 114' formed in the counter electrode 131 are located at positions roughly overlapping the openings 114 of the pixel electrodes 111 as viewed from the normal to the substrate, and thus the plan view of the LCD device 100' is substantially the same as FIG. 1A. Each of the thus-formed openings 114' acts to fix/stabilize the center axis of axisymmetric alignment together with the corresponding opening 114 of the pixel electrode 111. As a result, the alignment of the axisymmetrically aligned domains is further stabilized.

It is preferred not to provide a structural alignment regulating means such as a wall structure and projections on the counter substrate 110b. Unlike the openings and the cuts formed in the electrodes, formation of a wall structure and the like disadvantageously increases the fabrication steps and thus increases the cost. The cuts 113 is provided to define the directions in which liquid crystal molecules fall with an electric field cooperatively with the anchoring action of the side faces of the wall structure, unlike the openings acting to fix the center axes. Therefore, the cuts 113 are preferably provided only on the substrate 110a on which the wall structure 115b is placed.

(Transflective LCD Device)

Next, a transflective LCD device 200 of Embodiment 1 of the present invention will be described with reference to FIGS. 4A and 4B.

Figure 4A:
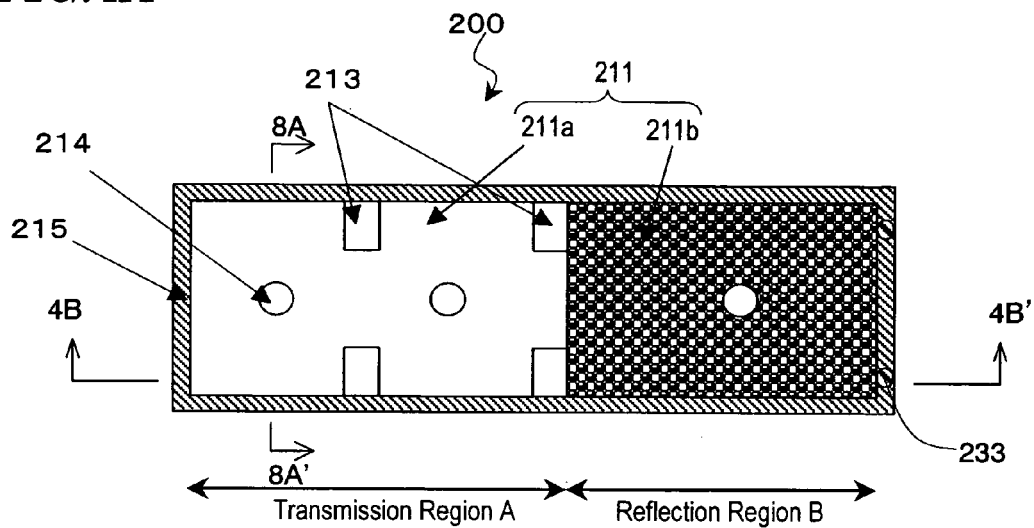
Figure 4B:
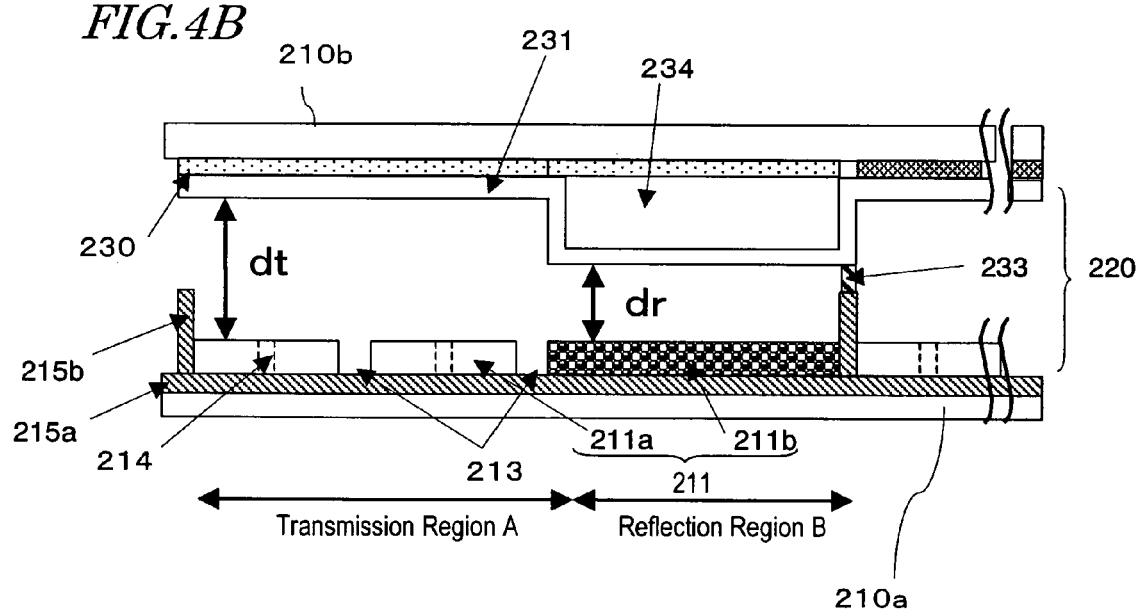

FIGS. 4A and 4B diagrammatically show one pixel of the transflective LCD device 200 of Embodiment 1 of the present invention, in which FIG. 4A is a plan view and FIG. 4B is a cross-sectional view taken along line 4B-4B' in FIG. 4A.

The LCD device 200 includes a transparent substrate (for example, a glass substrate) 210a, a transparent substrate 210b placed to face the transparent substrate 210a, and a vertically aligned liquid crystal layer 220 interposed between the transparent substrates 210a and 210b. Vertical alignment films (not shown) are formed on the surfaces of the substrates 210a and 210b facing the liquid crystal layer 220. During non-voltage application, therefore, liquid crystal molecules in the liquid crystal layer 220 are aligned roughly vertical to the surfaces of the vertical alignment films. The liquid crystal layer 220 includes a nematic liquid crystal material having negative dielectric anisotropy and also includes a chiral agent as required.

The LCD device 200 further includes pixel electrodes 211 formed on the transparent substrate 210a and a counter electrode 231 formed on the transparent substrate 210b. Each pixel electrode 211, the counter electrode 231 and the liquid crystal layer 220 interposed between these electrodes define a pixel. Circuit elements such as TFTs are formed on the transparent substrate 210a as will be described later. Herein, the transparent substrate 210a and the components formed thereon are collectively called an active matrix substrate 210a in some cases.

Typically, color filters 230 (the entire of the plurality of color filters may also be referred to as a color filter layer 230) provided for the respective pixels, as well as a black matrix (shading layer) 232 provided in the gaps between the adjacent color filters 230, are formed on the surface of the transparent substrate 210b facing the liquid crystal layer 220, and the counter electrode 231 is formed on the color filters 230 and the black matrix 232. Alternatively, the color filters 230 and the black matrix 232 may be formed on the counter electrode 231 (on the surface thereof facing the liquid crystal layer 220). Herein, the transparent substrate 210b and the components formed thereon are collectively called a counter substrate (color filter substrate) 210b in some cases.

Each pixel electrode 211 includes a transparent electrode 211a formed of a transparent conductive layer (for example, an ITO layer) and a reflective electrode 211b formed of a metal layer (for example, an Al layer, an Al-including alloy layer, and a multilayer film including any of these layers). Having such a pixel electrode, each pixel includes a transmission region A defined by the transparent electrode 211a and a reflection region B defined by the reflective electrode 211b, to provide display in the transmission mode and display in the reflection mode, respectively.

The LCD device 200 has a shading region around each pixel, and a wall structure 215b extends on the transparent substrate 210a in the shading region. The wall structure 215b is formed integrally with an interlayer insulating film 215a covering circuit elements (including not only active elements such as switching elements but also interconnections and electrodes; not shown in FIGS. 4A and 4B) formed on the transparent substrate 210a. In a transmissive LCD device having TFTs as circuit elements, for example, providing an interlayer insulating film permits overlap formation of pixel electrodes with gate signal lines and/or source signal lines, as will be described later, and this improves the aperture ratio.

Since the shading region does not contribute to display, the wall structure 215b formed in the shading region is free from adversely affecting the display. The wall structure 215b shown in the illustrated example is a continuous wall surrounding the pixel. Alternatively, the wall structure 215b may be composed of a plurality of separate walls. The wall structure 215b, which serves to define a boundary of a liquid crystal domain located near the outer edge of the pixel, should preferably have a length of some extent. For example, when the wall structure 215b is composed of a plurality of walls, each wall is preferably longer than the gap between the adjacent walls.

The illustrated pixel electrode 211 has three openings 214 and four cuts 213 formed at predetermined positions. When a predetermined voltage is applied across the liquid crystal layer, three liquid crystal domains each having axisymmetric alignment are formed, with the center axes of the axisymmetric alignment being in or near the openings 214. As will be described later, the openings 214 of the pixel electrode 211 act to fix the positions of the center axes of the axisymmetric alignment. The cuts 213 act to define the directions in which liquid crystal molecules in the axisymmetrically aligned domains fall with an electric field. A tilt electric field is generated around the openings 214 and the cuts 213 with the application of a voltage between the pixel electrode 211 and the counter electrode 213. With this tilt electric field, the directions of tilt of liquid crystal molecules are defined, to enable the action described above. In the illustrated example, a total of four cuts 213 are given point-symmetrically with respect to the opening (in the illustrated example, the center opening in FIG. 4A) corresponding to the center axis of a liquid crystal domain formed in the transmission region A of the pixel. With these cuts 213, the directions in which liquid crystal molecules fall during voltage application are defined, resulting in formation of three liquid crystal domains. The positions and preferred shapes of the openings 214 and the cuts 213 are the same as those described above in relation to the transmissive LCD device 100. In the example illustrated in FIGS. 4A and 4B, the transmission region A has two liquid crystal domains and the reflection region B has one liquid crystal domain. However, the arrangement is not limited to this. Each liquid crystal domain is preferably roughly square in shape from the standpoint of the viewing angle characteristics and the stability of alignment.

Supports 233 for defining the thickness of the liquid crystal layer 220 (also called the cell gap) should preferably be formed in the shading region (in the illustrated example, the region defined by the black matrix 232) to avoid degradation of the display quality due to the supports. Although the supports 233 are formed on the wall structure 215b provided in the shading region in the illustrated example, the supports 233 may be formed on either transparent substrate 210a or 210b. In the case of forming the supports 233 on the wall structure 215b, setting is made so that the sum of the height of the wall structure 215b and the height of the supports 233 is equal to the thickness of the liquid crystal layer 220. If the supports 233 are formed in a region having no wall structure 215b, setting is made so that the height of the supports 233 is equal to the thickness of the liquid crystal layer 220.

In the LCD device 200, when a predetermined voltage (voltage equal to or higher than a threshold voltage) is applied between the pixel electrode 211 and the counter electrode 231, three axisymmetrically aligned domains with their center axes stabilized in or near the three openings 214 are formed. The four cuts 213 provided in the pixel electrode 211 define the directions in which liquid crystal molecules in the three adjacent liquid crystal domains fall with an electric field, and the wall structure 215b stabilizes boundaries of the liquid crystal domains located near the outer edges of the pixel.

A preferred construction specific to the transflective LCD device 200 permitting both the transmission-mode display and the reflection-mode display will be described.

While light used for display passes through the liquid crystal layer once in the transmission-mode display, it passes through the liquid crystal layer 220 twice in the reflection-mode display. Accordingly, as diagrammatically shown in FIG. 4B, the thickness dt of the liquid crystal layer 220 in the transmission region A is preferably set roughly double the thickness dr of the liquid crystal layer 220 in the reflection region B. By setting in this way, the retardation given to the light by the liquid crystal layer 220 can be roughly the same in both display modes. Most preferably, dr=0.5dt should be satisfied, but good display is secured in both display modes as long as 0.3dt<dr<0.7dt is satisfied. Naturally, dt=dr may be satisfied depending on the use.

In the LCD device 200, a transparent dielectric layer 234 is provided on the glass substrate 210b only in the reflection region B to make the thickness of the liquid crystal layer 220 in the reflection region B smaller than that in the transmission region A. This construction eliminates the necessity of providing a step by forming an insulating film and the like under the reflective electrode 211b, and thus has an advantage of simplifying the fabrication of the active matrix substrate 210a. If the reflective electrode 211b is formed on such an insulting film provided to give a step for adjusting the thickness of the liquid crystal layer 220, light used for transmission display will be shaded with the reflective electrode covering a slope (tapered face) of the insulating film, or light reflected from the reflective electrode formed on a slope of the insulating film will repeat internal reflection, failing to be effectively used even for reflection display. By adopting the construction described above, occurrence of such problems is prevented, and thus the light use efficiency can be improved.

If the transparent dielectric layer 234 is provided with a function of scattering light (diffuse reflection function), white display close to good paper white can be realized without the necessity of providing the reflective electrode 211b with the diffuse reflection function. Such white display close to paper white can also be realized by making the surface of the reflective electrode 211b uneven, and in this case, no light scattering function is necessary for the transparent dielectric layer 234. However, the uneven surface may fail to stabilize the position of the center axis of the axisymmetric alignment depending on the shape of the uneven surface. On the contrary, by combining the transparent dielectric layer 234 having the light scattering function and the reflective electrode 211b having a flat surface, the position of the center axis can be stabilized with the opening 214 formed in the reflective electrode 211b more reliably. Note that in the case of making the surface of the reflective electrode 211b uneven to provide the reflective electrode 211b with the diffuse reflection function, the uneven shape is preferably a continuous wave shape to prevent occurrence of an interference color, and such a shape is preferably set so that the center axis of the axisymmetric alignment can be stabilized.

While light used for display passes through the color filter layer 230 once in the transmission mode, it passes through the color filter layer 230 twice in the reflection mode. Accordingly, if the color filter layer 230 has the same optical density both in the transmission region A and the reflection region B, the color purity and/or the luminance may decrease in the reflection mode. To suppress occurrence of this problem, the optical density of the color filter layer in the reflection region is preferably made lower than that in the transmission region. The optical density as used herein is a characteristic value characterizing the color filter layer. For example, the optical density can be reduced by reducing the thickness of the color filter layer. Otherwise, the optical density can be reduced by reducing the density of a pigment added, for example, while keeping the thickness of the color filter layer unchanged.

Figure 5:
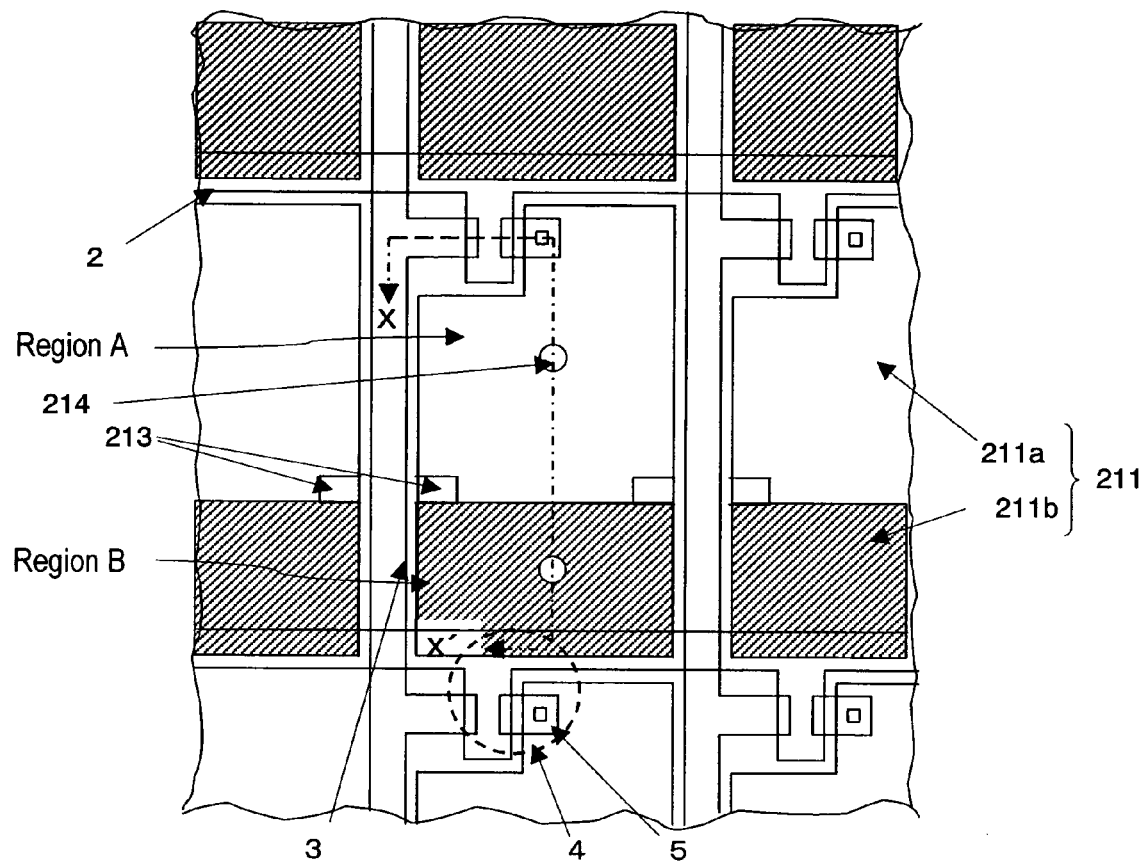
FIG. 5 is a plan view diagrammatically showing an active matrix substrate of a transflective LCD device of Embodiment 1 of the present invention.
Figure 6:
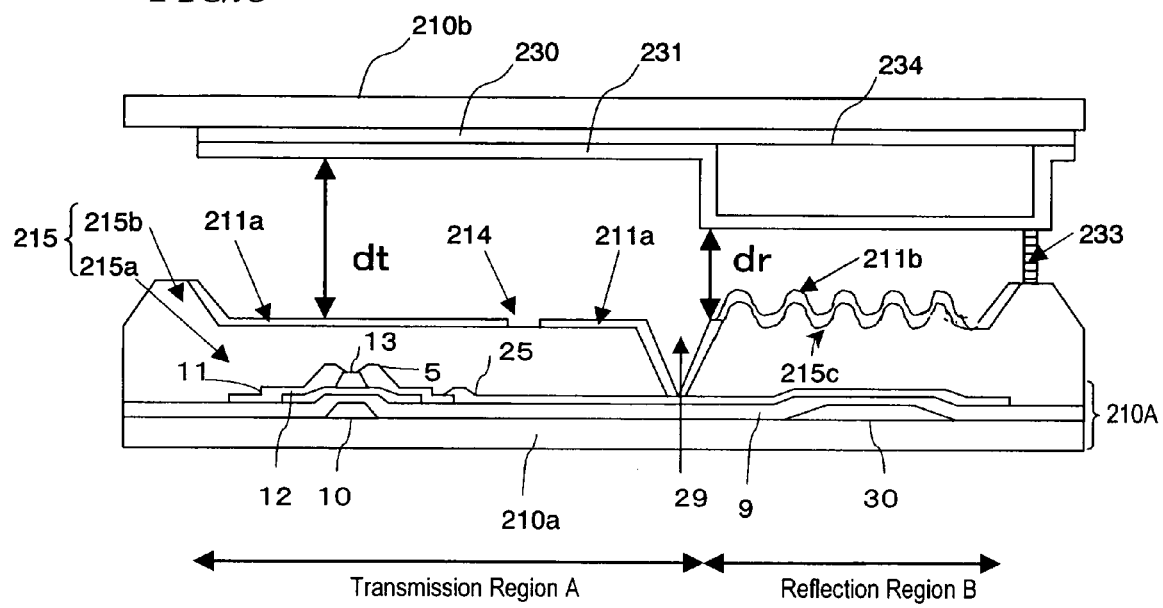
FIG. 6 is a cross-sectional view diagrammatically showing an LCD device provided with the active matrix substrate shown in FIG. 5.

Next, referring to FIGS. 5 and 6, an example of the structure of an active matrix substrate suitably used for the transflective LCD device will be described. FIG. 5 is a partial enlarged view of the active matrix substrate, and FIG. 6 is a cross-sectional view taken along line X-X' in FIG. 5. The active matrix substrate shown in FIGS. 5 and 6 can be the same in construction as the active matrix substrate shown in FIGS. 4A and 4B, except that one liquid crystal domain is formed in the transmission region A (that is, the numbers of the openings 214 and the cuts 213 are reduced). Thus, the common components are denoted by the same reference numerals.

The active matrix substrate shown in FIGS. 5 and 6 has a transparent substrate 210a made of a glass substrate, for example. Gate signal lines 2 and source signal lines 3 run on the transparent substrate 210a to cross each other at right angles. TFTs 4 are formed near the crossings of these signal lines 2 and 3. Drain electrodes 5 of the TFTs 4 are connected to corresponding pixel electrodes 211.

Each of the pixel electrodes 211 includes a transparent electrode 211a made of a transparent conductive layer such as an ITO layer and a reflective electrode 211b made of Al and the like. The transparent electrode 211a defines a transmission region A, and the reflective electrode 211b defines a reflection region B. A transparent dielectric layer may be formed on the reflective electrode 211b as required.

The pixel electrodes 211 are formed on an interlayer insulating film 215a. Each pixel electrode 211 (transparent electrode 211a) is connected, at the contact portion thereof in a contact hole formed in the interlayer insulating film 215a, to a connection electrode 25 that is connected to the drain electrode 5. The reflective electrode 211b is connected to the transparent electrode 211a.

As shown in FIG. 6, the pixel electrode 211 preferably extends up to on the slopes of a wall structure 215b that is integrally formed with the interlayer insulating film 215a. By this extension of the pixel electrode 211 to the wall structure 215b, the directions in which liquid crystal molecules in the liquid crystal layer tilt during voltage application can be efficiently regulated.

Cuts 213 and openings 214 are formed at predetermined positions of the pixel electrode 211 for control of the alignment of axisymmetrically aligned domains as described above. The connection electrode 25 constitutes a storage capacitance together with a storage capacitance line (storage capacitance electrode) formed to face the connection electrode 25 via a gate insulating film 9. The storage capacitance line runs in parallel with the gate signal line 2 under the reflective electrode 211b, for example. The same signal (common signal) as that applied to the counter electrode formed on the color filter substrate, for example, is applied to the storage capacitance line.

The reflective electrode 211b of the transflective LCD device of this embodiment has the surface of an uneven shape, and thus exhibits excellent diffuse reflection characteristics. The uneven shape of the surface of the reflective electrode 211b is a reflection of an uneven shape given to the surface of the interlayer insulating film 215a.

The interlayer insulating film 215a, formed integrally with the wall structure 215b, has a region having an essentially flat surface (called a "first region" in some cases) and a region having a surface of an uneven shape (called a "second region" in some cases). The transparent electrode 211a is formed on the first region having a flat surface, and the reflective electrode 211b is formed on the second region having an uneven surface. Such an interlayer insulating film 215a that is integral with the wall structure 215b and includes an uneven portion 215a can be formed from a single photosensitive resin film, as will be described later, and thus the fabrication process can be simpler than the conventional ones.

The pixel electrode 211 overlaps the gate signal line 2 for the next row via the gate insulating film 9. The TFT 4 has a multilayer structure including the gate insulating film 9, a semiconductor layer 12s, a channel protection layer 12c and an n$^+$-Si layer 11*sd* (source/drain electrodes) formed in this order on a gate electrode 10 branched from the gate signal line 2.

The illustrated TFT is of a bottom gate type. The TFT is not limited to this type, but a top gate type TFT can also be used. Any switching elements other than the TFT (for example, MIM) may also be used.

As described above, like the LCD 100, the LCD 200 having the construction shown in FIGS. 4A and 4B has the effect that the alignment of liquid crystal molecules can be stabilized sufficiently with a comparatively simple construction having the axisymmetric alignment regulating structure formed on only one substrate (that is, the openings 213, the cuts 214 and the wall structure 215*b* formed on the pixel electrodes 211). As in the transmissive LCD device 100' shown in FIG. 3, the transflective LCD device 200 may be provided with an alignment regulating structure also on the counter substrate, to thereby further stabilize the alignment. Note however that for the reason described above, the alignment regulating structure provided on the counter substrate preferably includes only openings for fixing the center axis of the axisymmetric alignment.

Also, in the LCD device 200, the display brightness and color purity in both the transmission mode and the reflection mode can be improved by providing the transparent dielectric layer 234 and/or the color filter layer 230 in the manner described above.

Next, referring to FIGS. 7A to 7F, a method for forming the interlayer insulating film 215*a* and the wall structure 215*b* will be described in detail. Note that in FIGS. 7A to 7F, the transparent substrate 210*a* and the circuit elements such as the TFTs and the signal lines formed on the transparent substrate 210*a* are collectively called a "circuit substrate 210A".

Figure 7A:
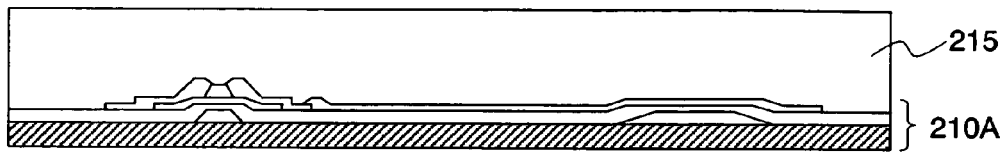
FIGS. 7A to 7F are diagrammatic views for demonstrating a fabrication method for the active matrix substrate shown in FIGS. 5 and 6.

First, as shown in FIG. 7A, the circuit substrate 210A having predetermined circuit elements such as TFTs formed therein is prepared, and a positive photosensitive resin film 215 (for example, OFPR-800 from Tokyo Ohka Kogyo Co., LTD.) is formed to a thickness of 4.5 μm, for example, to cover the circuit elements.

Figure 7B:
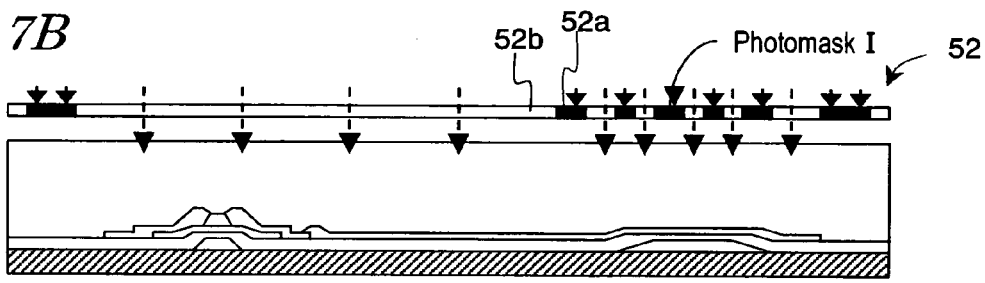

As shown in FIG. 7B, the photosensitive resin film is exposed to light. In this light exposure, regions having different exposures are formed in the photosensitive resin film. That is, the exposure is changed among regions that are to be the wall structure 215*b* (regions shaded with source signal lines, gate signal lines and the like), regions of which the surfaces are made uneven (regions on which the reflective electrodes are formed), and regions in which the contact holes are formed.

Specifically, the photosensitive resin film 215 is exposed to light via a photomask 52 having shading portions 52*a* at positions corresponding to projections (projections of the uneven surfaces) in the reflection regions and the wall structure. The remaining portions thereof are transmitting portions 52*b*. The shading portions 52*a* for projections in the reflection regions, each in the shape of a circle or a polygon, for example, are arranged randomly at predetermined inter-center intervals (5 to 30 μm) at a predetermined density. An extra-high voltage mercury lamp (for example, i-line illuminance: 20 to 50 mW), for example, is used as the light source, to perform uniform exposure (illumination time: 1 to 4 seconds). The exposure is preferably about 20 to 100 mJ/cm$^2$.

Figure 7C:
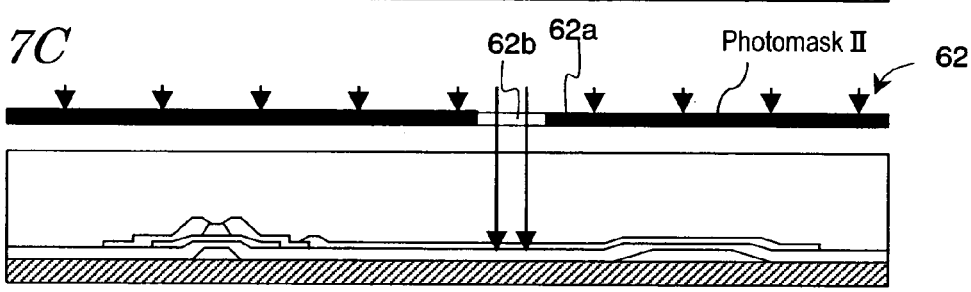
Figure 7D:
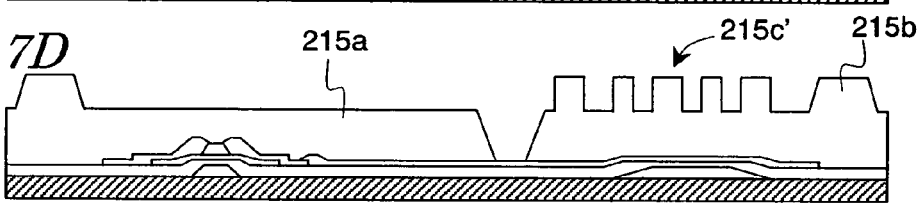

As shown in FIG. 7C, the photosensitive resin film 215 is uniformly exposed to light via a photomask 62 having transmitting portions 62*b* corresponding to the contact holes and shading portions 62*a* for the remaining portions (illumination time: 10 to 15 seconds). The exposure is preferably about 200 to 500 mJ/cm$^2$.

As shown in FIG. 6D, the photosensitive resin film 215 is developed with a tetramethylammonium hydroxide (TMAH) developer, for example, under predetermined conditions. For example, the regions of the resin film subjected to a high exposure are completely removed (the contact holes are formed), the regions of the resin film subjected to no exposure are left by about 90% (the wall structure and the projections are formed), and the regions of the resin film subjected to a low exposure are left by about 40% (the depressions are formed).

Figure 7E:
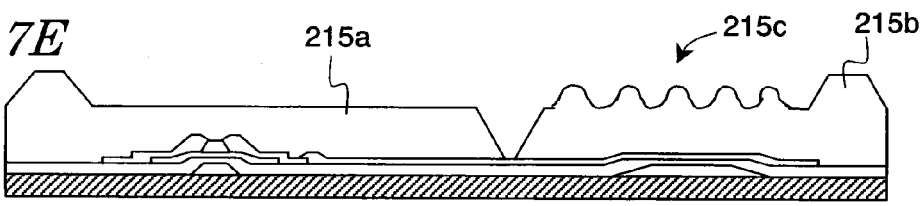

As shown in FIG. 7E, the resultant photosensitive resin film 215 are dried and baked as required. The baking is made at 200° C., for example. With this baking, the portions of the resin in the reflection regions having a plurality of minute projections, denoted by 215*c*', are changed to the mildly uneven portions 215*c* by thermal deformation and the like. The reflective electrodes 211*b* having such a mildly uneven surface can suppress occurrence of an interference color and thus exhibit good diffuse reflection characteristics.

As described above, by performing the combined continuous exposure steps and the subsequent development step, obtained is the interlayer insulating film 215*a* that is integral with the wall structure 215*b* and has the uneven portions 215*c* having fine projections and depressions and the contact holes.

In the exposure steps described above, the regions having different exposures were formed by adjusting the illumination time with regions and using the photomasks having transmitting portions and shading portions. Alternatively, the exposure may be made with a grayscale mask having a continuously varying gradation pattern, to form an interlayer insulating film of which the surface has a continuously varying shape.

Otherwise, in the exposure steps, exposure for formation of the wall structure may be performed with a third photomask having shading portions only at positions corresponding to the wall structure, immediately before the exposure step for formation of the contact holes.

Figure 7F:
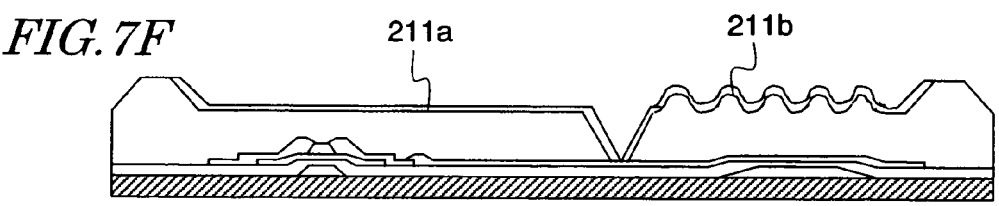

As shown in FIG. 7F, the pixel electrodes 211 are formed on the interlayer insulating film 215*a* and the wall structure 215*b* formed in the steps described above. For example, the transparent electrodes 211*a* are formed by depositing a transparent conductive film (for example, an ITO film) to a predetermined thickness (for example, 100 nm) by sputtering and patterning the deposited film. The reflective electrodes 211*b* are formed by depositing a reflective electrode film (for example, an Al thin film) to a predetermined thickness (for example, 180 nm) by sputtering and patterning the deposited film. During the formation of the electrodes 211*a* and 211*b*, the openings and/or the cuts are formed.

In this embodiment, the wall structure 215*b* and the fine projections and depressions in the reflection regions are formed in the same layer as the interlayer insulating film 215*a*, and the pixel electrodes are formed on this layer. Therefore, the pixel electrodes can also be formed on the wall structure, in particular, on the side slopes of the wall structure on the pixel side. With this extended formation of the pixel electrodes 211 on the side slopes of the wall structure, the electric field (electric line of force) in the vicinity of the side faces of the wall structure 215*b* is distorted. By using this effect, together with the structural alignment regulating force of the wall structure 215*b*, the directions of tilt of liquid crystal molecules can be efficiently regulated.

A transparent electrode film may be formed on each reflective electrode 211*b* as required. Formation of such a transparent electrode film can reduce a difference in potential difference (electrode potential difference) between the reflection regions and the transmission regions. The material used for such a transparent electrode film is preferably the same as that for the transparent electrodes 211a.

As described above, in the fabrication method of this embodiment, the uneven surfaces for giving the diffuse reflection characteristics and the wall structure as the alignment control structure can be formed by only performing the photolithography process for a single photosensitive resin film. Thus, effective cost reduction is attained.

Vertical alignment films are formed on the thus-obtained active matrix substrate and the counter substrate (color filter substrate) under predetermined conditions. These substrates are then bonded together via a sealing resin, and a liquid crystal material having negative dielectric anisotropy is sealed in the gap between the substrates, to obtain the LCD device of the present invention. Known methods can be used to realize these fabrication steps, and thus description thereof is omitted here.

The fabrication method for the transflective LCD device was exemplified to describe the fabrication method of the present invention. Naturally, the technology of forming the wall structure, as an alignment regulating structure for liquid crystal domains, the contact holes and the like together during formation of the interlayer insulating film in combined continuous process steps can also be applied to the fabrication of transmissive LCD devices and reflective LCD devices. By adopting this technology, the process can be made simpler than conventionally attained, providing the effects such as cost reduction and reduction of the tact time.

Figure 8A:
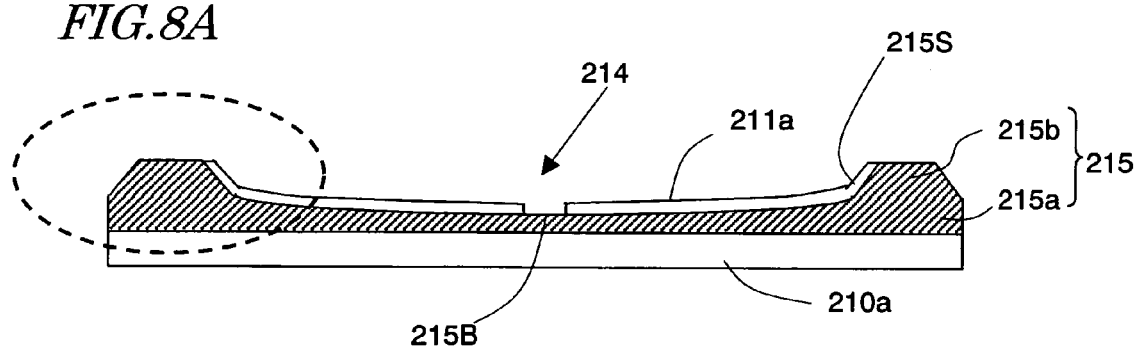
FIG. 8A is a cross-sectional view taken along line 8A-8A' in FIG. 4.

Next, referring to FIGS. 8A and 8B, a preferred shape of the wall structure 215b and the interlayer insulating film 215a will be described in detail. FIG. 8A is a cross-sectional view taken along line 8A-8A' in FIG. 4A, and FIG. 8B is a partial enlarged cross-sectional view of the portion encircled with the dashed line in FIG. 8A.

In this embodiment of the present invention, the interlayer insulating film 215a overlying the switching elements and the wall structure 215b are formed integrally with each other in the combined exposure steps. Therefore, as diagrammatically shown in FIGS. 8A and 8B, the cross section of the wall structure 215b and the interlayer insulating film 215a vertical to the first substrate 210a gives a continuous shape having a bottom 215B in a region in which the center axis of the axisymmetric alignment of the liquid crystal domain is formed. In the illustrated example, the pixel electrode 211a has the opening 214 for fixing/stabilizing the position of the center axis of the axisymmetrically aligned domain. Therefore, the bottom 215B of the cross-sectional shape of the interlayer insulating film 215a is at the position corresponding to the opening 214.

Thus, the side slopes 215S of the wall structure 215b and the top surface of the interlayer insulating film 215a give a continuous crater shape. With the pixel electrode 211 and the vertical alignment film formed on the crater-shaped surface, the alignment of the axisymmetrically aligned domain can be further stabilized. As a result, the following effects can be obtained. That is, the response characteristics in grayscale levels can be improved, the roughness in display in grayscale levels can be reduced, and a distortion in alignment occurring with pressing of a liquid crystal panel, if any, can be cleared in a short time. The alignment stabilizing effect related to the crater shape is obtained because the surfaces of the pixel electrode and the vertical alignment film are in a crater shape. More specifically, the pixel electrode having the crater-shaped surface generates an electric field tilted around the bottom of the crater as the center in the liquid crystal layer. The vertical alignment film having the crater-shaped surface exerts its alignment regulating force so as to tilt liquid crystal molecules around the bottom of the crater as the center. In this way, with the additional alignment regulating force originating from the crater shape, the axisymmetrically aligned domain is further stabilized.

Figure 8B:
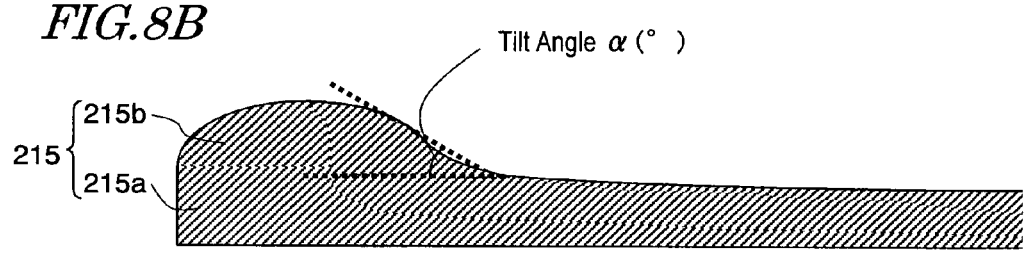
FIG. 8B is an enlarged view of the portion encircled with the broken line in FIG. 8A.

Although the crater shape is exaggerated in FIGS. 8A and 8B, it is preferred to have a structure of which the cross-sectional shape vertical to the substrate 210a has slow slopes at and around the side faces of the wall structure and a roughly flat line in the center portion of the pixel region, or a structure of which the cross-sectional shape is continuously inclined from the side faces of the wall structure toward the center portion. Such a cross-section shape can provide the effect of stabilizing the axisymmetrically aligned domain. The crater shape can be controlled by adjusting the conditions such as the temperature and time of heat treatment after the patterning of the photosensitive resin film for forming the interlayer insulating film 215a and the wall structure 215b.

As is diagrammatically shown in FIG. 8B, the tilt angle $\alpha$ of the side face 215S of the wall structure 215b with respect to the surface of the substrate 210a is preferably 45° or less, more preferably 25° or less.

The vertical alignment film (not shown), which is also formed on the side face 215S of the wall structure 215b, has the force of regulating liquid crystal molecules to be aligned vertical to the surface thereof. Accordingly, liquid crystal molecules present on and around the side face 215S are aligned in a direction tilted with respect to the surface of the substrate 210a. The degree of the tilt of the liquid crystal molecules is higher as the tilt angle $\alpha$ of the side face 215S is larger. Since the alignment regulating force of the vertical alignment film acts irrespective of application of a voltage, light leakage occurs due to the tilted liquid crystal molecules near the side face 215S in the black display state. The contrast ratio therefore decreases when the tilt angle $\alpha$ of the wall structure 215b is excessively large. To suppress this decrease in contrast ratio, the tilt angle $\alpha$ is preferably 45° or less, more preferably 25° or less. If the tilt angle $\alpha$ exceeds 45°, the alignment may become unstable. The reason for this is presumably as follows. The liquid crystal molecules near the side face of the wall structure, which are in a tilted state with respect to the horizontal plane during no voltage application, shift to be aligned vertical to a distorted electric field when a voltage is applied. At this time, while some liquid crystal molecules tilt in the direction toward the horizontal plane in which they should inherently fall during the voltage application, the other liquid crystal molecules tilt in the opposite direction, and these opposing directions antagonize each other. To obtain the alignment stabilizing effect, the tilt angle $\alpha$ is preferably 3° or more, more preferably 5° or more.

Figure 9:
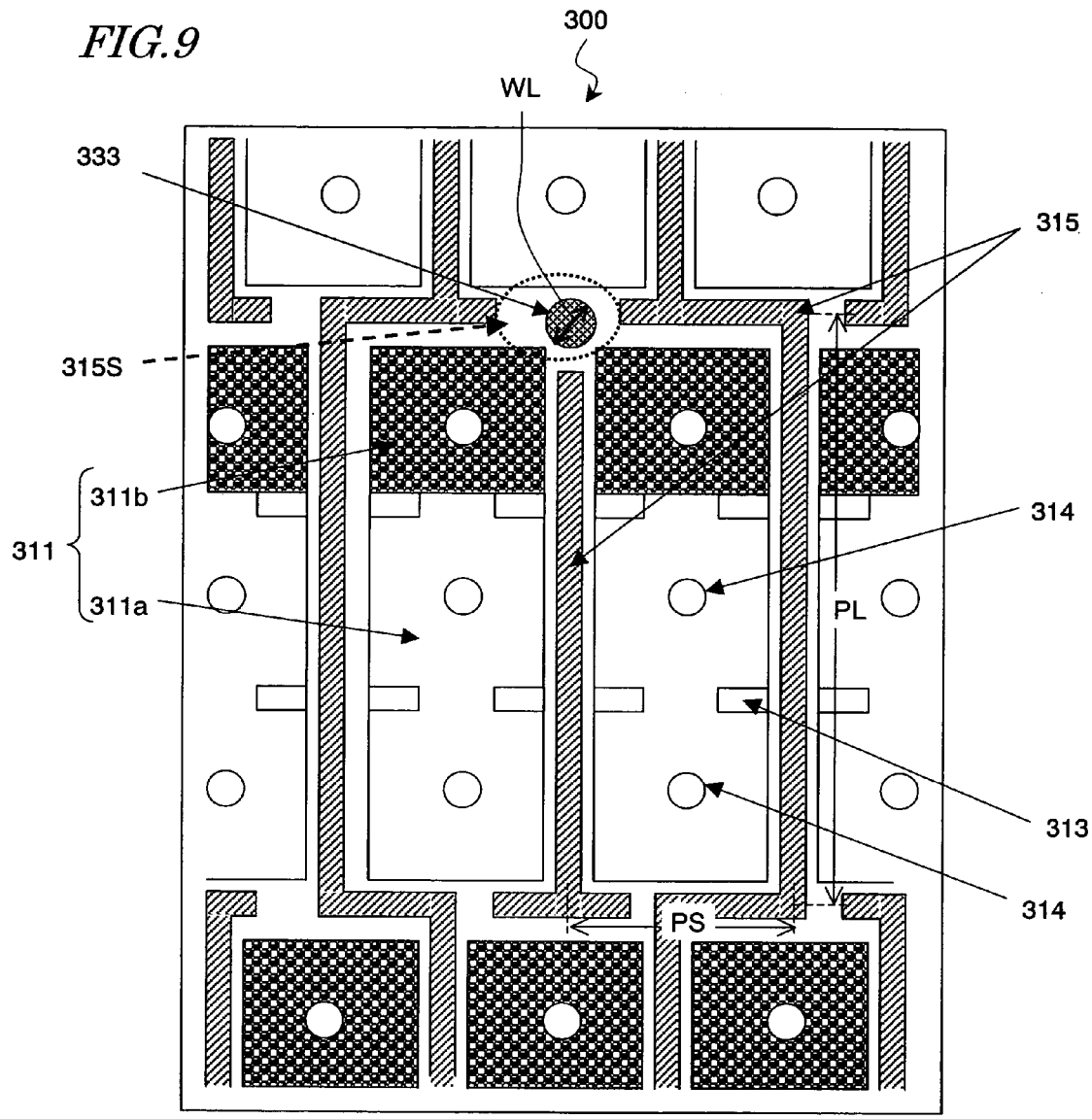
FIG. 9 is a plan view diagrammatically showing another transflective LCD device 300 of Embodiment 1 of the present invention.

Next, referring to FIG. 9, a preferred arrangement of supports defining the thickness of the liquid crystal layer will be described. FIG. 9 is a plan view diagrammatically showing another transflective LCD device 300 of Embodiment 1 of the present invention.

The LCD device 300 is similar in structure to the LCD device 200 described above. Hereinafter, points different from the LCD device 200 will be mainly described.

The LCD device 300 has a delta array of pixels. A pixel electrode 311 defining each pixel includes a transparent electrode 311a and a reflective electrode 311b. The pixel electrode 311 has three openings 314 and four cuts 313 formed at predetermined positions. As in the LCD device 200, when a predetermined voltage is applied across the liquid crystal layer, three liquid crystal domains each having axisymmetric alignment are formed, with the center axes of the axisymmetric alignment of these liquid crystal domains being positioned in or near the openings 314.

The LCD device 300 has a shading region around each pixel, and a wall structure 315 extends on a transparent substrate in the shading region. As in the LCD 200, the wall structure 315 is formed integrally with an interlayer insulating film (not shown) that covers circuit elements formed on the transparent substrate. In the LCD 200, the wall structure 215b was formed as a continuous wall surrounding each pixel. In the LCD 300, however, the wall structure 315 is composed of wall portions isolated from each other with wall gaps 315S. Supports (spacers) 333 for defining the thickness of the liquid crystal layer (cell thickness) are placed in the wall gaps 315S partitioning the wall structure 315.

As described above, by partitioning the wall structure 315 with the wall gaps 315S and placing the supports 333 in the wall gaps 315S, the following effect can be obtained.

When the interlayer insulating film and the wall structure are formed integrally in the combined series of photolithography steps as described earlier, variations may arise in the finished shape and height of the wall structure 315 due to the process margin and the like. Therefore, when the supports are formed on the wall structure, variations in the thickness of the liquid crystal layer may arise due to the variations in the height and shape of the wall structure even if variations in the height of the supports can be suppressed. To suppress variations in the thickness of the liquid crystal layer, it is preferred to provide the wall gaps 315S partitioning the wall structure 315 and place the supports 333 in the wall gaps 315S as in the LCD device 300. The supports 333 may be placed on the active matrix substrate or the counter substrate. Forming the wall gaps 315S also provides the effect of shortening the time of injection of the liquid crystal material. The supports 333, placed in the shading region, are free from degrading the display quality. By placing the supports 333 at an appropriate density, the thickness of the liquid crystal layer can be made uniform over the entire panel, and also the shock resistance of the display panel can be improved.

If the wall gap 315S is excessively large, the alignment control effect of the wall structure 315 decreases. As a result of various examinations conducted by the present inventors, it is found that the length of the wall gap (or the total length of the wall gaps) existing along the circumference of one pixel is preferably 40% or less of the length of the circumference of the pixel. In other words, in order for the wall structure 315 to exert its alignment regulating force sufficiently, the length of the wall structure 315 is preferably 60% or more of the length of the circumference of the pixel. As used herein, the length of the circumference of the pixel is given by 2×(PL+PS) where PS is the pitch of the pixels in the row direction and PL is the pitch of the pixels in the column direction, as shown in FIG. 9. The length of the wall structure 315 refers to the length of the line extending along the center of the wall structure 315 in the width direction.

As a result of various examinations, it is found that when the density D of the supports 333 placed in the liquid crystal cell is given by WL×N/PL where WL is the diameter (μm) of the supports 33, N is the number of supports 333 placed in a regular unit (0.12 mm$^2$; in the illustrated example, an area of 0.3 mm long×0.4 mm wide in correspondence with the aspect ratio of the display panel of 3:4), and PL is the pitch of the pixels in the longitudinal direction, the placement density D preferably satisfies the relationship $0.01 \leq D \leq 0.3$, more preferably $0.05 \leq D \leq 0.2$.

As described above, the preferred placement density D of the supports is related to the pixel longitudinal pitch PL, the diameter WL of the supports and the number N of supports per regular unit (0.12 mm$^2$ in the illustrated example). For example, as the pixel pitch is greater, the placement density D tends to decrease. If the pixel pitch becomes smaller with achievement of higher definition, the placement density D tends to increase. In particular, to attain a uniform cell thickness over the entire panel and also improve the shock resistance, it is important to optimize the placement density D of the supports. If the placement density D of the supports is less than a lower-limit allowable value, the uniformity of the cell thickness decreases and the shock resistance decreases causing the problem of alignment distortion with pressing. If the placement density D of the supports exceeds an upper-limit allowable value, the alignment of liquid crystal molecules may be disturbed near the supports, causing reduction in contrast ratio due to light leakage.

The LCD device having a delta array of pixels was shown in FIG. 9 as an example. The present invention is also applicable to LCD devices having pixels in a stripe array or any other array. Also, the present invention is also applicable to transmissive LCD devices and reflective LCD devices, not limited to the illustrated transmissive/reflective LCD device.

[Operation Principle]

The reason why the LCD device having a vertically aligned liquid crystal layer of Embodiment 1 of the present invention has excellent wide viewing angle characteristics will be described with reference to FIGS. 10A and 10B.

Figure 10A:
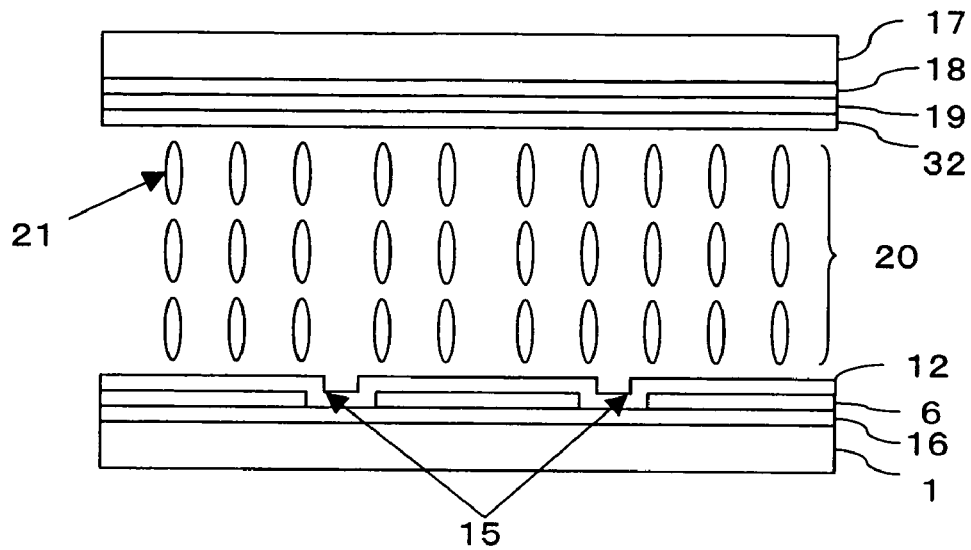
Figure 10B:
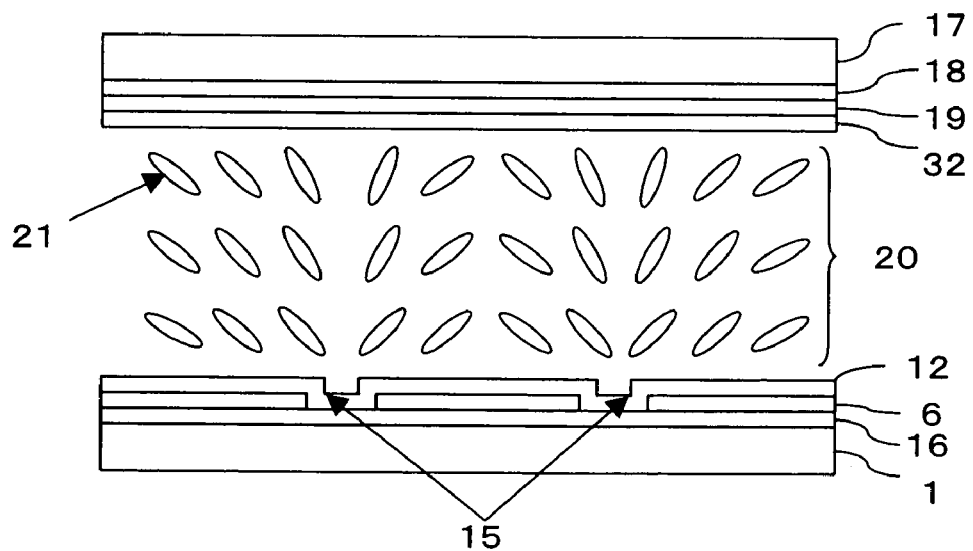

FIGS. 10A and 10B are views for demonstrating how the alignment regulating force of openings 15 formed in a pixel electrode 6 acts, in which FIG. 10A diagrammatically shows the aligned state of liquid crystal molecules during non-voltage application and FIG. 10B diagrammatically shows that during voltage application. The state shown in FIG. 10B is for display of a grayscale level.

The LCD device shown in FIGS. 10A and 10B includes an insulating layer 16, a pixel electrode having the openings 15 and an alignment film 12 formed in this order on a transparent substrate 1. The LCD device also includes a color filter layer 18, a counter electrode 19 and an alignment film 32 formed in this order on another transparent substrate 17. A liquid crystal layer 20 interposed between the two substrates includes liquid crystal molecules 21 having negative dielectric anisotropy.

As shown in FIG. 10A, during non-voltage application, the liquid crystal molecules 21 are aligned roughly vertical to the substrate surface with the alignment regulating force of the vertical alignment films 12 and 32.

As shown in FIG. 10B, during voltage application, the liquid crystal molecules 21 having negative dielectric anisotropy attempt to make their major axes vertical to the electric line of force, and thus the directions in which the liquid crystal molecules 21 fall are defined with a tilt electric field generated around the openings 15. Therefore, the liquid crystal molecules 21 are aligned axisymmetrically around the openings 15 as the center. In the thus-formed axisymmetrically aligned domains, liquid crystal directors are aligned in all directions (direction in the substrate plane), and thus, excellent viewing angle characteristics can be obtained.

Although the action of the tilt electric field generated around the openings 15 was referred to in the above description, a tilt electric field is also generated around cuts formed at edges of the pixel electrode 6, and the directions of tilt of the liquid crystal molecules 21 are also defined with this tilt electric field. Moreover, a wall structure can define the directions of tilt of the liquid crystal molecules 21 with the alignment regulating force of its side face (wall face). Typically, with a vertical alignment film formed covering the wall structure, the liquid crystal molecules are aligned vertical to the wall face under the regulating force.

A more specific example of construction of an LCD device of Embodiment 1 of the present invention will be described with reference to FIG. 11.

Figure 11:
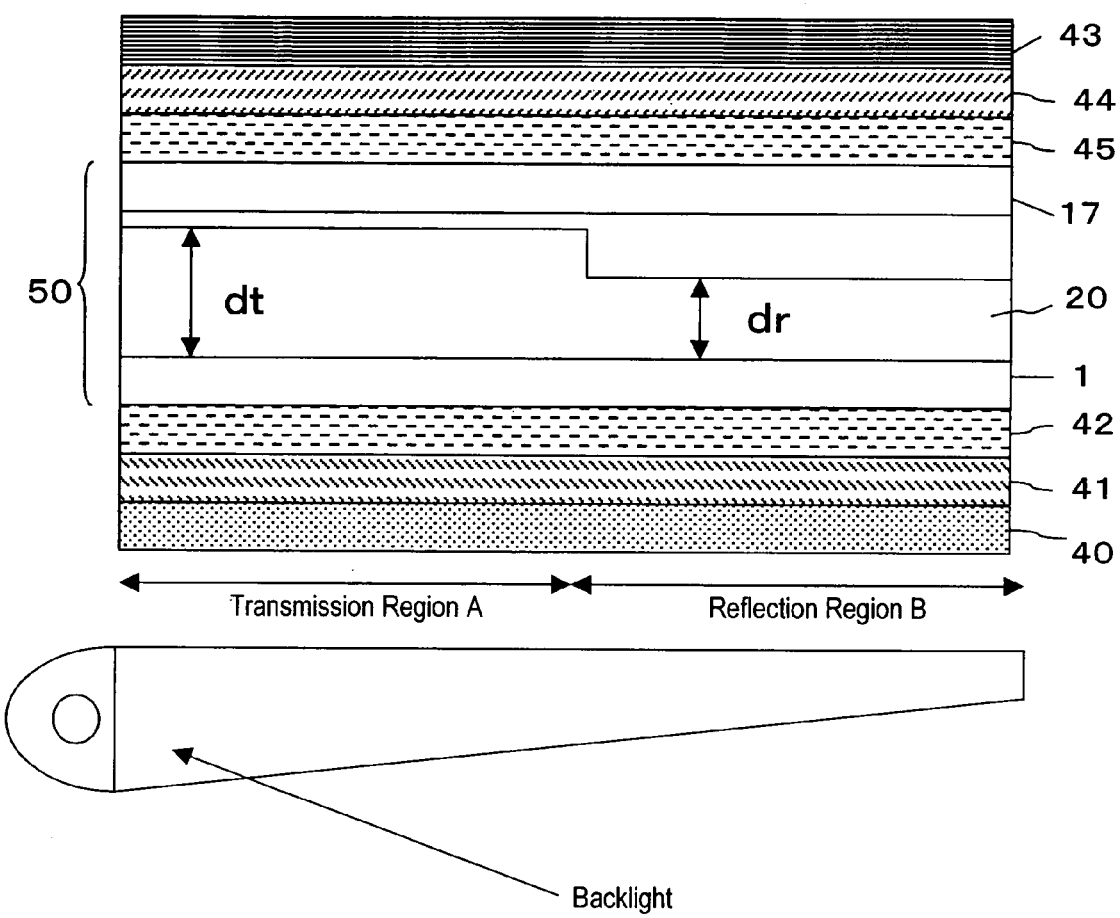
FIG. 11 is a diagrammatic view showing an example of construction of an LCD device of Embodiment 1 of the present invention.

The LCD device shown in FIG. 11 includes: a backlight; a transflective liquid crystal panel 50; a pair of polarizing plates 40 and 43 placed to face each other via the transflective liquid crystal panel 50; a quarter wave plates 41 and 44 respectively placed between the polarizing plates 40 and 43 and the liquid crystal panel 50; and phase plates 42 and 45 having negative optical anisotropy respectively placed between the wave plates 41 and 44 and the liquid crystal panel 50. The liquid crystal panel 50 includes a vertically aligned liquid crystal layer 20 between a transparent substrate (active matrix substrate) 1 and a transparent substrate (counter substrate) 17. As the liquid crystal panel 50, one having the same construction as that of the LCD device 200 shown in FIGS. 4A and 4B is used.

The display operation of the LCD device shown in FIG. 11 will be briefly described.

In reflection-mode display, light incident from above passes through the polarizing plate 43 to be output as linearly polarized light. The linearly polarized light is changed to circularly polarized light with the quarter wave plate 44 placed so that the slower axis thereof forms 45° with the transmission axis of the polarizing plate 43. The circularly polarized light passes through the color filter layer (not shown) formed on the substrate 17. In the illustrated example, the phase plate 45 provides no phase difference for light incident in the normal direction.

During non-voltage application, in which liquid crystal molecules in the liquid crystal layer 20 are aligned roughly vertical to the substrate plane, incident light passes through the liquid crystal layer 20 with a phase difference of roughly 0 and is reflected with the reflective electrode formed on the lower substrate 1. The reflected circularly polarized light passes again through the liquid crystal layer 20 and the color filter layer. The light then passes through the phase plate 45 having negative optical anisotropy as the circularly polarized light, to enter the quarter wave plate 44, where the light is changed to linearly polarized light having a polarizing direction orthogonal to the polarizing direction given to the incident light after first passing through the polarizing plate 43, and reaches the polarizing plate 43. The resultant linearly polarized light fails to pass through the polarizing plate 43, and thus black display is provided.

During voltage application, in which the liquid crystal molecules in the liquid crystal layer 20 are tilted toward the horizontal direction from the direction vertical to the substrate plane, the incident circularly polarized light is changed to elliptically polarized light due to birefringence of the liquid crystal layer 20, and reflected with the reflective electrode formed on the lower substrate 1. The polarized state of the reflected light is further changed during passing back through the liquid crystal layer 20. The reflected light passes again through the color filter layer and then the phase plate 45 having negative optical anisotropy, to enter the quarter wave plate 44 as the elliptically polarized light. Accordingly, when reaching the polarizing plate 43, the light is not linearly polarized light having a polarizing direction orthogonal to the polarizing direction given to the original incident light, and thus passes through the polarizing plate 43. That is to say, by adjusting the applied voltage, the degree of the tilt of the liquid crystal molecules can be controlled, and thus the amount of reflected light allowed to pass through the polarizing plate 43 can be changed, to thereby enable grayscale display.

In transmission-mode display, the upper and lower polarizing plates 43 and 40 are placed so that the transmission axes thereof are orthogonal to each other. Light emitted from a light source is changed to linearly polarized light at the polarizing plate 40, and then changed to circularly polarized light when being incident on the quarter wave plate 41 placed so that the slower axis thereof forms 45° with the transmission axis of the polarizing plate 40. The circularly polarized light then passes through the phase plate 42 having negative optical anisotropy and is incident on the transmission region A of the lower substrate 1. In the illustrated example, the phase plate 42 provides no phase difference for light incident in the normal direction.

During non-voltage application, in which liquid crystal molecules in the liquid crystal layer 20 are aligned roughly vertical to the substrate plane, the incident light passes through the liquid crystal layer 20 with a phase difference of roughly 0. That is, the light incident on the lower substrate 1 as circularly polarized light passes through the liquid crystal layer 20 and then the upper substrate 17 in this state. The light then passes through the upper phase plate 45 having negative optical anisotropy, to enter the quarter wave plate 44. The lower and upper quarter wave plates 41 and 44 are placed so that the slower axes thereof are orthogonal to each other. Therefore, a phase difference in the polarized light that has entered the quarter wave plate 44, which was given at the lower quarter wave plate 41, can be cancelled with the quarter wave plate 44, and thus the light resumes the original linearly polarized light. The polarized light coming from the upper quarter wave plate 44 is therefore linearly polarized light having the polarizing direction parallel with the transmission axis (polarizing axis) of the polarizing plate 40, and thus absorbed with the polarizing plate 43 of which the transmission axis is orthogonal to that of the polarizing plate 40. Accordingly, black display is provided.

During voltage application, in which the liquid crystal molecules in the liquid crystal layer 20 are tilted toward the horizontal direction from the direction vertical to the substrate plane, the incident circularly polarized light is changed to elliptically polarized light due to birefringence of the liquid crystal layer 20. The light then passes through the color filter layer 17, the phase plate 45 having negative optical anisotropy, and the quarter wave plate 44 as the elliptically polarized light. Accordingly, when reaching the polarizing plate 43, the light is not linearly polarized light orthogonal to the polarized component in the original incident light, and thus passes through the polarizing plate 43. That is to say, by adjusting the applied voltage, the degree of the tilt of the liquid crystal molecules can be controlled, and thus the amount of light allowed to pass through the polarizing plate 43 can be changed, to thereby enable grayscale display.

The phase plate having negative optical anisotropy minimizes the amount of change in phase difference occurring with change of the viewing angle when the liquid crystal molecules are in the vertically aligned state, and thus suppresses black floating observed when the display device is viewed at a wide viewing angle. In place of the combination of the phase plate having negative optical anisotropy and the quarter wave plate, a biaxial phase plate unifying the functions of both plates may be used.

According to the present invention, the normally black mode, which gives black display during non-voltage application and white display during voltage application, is implemented in axisymmetrically aligned domains. In this case, by placing a pair of quarter wave plates on the top and bottom of the LCD device (panel), an extinction pattern occurring due to the existence of the polarizing plates can be eliminated, and thus the brightness can be improved. In the case that the normally black mode is implemented in axisymmetrically aligned domains with upper and lower polarizing plates placed so that the transmission axes thereof are orthogonal to each other, it is theoretically possible to give black display of substantially the same level as that obtained when a pair of polarizing plates are placed in the crossed-Nicols state. Therefore, a considerably high contrast ratio can be obtained, and also, with the all-direction alignment of liquid crystal molecules, wide viewing angle characteristics can be attained.

Hereinafter, specific examples of Embodiment 1 of the present invention will be described.

EXAMPLE 1

An LCD device was fabricated using an active matrix substrate having the construction shown in FIG. 6 and a color filter substrate having a color filter layer, transparent dielectric layers 234 and a counter electrode placed to face the active matrix substrate.

In the active matrix substrate in this example, the interlayer insulating film and the wall structure were formed in the process described above under the following exposure conditions.

The first exposure step for forming the uneven shape and the wall structure on a positive photosensitive resin film was executed under a low exposure condition (60 mJ/cm$^2$) using the first photomask 52. The second exposure step for forming the contact holes and the like was executed under a high exposure condition (300 mJ/cm$^2$) using the second photomask 62. Thereafter, the series of steps described above were executed to obtain the active matrix substrate in this example. The baking after the development was made at 200° C. for one hour. As a result, the wall structure having a height of about 1.2 μm, a width of about 13 μm and a side slope tilt angle α of about 10° was obtained, and the crater-shaped cross section was given.

In the color filter substrate, the transparent dielectric layers were formed to give steps in the reflection regions. Supports (dielectric) for defining the thickness of the liquid crystal layer were formed in the shading region outside the pixels used for display.

The vertical alignment films were formed on the active matrix substrate and the color filter substrate under predetermined conditions (no rubbing was made). The two substrates were then bonded together via a sealing resin, and a liquid crystal material having negative dielectric anisotropy (refractive index anisotropy Δn: 0.1, dielectric constant anisotropy Δ∈: −4.5) was injected and sealed in the space between the substrates, to obtain a liquid crystal display panel. In this example, the thickness dt of the liquid crystal layer in the transmission regions was 4 μm, and the thickness dr thereof in the reflection regions was 2.1 μm.

Optical films were then placed on both surfaces of the liquid crystal display panel in the manner described below, to obtain an LCD device.

The LCD device of this example had a multilayer structure composed of a polarizing plate (observer side), a quarter wave plate (phase plate 1), a phase plate having negative optical anisotropy (phase plate 2 (NR plate)), the liquid crystal layer (on the upper and lower sides thereof, the color filter substrate and the active matrix substrate were respectively placed), a phase plate having negative optical anisotropy (phase plate 3 (NR plate)), a quarter wave plate (phase plate 4), and a polarizing plate (backlight side) in the order from the observer side. The upper and lower quarter wave plates (phase plates 1 and 4) were placed so that the slower axes thereof were orthogonal to each other, and had a phase difference of 140 nm. The phase plates having negative optical anisotropy (phase plates 2 and 3) had a phase difference of 135 nm. The two polarizing plates were placed so that the absorption axes thereof were orthogonal to each other.

A drive signal was applied to the thus-obtained LCD device (4V was applied across the liquid crystal layer) to evaluate the display characteristics.

Figure 12:
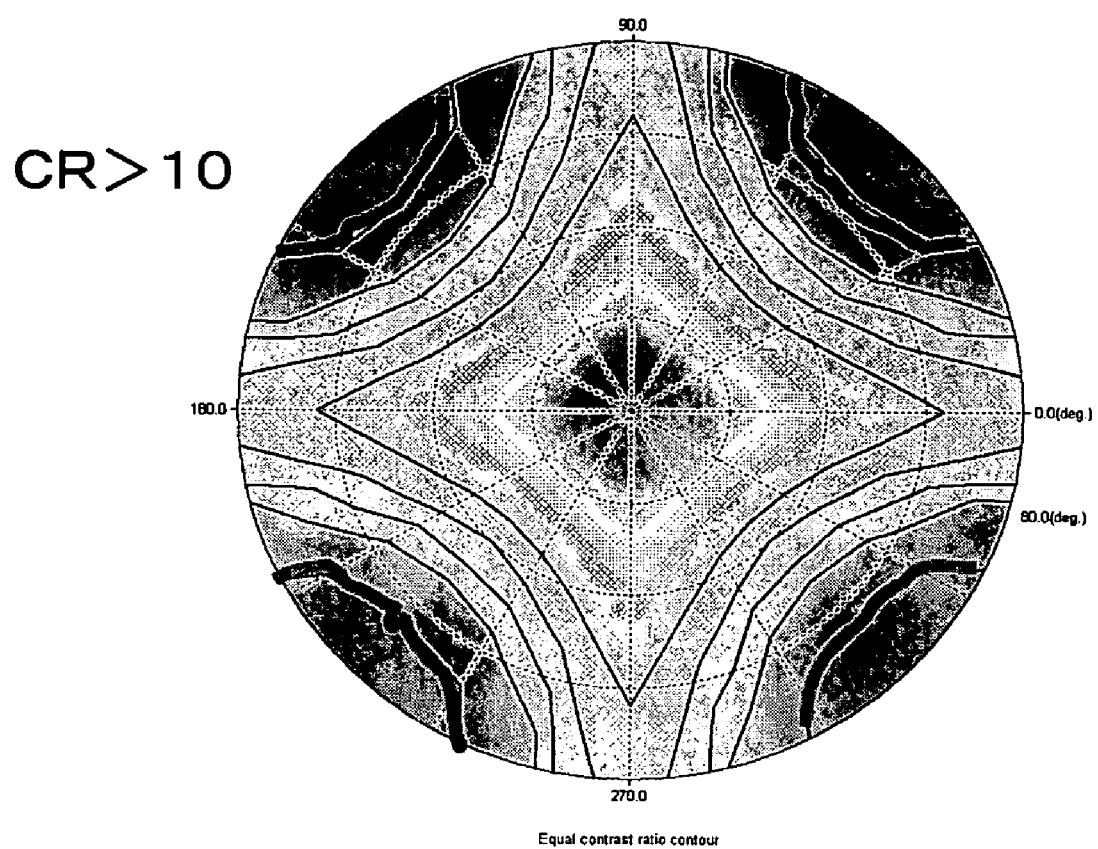
FIG. 12 is a view showing the visual angle-contrast ratio characteristics of an example of an LCD device of the present invention.

FIG. 12 shows the results of the visual angle-contrast characteristics in the transmission display. It was found from the results that the viewing angle characteristics in the transparent display were roughly symmetric in all directions, the range of CR>10 was as large as up to ±80°, and the transmission contrast was as high as 300:1 or more at the front.

As for the characteristics of the reflection display, the reflectance evaluated with a spectral calorimeter (CM2002 from Minolta Co., Ltd.) was about 8.6% (value in terms of the aperture ratio of 100%) with respect to a standard diffuse plate as the reference. The contrast value of the reflection display was 21, which was high compared with the case of the conventional LCD devices.

It was also found that the roughness in a grayscale level (level 2 in the eight levels of grayscale) was improved. The grayscale response time (the time required to change from level 3 to level 5 in the eight levels of grayscale) was 38 msec. These characteristics were equal to or higher than those of an LCD device having a wall structure formed, not integrally with the interlayer insulating film, but in a later step.

The alignment distorted when the display panel was pressed with a finger during application of 4V (white display) was recovered immediately after the pressing was stopped. Thus, the alignment stability in the axisymmetrically aligned domains was improved with the wall structure formed to substantially surround each pixel and the pixel electrode and the vertical alignment film formed on the crater-shaped surface continuous from the side faces of the wall-structure surrounding the pixel toward the center of the pixel.

In the case of having no crater-shaped cross section, the contrast ratio failed to reach 300:1, or alignment distortion with pressing occurred, in some cases, if the tilt angle of the side face of the wall structure exceeded 45°.

EXAMPLE 2

Prototype samples of transflective LCD devices having the structure shown in FIG. 9 were fabricated in substantially the same process as that described in Example 1. Table 1 below shows the diameter WL (μm) of the supports, the number of supports (pcs.) placed per regular unit (0.12 mm$^2$ in this example), the pitch PL (μm) of pixels in the longitudinal direction, and the placement density D of the supports per regular unit, given for the samples. Also shown in Table 1 are the evaluation results of the front contrast ratio during application of 4V and the shock resistance, for the liquid crystal panels of the samples. In the front contrast ratio, the set value and the lower-limit allowance were 300 and 270, respectively. In the shock resistance evaluation, the time required to recover the original alignment (return to the original alignment state) after pressing the panel with a force of 1 kgf/cm$^2$ was evaluated. The mark ○ represents the case that the normal alignment was restored from faulty alignment within one minute, the mark Δ represents the case that the normal alignment was restored in the time exceeding one minute but within five minutes, and the mark X represents the case that alignment distortion remained after the lapse of ten minutes.

TABLE 1

|  | WL (μm) | N (pcs.) | PL (μm) | D | Shock resistance | Front CR |
|---|---|---|---|---|---|---|
| Sample 1 | 8 | 1 | 160 | 0.05 | ◯ | 320 |
| Sample 2 | 6 | 1 | 200 | 0.03 | △ | 330 |
| Sample 3 | 8 | 4 | 150 | 0.21 | ◯ | 285 |
| Sample 4 | 10 | 6 | 200 | 0.3 | ◯ | 270 |
| Sample 5 | 3.6 | 1 | 380 | 0.009 | X | 305 |
| Sample 6 | 8.5 | 6 | 160 | 0.32 | ◯ | 245 |

As is found from the results of Table 1, when the placement density D of the supports per regular unit satisfies the relationship $0.01 \leq D \leq 0.3$, the original alignment is restored from faulty alignment caused by pressing, if any, within five minutes. Further, when the placement density D is within the range $0.05 \leq D \leq 0.2$, the restoration from faulty alignment can be done within one minute. All of the samples exhibiting excellent shock resistance have a front contrast ratio of 270 or more and thus have good display quality.

All of the samples, shown in Table 1 have a length of a wall gap (or a total length of wall gaps) existing along the circumference of one pixel of 40% or less of the length of the circumference of the pixel, and exhibit good response characteristics (for example, about 50 ms or less at room temperature in the change from level 3 to level 5 in eight levels of grayscale). If the length of the wall gap exceeds 60%, problems as follows may occur. That is, formation of sufficient axisymmetric alignment fails, and the response time is long (for example, about 150 ms or more at room temperature in the change from level 3 to level 5 in eight levels of grayscale) because the alignment in grayscale levels is not sufficiently stabilized.

Comparative Example 1

An ECB mode homogeneously aligned liquid crystal display panel having substantially the same construction as the liquid crystal panels of the above examples was fabricated. The liquid crystal display panel of Comparative Example 1 has neither a wall structure nor openings/cuts of the pixel electrodes. Also, in the liquid crystal display panel of Comparative Example 1, horizontal alignment films were formed in place of the vertical alignment films in the liquid crystal panels of the examples, and a liquid crystal material having positive dielectric anisotropy ($\Delta n$: 0.07, $\Delta \epsilon$: 8.5) was injected in the liquid crystal layer to form a homogeneously aligned liquid crystal layer. The thickness dt of the liquid crystal layer in the transmission regions was 4.3 μm, and the thickness dr thereof in the reflection regions was 2.3 μm.

Optical films each formed of a plurality of optical layers including a polarizing plate and a phase plate such as a quarter wave plate were placed on both surfaces of the liquid crystal display panel, to obtain an LCD device of Comparative Example 1.

A drive signal was applied to the LCD device of Comparative Example 1 (4V was applied across the liquid crystal layer) to evaluate the display characteristics by the same evaluation method as that described in the above examples.

As the viewing angle characteristics in the transmission display, the range of CR>10 was up to ±30°, and reverse gradation was eminent. The transmission contrast was 140:1. As for the characteristics of the reflection display, the reflectance was about 9.3% (value in terms of the aperture ratio of 100%) with respect to a standard diffuse plate as the reference. The contrast value of the reflection display was 8, and the display image was white-blurred and low in contrast compared with the above examples of the vertical alignment mode.

As described above, in the LCD devices of Embodiment 1 of the present invention, in which the vertical alignment mode is applied to transmission display and reflection display, a good contrast ratio can be obtained both in the transmission display and the reflection display, compared with the conventional homogeneously aligned LCD devices and the conventionally known technologies.

In addition, in Embodiment 1 of the present invention, the alignment regulating structure for liquid crystal domains (the wall structure and openings and/or cuts) is placed only on one substrate (in the illustrated examples, the active matrix substrate). Moreover, the wall structure can be formed integrally with the interlayer insulating film and also formed in a series of steps combined with the formation of fine projections and depressions in the reflection portions and the formation of the contact holes. This simplifies the fabrication process. With the alignment regulating force of the wall structure and the openings and/or cuts, the directions in which liquid crystal molecules fall during voltage application can be regulated in a non-rubbing process. As exemplified in Embodiment 1 of the present invention, by providing the alignment regulating structure for liquid crystal domains, a plurality of liquid crystal domains each exhibiting axisymmetric alignment during voltage application are formed for each pixel, and thus all-direction wide viewing angle characteristics can be attained.

Embodiment 2

Hereinafter, the LCD devices of Embodiment 2 of the present invention will be described concretely with reference to the relevant drawings.

(Transmissive Liquid Crystal Display Device)

Figure 13A:
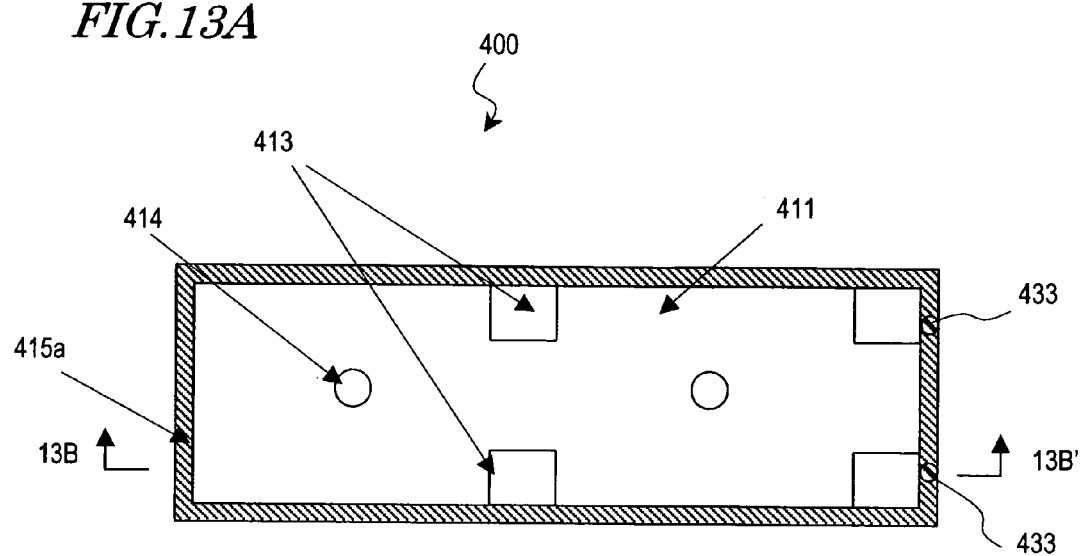
Figure 13B:
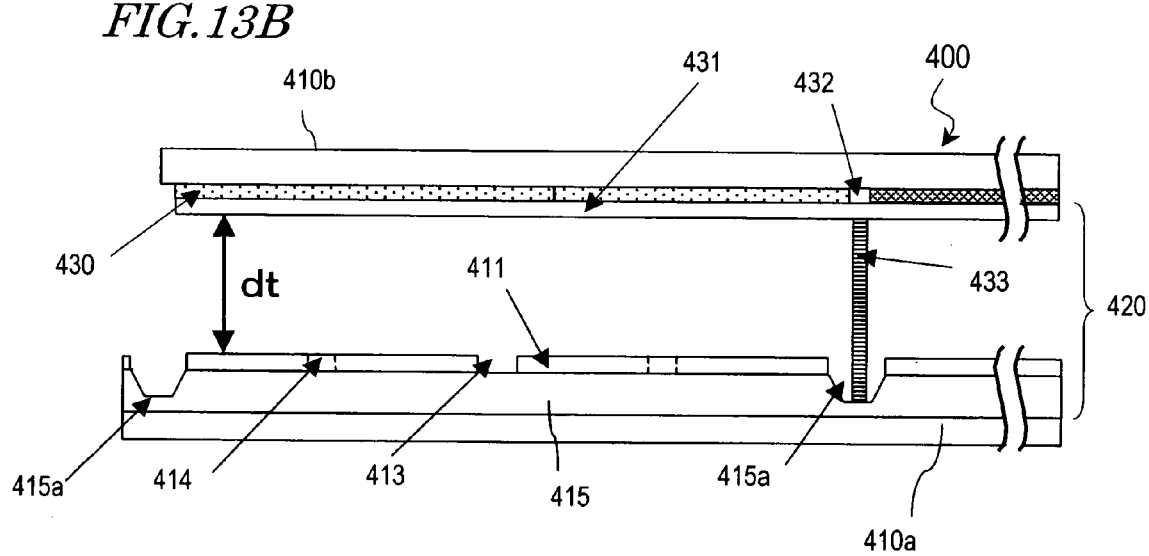

A transmissive LCD device 400 of Embodiment 2 of the present invention will be described with reference to FIGS. 13A and 13B. FIGS. 13A and 13B diagrammatically show one pixel of the transmissive LCD device 400, in which FIG. 13A is a plan view and FIG. 13B is a cross-sectional view taken along line 13B-13B' in FIG. 13A.

The LCD device 400 includes a transparent substrate (for example, a glass substrate) 410a, a transparent substrate 410b placed to face the transparent substrate 410a, and a vertically aligned liquid crystal layer 420 interposed between the transparent substrates 410a and 410b. Vertical alignment films (not shown) are formed on the surfaces of the substrates 410a and 410b facing the liquid crystal layer 420. During non-voltage application, therefore, liquid crystal molecules in the liquid crystal layer 420 are aligned roughly vertical to the surfaces of the vertical alignment films. The liquid crystal layer 420 includes a nematic liquid crystal material having negative dielectric anisotropy and also includes a chiral agent as required.

The LCD device 400 further includes pixel electrodes 411 formed on the transparent substrate 410a and a counter electrode 431 formed on the transparent substrate 410b. Each pixel electrode 411, the counter electrode 431 and the liquid crystal layer 420 interposed between these electrodes define a pixel. In the illustrated example, both the pixel electrodes 411 and the counter electrode 431 are formed of a transparent conductive layer (for example, an ITO layer). Typically, color filters 430 (the entire of the plurality of color filters may also be called a color filter layer 430) provided for the respective pixels, as well as a black matrix (shading layer) 432 provided in the gaps between the adjacent color filters 130, are formed on the surface of the transparent substrate 410b facing the liquid crystal layer 420, and the counter electrode 431 is formed on the color filters 430 and the black matrix 432. Alternatively, the color filters 430 and the black matrix 432 may be formed on the counter electrode 431 (on the surface thereof facing the liquid crystal layer 420).

The LCD device 400 has a shading region around each pixel, and a groove structure 415a extends on the transparent substrate 410a in the shading region. The groove structure 415a is formed on an interlayer insulating film 415 covering circuit elements (including not only active elements such as switching elements but also interconnections and electrodes; not shown in FIGS. 13A and 13B) formed on the transparent substrate 410a. In a transmissive LCD device having TFTs as circuit elements, for example, providing an interlayer insulating film permits overlap formation of pixel electrodes with gate signal lines and/or source signal lines, as will be described later, and this improves the aperture ratio.

The shading region as used herein refers to a region shaded from light due to the presence of TFTs, gate signal lines and source signal lines formed on the peripheries of the pixel electrodes 411 on the transparent substrate 410a, or the presence of the black matrix formed on the transparent substrate 410b, for example. Since this region does not contribute to display, the groove structure 415a formed in the shading region is free from adversely affecting the display.

The illustrated groove structure 415a is one continuous groove surrounding the pixel. Alternatively, the groove structure 415a may be composed of a plurality of separate grooves. The groove structure 415a, which serves to define a boundary of a liquid crystal domain located near the outer edge of the pixel, should preferably have a length of some extent. For example, when the groove structure is composed of a plurality of grooves, each groove is preferably longer than the gap between the adjacent grooves.

The illustrated pixel electrode 411 has two openings 414 and four cuts 413 formed at predetermined positions. When a predetermined voltage is applied across the liquid crystal layer, two liquid crystal domains each having axisymmetric alignment are formed, with the center axes of the axisymmetric alignment being in or near the openings 414. As will be described later, the openings 414 of the pixel electrode 411 act to fix the positions of the center axes of the axisymmetric alignment. The cuts 413, provided near the boundaries of the axisymmetrically aligned domains, define the directions in which liquid crystal molecules fall with an electric field, and thus act to form the axisymmetrically aligned domains. A tilt electric field is generated around the openings 414 and the cuts 413 with the application of a voltage between the pixel electrode 411 and the counter electrode 413. With this tilt electric field, the directions of tilt of liquid crystal molecules are defined, to enable the action described above. In the illustrated example, a total of four cuts 413 are given point-symmetrically with respect to the opening 414 (in this case, the right opening as viewed from FIG. 13A) corresponding to the center axis of a liquid crystal domain formed in the pixel (in this case, the entire pixel is a transmission region).

By providing the cuts 413 as described above, the directions in which liquid crystal molecules fall during voltage application are defined, allowing formation of two liquid crystal domains. The reason why no cuts are provided on the left side of the pixel electrode 411 as viewed from FIG. 13A is that substantially the same function is obtained from cuts provided on the right side of the adjacent pixel electrode (not shown) located left to the illustrated pixel electrode 411, and thus cuts, which may decrease the effective aperture ratio of the pixel, are omitted on the left side of the pixel electrode 411. Also, in the illustrated example, the groove structure 415a described above gives the alignment regulating force. Therefore, with no cuts provided on the left side of the pixel electrode 411, the resultant liquid crystal domain is as stable as a liquid crystal domain having such cuts.

Although a total of four cuts 413 were formed in the illustrated example, at least one cut between the adjacent liquid crystal domains is sufficient. For example, an elongate cut may be formed in the center of the pixel and the other cuts may be omitted.

The shape of the openings 414 formed to fix the center axes of the axisymmetrically aligned domains is preferably circular as illustrated although not limited to this. To exert roughly equal alignment regulating force in all directions, the shape is preferably a polygon having four or more sides and also preferably a regular polygon. The shape of the cuts 413 acting to define the directions in which liquid crystal molecules in the axisymmetrically aligned domains fall with the electric field is determined so that roughly equal alignment regulating force is exerted for the adjacent axisymmetrically aligned domains. For example, a square is preferred.

Supports 433 for defining the thickness of the liquid crystal layer 420 (also called the cell gap) are preferably formed in the shading region (in the illustrated example, the region defined by the black matrix 432) to avoid degradation in display quality due to the supports. Although the supports 433 are formed on the bottom of the groove structure 415a provided in the shading region in the illustrated example, the supports 433 may be formed on either transparent substrate 410a or 410b. In the case of forming the supports 433 on the bottom of the groove structure 415a, setting is made so that the value obtained by subtracting the depth of the groove structure 415a (the difference between the thickness of the portion of the interlayer insulating film 415 on which the groove structure 415a is formed and the thickness of the other portion of the interlayer insulating film 415) from the height of the supports 433 is equal to the thickness of the liquid crystal layer 420. If the supports 433 are formed in a region having no groove structure 415a, setting is made so that the height of the supports 433 is equal to the thickness of the liquid crystal layer 420. The supports 433 can be formed by photolithography using a photosensitive resin, for example.

In the LCD device 400, when a predetermined voltage (voltage equal to or higher than a threshold voltage) is applied between the pixel electrode 411 and the counter electrode 431, two axisymmetrically aligned domains with their center axes stabilized in or near the two openings 414 are formed. The pair of cuts 413 provided in the center of the pixel electrode 411 in the length direction define the directions in which liquid crystal molecules in the two adjacent liquid crystal domains fall with an electric field, while the groove structure 415a and the cuts 413 provided at corners of the pixel electrode 411 define the directions in which liquid crystal molecules in the portions of the liquid crystal domains located near the outer edges of the pixel fall with the electric field. The alignment regulating forces of the groove structure 415a, the openings 414 and the cuts 413 are considered to act cooperatively to stabilize the alignment of the liquid crystal domains.

On the surface of the transparent substrate 410a facing the liquid crystal layer 420, provided are active elements such as TFTs and circuit elements such as gate signal lines and source signal lines connected to TFTs (all of these elements are not shown). Herein, the transparent substrate 410a, together with the circuit elements, the pixel electrodes 411, the groove structure 415a, the supports 433, the alignment film and the like described above formed on the transparent substrate 410a, are collectively called an active matrix substrate in some cases. Likewise, the transparent substrate 410b, together with the color filter layer 430, the black matrix 432, the counter electrode 431, the alignment film and the like formed on the transparent substrate 410b, are collectively called a counter substrate or a color filter substrate in some cases.

Although omitted in the above description, the LCD device 400 further includes a pair of polarizing plates placed to face each other via the transparent substrates 410a and 410b. The polarizing plates are typically placed so that their transmission axes are orthogonal to each other. The LCD device 400 may further include a biaxial optical anisotropic medium layer and/or a uniaxial optical anisotropic medium layer, as will be described later.

Figure 14A:
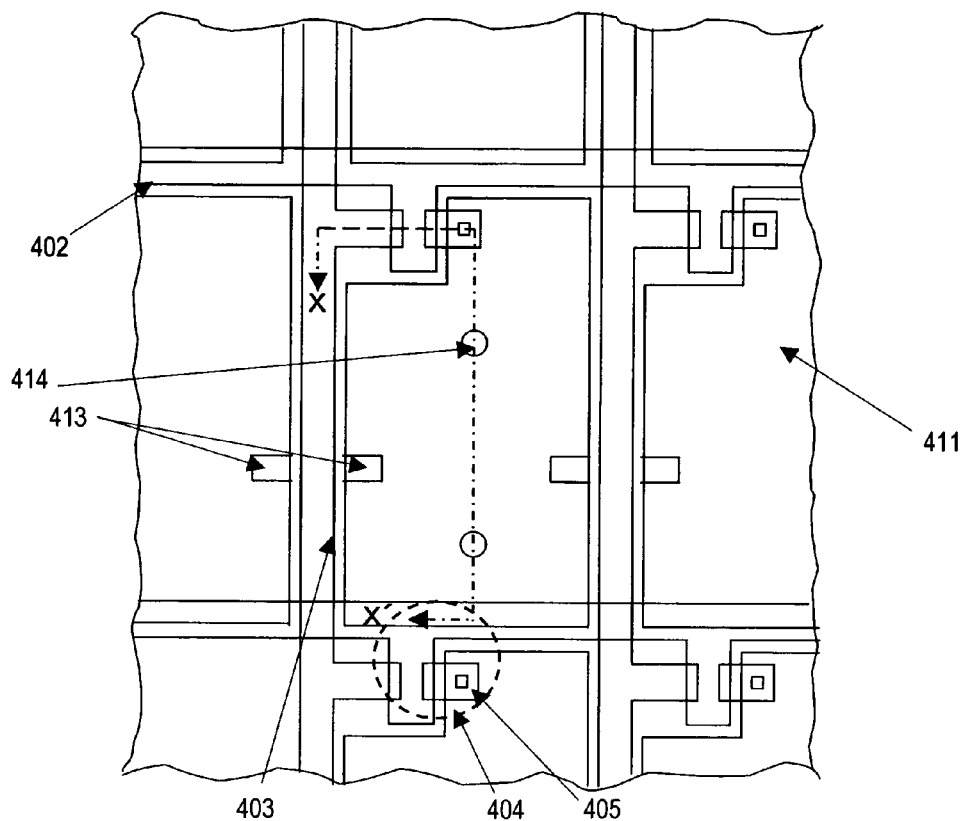
FIG. 14A is a plan view diagrammatically showing an active matrix substrate of a transmissive LCD device of Embodiment 2 of the present invention.
Figure 14B:
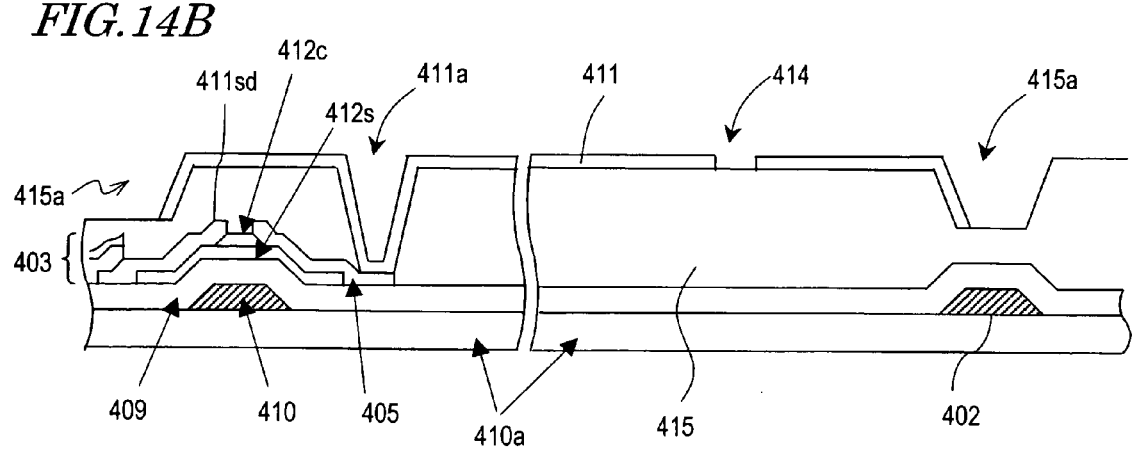
FIG. 14B is a cross-sectional view diagrammatically showing the active matrix substrate shown in FIG. 14A.

Next, referring to FIGS. 14A and 14B, an example of the structure of an active matrix substrate suitably used for the transmissive LCD device 400 will be described. FIG. 14A is a partial enlarged view of the active matrix substrate, and FIG. 14B is a cross-sectional view taken along line X-X' in FIG. 14A. The active matrix substrate shown in FIGS. 14A and 14B can be the same in construction as the active matrix substrate shown in FIGS. 13A and 13B, except that the number of the cuts 413 is small.

The active matrix substrate shown in FIGS. 14A and 14B has a transparent substrate 410a made of a glass substrate, for example. Gate signal lines 402 and source signal lines 403 run on the transparent substrate 410a to cross each other at right angles. TFTs 404 are formed near the crossings of these signal lines 402 and 403. Drain electrodes 405 of the TFTs 404 are connected to corresponding pixel electrodes 411.

The active matrix substrate has an interlayer insulating film 415 covering the gate signal lines 402, the source signal lines 403 and the TFTs 404. A groove structure 415a is formed on the interlayer insulating film 415. Such a groove structure 415a can therefore be formed together with contact holes in the same photolithography process during formation of the interlayer insulating film 415 using a photosensitive resin film 415, for example, and thus the fabrication process can be simpler than the conventional ones.

The pixel electrodes 411, which are transparent electrodes formed of a transparent conductive layer such as an ITO layer, are formed on the interlayer insulating film 415. Each pixel electrode 411 is connected, at a contact portion 411a thereof in a contact hole formed in the interlayer insulating film 415, to the corresponding drain electrode 405. Cuts 413 and openings 414 are formed at predetermined positions of the pixel electrode 411 for control of the alignment of axisymmetrically aligned domains as described above. In the illustrated example, the pixel electrode 411 extends down to on the side slope of the groove structure 415a formed on the interlayer insulating film 415. The pixel electrode 411 is not necessarily formed inside the groove structure 415a, but it is preferred to form the pixel electrode 411 down to on the side face of the groove structure 415a, covering part of the side face of the groove structure 415a, for the following reason.

If the pixel electrode 411 is not formed on the side slope of the groove structure 415a, alignment distortion of liquid crystal molecules tends to occur at the ends of the pixel electrode 411. If the entire inner surface of the groove structure 415a is covered with the pixel electrode 411, equipotential lines are formed in parallel along the surface of the groove structure 415a. Therefore, the groove structure 415a may fail to sufficiently exert its sidewall effect (effect of the step). In view of these, the pixel electrode 411 preferably extends to cover the side face, or part thereof, of the groove structure 415a.

The pixel electrode 411 overlaps the gate signal line for the next row via a gate insulating film 409. The TFT 404 has a multilayer structure including the gate insulating film 409, a semiconductor layer 412s, a channel protection layer 412c and an $n^+$-Si layer 411sd (source/drain electrodes) formed in this order on a gate electrode 410 branched from the gate signal line 402.

The illustrated TFT is of a bottom gate type. The TFT is not limited to this type, but a top gate type TFT may also be used. Any switching elements other than the TFT (for example, MIM) may also be used.

Figure 14C:
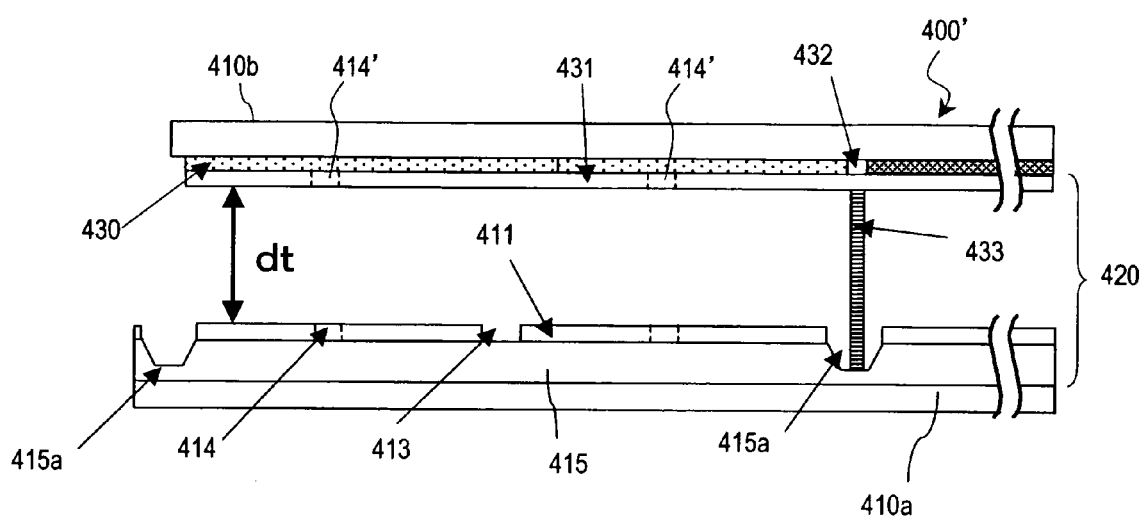
FIG. 14C is a cross-sectional view diagrammatically showing another transmissive LCD device of Embodiment 2 of the present invention.

In the LCD 400, the cuts 413 and the openings 414 are formed in the pixel electrodes 411 formed on the interlayer insulating film 415 having the groove structure 415a, and no alignment regulating structure is provided on the counter substrate 410b. This embodiment is therefore advantageous in that stable axisymmetrically aligned domains can be formed with such a simple construction. Alternatively, the counter substrate 410b may also be provided with an alignment regulating structure, as in an LCD device 400' shown in FIG. 14C, for example. With this construction, the alignment of liquid crystal molecules can be further stabilized.

The LCD device 400' is substantially the same in construction as the LCD device 400, except that the counter electrode 431 has openings 414'. Therefore, the common components are denoted by the same reference numerals, and the description thereof is omitted here.

The openings 414' formed in the counter electrode 431 are located at positions roughly overlapping the openings 414 of the pixel electrodes 411 as viewed from the normal to the substrate, and thus the plan view of the LCD device 400' is substantially the same as FIG. 13A. Each of the thus-formed openings 414' acts to fix/stabilize the center axis of the axisymmetric alignment together with the corresponding opening 414 of the pixel electrode 411. As a result, the alignment of the axisymmetrically aligned domains is further stabilized.

It is preferred not to provide a structural alignment regulating means such as a groove structure and projections on the counter substrate 410b. Unlike the openings and the cuts formed in the electrodes, formation of a groove structure and the like disadvantageously increases the fabrication steps and thus increases the cost. The cuts 413 is provided to define the directions in which liquid crystal molecules fall with an electric field cooperatively with the anchoring action of the side faces of the groove structure, unlike the openings acting to fix the center axes. Therefore, the cuts 413 are preferably provided only on the substrate 410a on which the groove structure 415a is placed.

(Transflective LCD Device)

Next, a transflective LCD device 500 of Embodiment 2 of the present invention will be described with reference to FIGS. 15A and 15B.

Figure 15A:
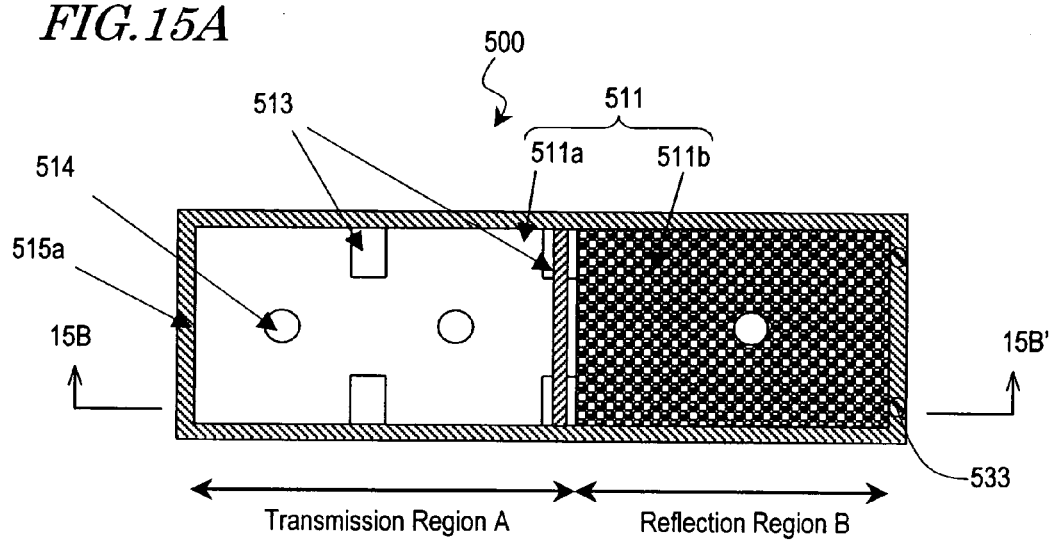
Figure 15B:
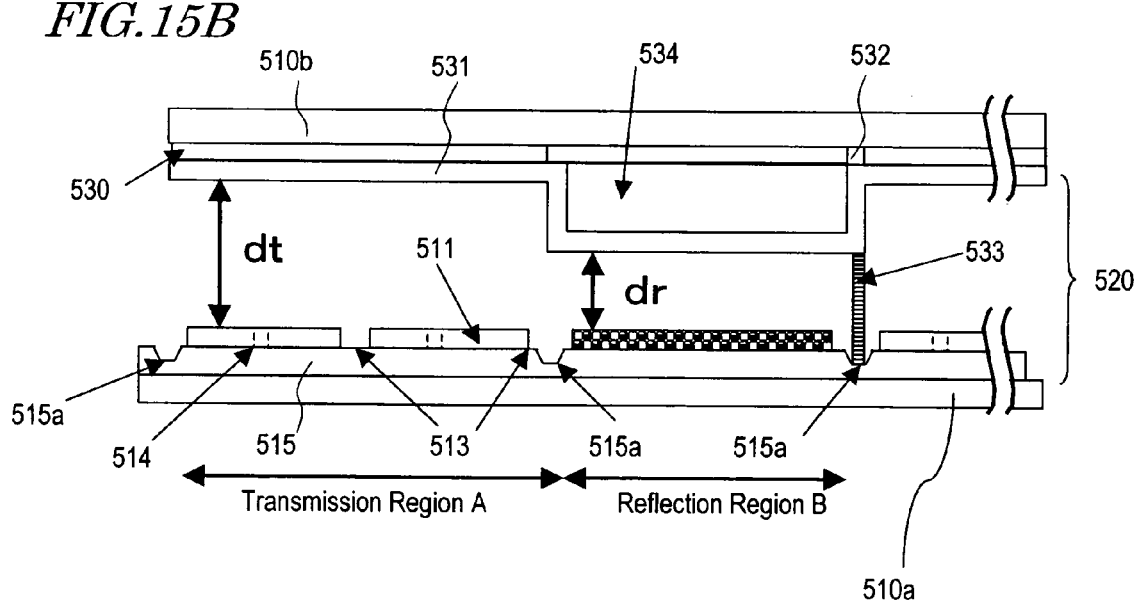

FIGS. 15A and 15B diagrammatically show one pixel of the transflective LCD device 500 of Embodiment 2 of the present invention, in which FIG. 15A is a plan view and FIG. 15B is a cross-sectional view taken along line 15B-15B' in FIG. 15A.

The LCD device 500 includes a transparent substrate (for example, a glass substrate) 510a, a transparent substrate 510b placed to face the transparent substrate 510a, and a vertically aligned liquid crystal layer 520 interposed between the transparent substrates 510a and 510b. Vertical alignment films (not shown) are formed on the surfaces of the substrates 510*a* and 510*b* facing the liquid crystal layer 520. During non-voltage application, therefore, liquid crystal molecules in the liquid crystal layer 520 are aligned roughly vertical to the surfaces of the vertical alignment films. The liquid crystal layer 520 includes a nematic liquid crystal material having negative dielectric anisotropy and also includes a chiral agent as required.

The LCD device 500 further includes pixel electrodes 511 formed on the transparent substrate 510*a* and a counter electrode 531 formed on the transparent substrate 510*b*. Each pixel electrode 511, the counter electrode 531 and the liquid crystal layer 520 interposed between these electrodes define a pixel. Circuit elements such as TFTs are formed on the transparent substrate 510*a* as will be described later. Herein, the transparent substrate 510*a* and the components formed thereon are collectively called an active matrix substrate 510*a* in some cases.

Typically, color filters 530 (the entire of the plurality of color filters may also be called a color filter layer 530) provided for the respective pixels, as well as a black matrix (shading layer) 532 formed in the gaps between the adjacent color filters 530, are formed on the surface of the transparent substrate 510*b* facing the liquid crystal layer 520, and the counter electrode 531 is formed on the color filters 530 and the black matrix 532. Alternatively, the color filters 530 and the black matrix 532 may be formed on the counter electrode 531 (on the surface thereof facing the liquid crystal layer 520). Herein, the transparent substrate 510*b* and the components formed thereon are collectively called a counter substrate (color filter substrate) 510*b* in some cases.

Each pixel electrode 511 includes a transparent electrode 511*a* formed of a transparent conductive layer (for example, an ITO layer) and a reflective electrode 511*b* formed of a metal layer (for example, an Al layer, an Al-including alloy layer, and a multilayer film including any of these layers). Having such a pixel electrode, each pixel includes a transmission region A defined by the transparent electrode 511*a* and a reflection region B defined by the reflective electrode 511*b*, to provide display in the transmission mode and display in the reflection mode, respectively.

The LCD device 500 has a shading region around each pixel, and a groove structure 510*a* extends on the transparent substrate 510*a* in the shading region. The groove structure 515*a* is formed on an interlayer insulating film 515*a* covering circuit elements (including not only active elements such as switching elements but also interconnections and electrodes; not shown in FIGS. 15A and 15B) formed on the transparent substrate 510*a*. In an LCD device having TFTs as circuit elements, for example, providing an interlayer insulating film permits overlap formation of pixel electrodes with gate signal lines and/or source signal lines, as will be described later, and this improves the aperture ratio.

Since the shading region around each pixel does not contribute to display, the groove structure 515*a* formed in the shading region is free from adversely affecting the display. The illustrated groove structure 515*a* is a continuous groove surrounding the pixel. Alternatively, the groove structure 515*a* may be composed of a plurality of separate grooves. The groove structure 515*a*, which serves to define a boundary of a liquid crystal domain located near the outer edge of the pixel, should preferably have a length of some extent. For example, when the groove structure 515*a* is composed of a plurality of grooves, each groove is preferably longer than the gap between the adjacent grooves.

The groove structure 515*a* of the LCD device 500 also extends along the boundary between the transmission region A and the reflection region B. This part of the groove structure 515*a* acts to regulate the alignment direction of liquid crystal molecules located at the boundary between the liquid crystal domain formed in the transmission region A and the liquid crystal domain formed in the reflection region B adjacent to each other. The alignment regulating force of this part of the groove structure 515*a* acts cooperatively with the tilt electric field generated near the pair of cuts 513 formed at the boundary between the transmission region A and the reflection region B, to enable liquid crystal molecules in the liquid crystal domains to be aligned axisymmetrically. Note that since the placement of the groove structure 515*a* along the boundary between the transmission region A and the reflection region B may lower the contrast ratio of the transmission-mode display, this placement may be omitted. No groove structure is placed along the boundary between the adjacent liquid crystal domains in the transmission region A for the reason of preventing lowering of the contrast ratio of the transmission-mode display. As required, however, the groove structure 515*a* may also be placed along this boundary. Such part of the groove structure 515*a* placed inside the pixel may be formed integrally with, or may be separated from, the groove structure 515*a* formed around the pixel.

The illustrated pixel electrode 511 has three openings 514 and four cuts 513 formed at predetermined positions. When a predetermined voltage is applied across the liquid crystal layer, three liquid crystal domains each having axisymmetric alignment are formed, with the center axes of the axisymmetric alignment being in or near the openings 514. As will be described later, the openings 514 of the pixel electrode 511 act to fix the positions of the center axes of the axisymmetric alignment. The cuts 513 act to define the directions in which liquid crystal molecules in the axisymmetrically aligned domains fall with an electric field. A tilt electric field is generated around the openings 514 and the cuts 513 with the application of a voltage between the pixel electrode 511 and the counter electrode 513. With this tilt electric field, the directions of tilt of liquid crystal molecules are defined, to enable the action described above. In the illustrated example, a total of four cuts 513 are given point-symmetrically with respect to the opening (in the illustrated example, the center opening in FIG. 15A) corresponding to the center axis of a liquid crystal domain formed in the transmission region A of the pixel. With these cuts 513, the directions in which liquid crystal molecules fall during voltage application are defined, resulting in formation of three liquid crystal domains. The positions and preferred shapes of the openings 514 and the cuts 513 are the same as those described above in relation to the transmissive LCD device 400. In the example illustrated in FIGS. 15A and 15B, the transmission region A has two liquid crystal domains and the reflection region B has one liquid crystal domain. However, the arrangement is not limited to this. Each liquid crystal domain is preferably roughly square in shape from the standpoint of the viewing angle characteristics and the stability of alignment.

Supports 533 for defining the thickness of the liquid crystal layer 520 (also called the cell gap) should preferably be formed in the shading region (in the illustrated example, the region defined by the black matrix 532) to avoid degradation of the display quality due to the supports. Although the supports 533 are formed on the bottom of the groove structure 515*a* provided in the shading region in the illustrated example, the supports 533 may be formed on either transparent substrate 510*a* or 510*b*. In the case of forming the supports 533 on the bottom of the groove structure 515*a*, setting is made so that the value obtained by subtracting the depth of the groove structure 515*a* (the difference between the thickness of the portion of the interlayer insulating film 515 on which the groove structure 515a is formed and the thickness of the other portion of the interlayer insulating film 515) from the height of the supports 533 is equal to the thickness of the liquid crystal layer 520. If the supports 533 are formed in a region having no groove structure 515a, setting is made so that the height of the supports 533 is equal to the thickness of the liquid crystal layer 520.

In the LCD device 500, when a predetermined voltage (voltage equal to or higher than a threshold voltage) is applied between the pixel electrode 511 and the counter electrode 531, three axisymmetrically aligned domains with their center axes stabilized in or near the three openings 514 are formed. The four cuts 513 provided in the pixel electrode 511 define the directions in which liquid crystal molecules in the three adjacent liquid crystal domains fall with an electric field, and the groove structure 515a placed around the pixel stabilizes boundaries of the liquid crystal domains located near the outer edges of the pixel. Also, the groove structure 515a placed along the boundary between the transmission region A and the reflection region B stabilizes the boundary between the liquid crystal domain formed in the transmission region A and the liquid crystal domain formed in the reflection region B.

A preferred construction specific to the transflective LCD device 500 permitting both the transmission-mode display and the reflection-mode display will be described.

While light used for display passes through the liquid crystal layer 520 once in the transmission-mode display, it passes through the liquid crystal layer 520 twice in the reflection-mode display. Accordingly, as diagrammatically shown in FIG. 15B, the thickness dt of the liquid crystal layer 520 in the transmission region A is preferably set roughly double the thickness dr of the liquid crystal layer 520 in the reflection region B. By setting in this way, the retardation given to the light by the liquid crystal layer 520 can be roughly the same in both display modes. Most preferably, dr=0.5dt should be satisfied, but good display is secured in both display modes as long as 0.3dt<dr<0.7dt is satisfied. Naturally, dt=dr may be satisfied depending on the use.

In the LCD device 500, a transparent dielectric layer 534 is provided on the glass substrate 510b only in the reflection region B to make the thickness of the liquid crystal layer 520 in the reflection region B smaller than that in the transmission region A. This construction eliminates the necessity of providing a step by forming an insulating film and the like under the reflective electrode 511b, and thus has an advantage of simplifying the fabrication of the active matrix substrate 510a. If the reflective electrode 511b is formed on such an insulting film provided to give a step for adjusting the thickness of the liquid crystal layer 520, light used for transmission display will be shaded with the reflective electrode covering a slope (tapered face) of the insulating film, or light reflected from the reflective electrode formed on a slope of the insulating film will repeat internal reflection and such reflected light fails to be effectively used for reflection display. By adopting the construction described above, occurrence of such problems is prevented, and thus the light use efficiency can be improved.

If the transparent dielectric layer 534 is provided with a function of scattering light (diffuse reflection function), white display close to good paper white can be attained without the necessity of providing the reflective electrode 511b with the diffuse reflection function. Such white display close to paper white can also be attained by making the surface of the reflective electrode 511b uneven, and in this case, no light scattering function is necessary for the transparent dielectric layer 534. However, the uneven surface may fail to stabilize the position of the center axis of the axisymmetric alignment depending on the shape of the uneven surface. On the contrary, by combining the transparent dielectric layer 534 having the light scattering function and the reflective electrode 511b having a flat surface, the position of the center axis can be stabilized with the opening 514 formed in the reflective electrode 511b more reliably. Note that in the case of making the surface of the reflective electrode 511b uneven to provide the reflective electrode 511b with the diffuse reflection function, the uneven shape is preferably a continuous wave shape to prevent occurrence of an interference color, and such a shape is preferably set so that the center axis of the axisymmetric alignment can be stabilized.

While light used for display passes through the color filter layer 530 once in the transmission-mode display, it passes through the color filter layer 530 twice in the reflection-mode display. Accordingly, if the color filter layer 530 has the same optical density both in the transmission region A and the reflection region B, the color purity and/or the luminance may decrease in the reflection mode. To suppress occurrence of this problem, the optical density of the color filter layer in the reflection region is preferably made lower than that in the transmission region. The optical density as used herein is a characteristic value characterizing the color filter layer. For example, the optical density can be reduced by reducing the thickness of the color filter layer. Otherwise, the optical density can be reduced by reducing the density of a pigment added, for example, while keeping the thickness of the color filter layer unchanged.

Figure 16:
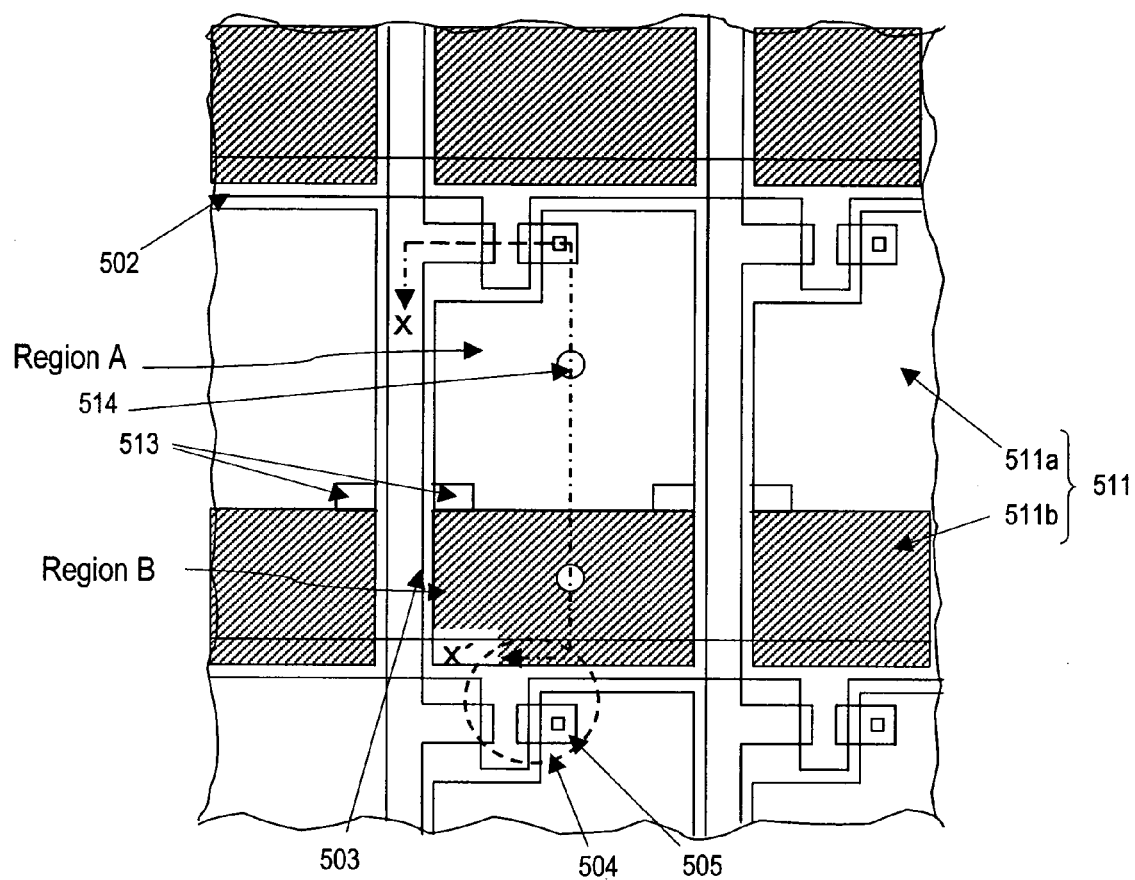
FIG. 16 is a plan view diagrammatically showing an active matrix substrate of a transflective LCD device of Embodiment 2 of the present invention.
Figure 17:
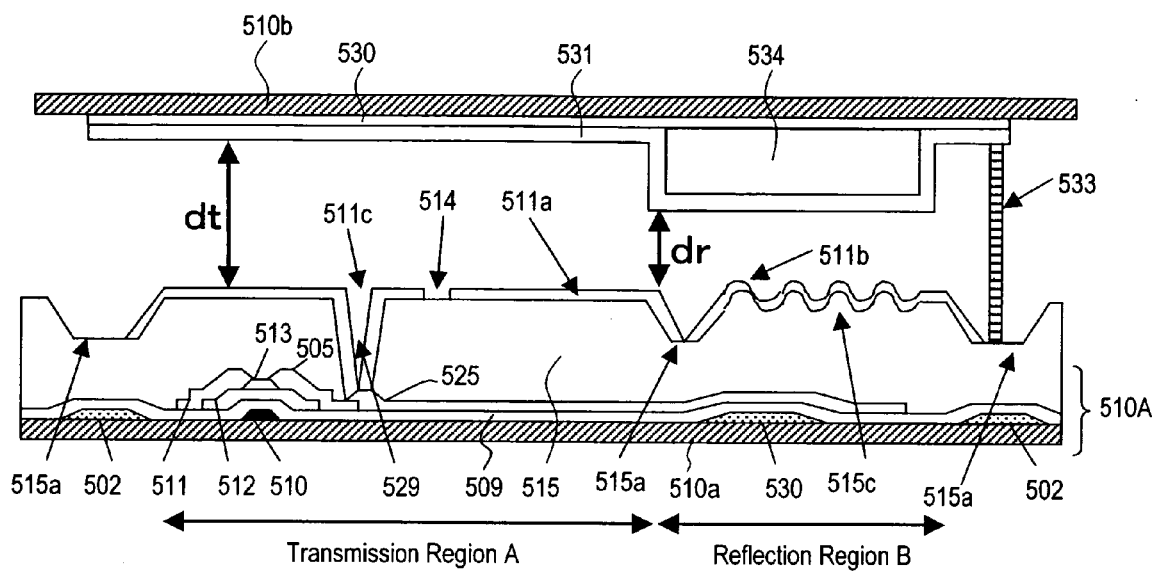
FIG. 17 is a cross-sectional view diagrammatically showing an LCD device provided with the active matrix substrate shown in FIG. 16.

Next, referring to FIGS. 16 and 17, an example of the structure of an active matrix substrate suitably used for the transflective LCD device will be described. FIG. 16 is a partial enlarged view of the active matrix substrate, and FIG. 17 is a cross-sectional view taken along line X-X' in FIG. 16. The active matrix substrate shown in FIGS. 16 and 17 can be the same in construction as the active matrix substrate shown in FIGS. 15A and 15B, except that one liquid crystal domain is formed in the transmission region A (that is, the numbers of the openings 514 and the cuts 513 are reduced). Thus, the common components are denoted by the same reference numerals.

The active matrix substrate shown in FIGS. 16 and 17 has a transparent substrate 510a made of a glass substrate, for example. Gate signal lines 502 and source signal lines 503 run on the transparent substrate 510a to cross each other at right angles. TFTs 504 are formed near the crossings of these signal lines 502 and 503. Drain electrodes 505 of the TFTs 504 are connected to corresponding pixel electrodes 511.

Each of the pixel electrodes 511 includes a transparent electrode 511a made of a transparent conductive layer such as an ITO layer and a reflective electrode 511b made of Al and the like. The transparent electrode 511a defines a transmission region A, and the reflective electrode 511b defines a reflection region B. A transparent dielectric layer may be formed on the reflective electrode 511b as required.

The pixel electrodes 511 are formed on an interlayer insulating film 515a. Each pixel electrode 511 (transparent electrode 511a) is connected, at a contact portion 511c thereof in a contact hole 529 formed in the interlayer insulating film 515, to a connection electrode 525 that is connected to the drain electrode 505. The reflective electrode 511b is connected to the transparent electrode 511a.

The pixel electrode 511 may extend down to on the slopes of a groove structure 515a formed on the interlayer insulating film 515 as shown in FIG. 17, but may not extend.

Cuts 513 and openings 514 are formed at predetermined positions of the pixel electrode 511 for control of the alignment of axisymmetrically aligned domains as described above. The connection electrode 525 constitutes a storage capacitance together with a storage capacitance line (storage capacitance electrode) 530 formed to face the connection electrode 525 via a gate insulating film 509. The storage capacitance line runs in parallel with the gate signal line 502 under the reflective electrode 511b, for example. The same signal (common signal) as that applied to the counter electrode formed on the color filter substrate, for example, is applied to the storage capacitance line. Although the storage capacitance line 530 is formed under the reflective electrode 511b in the illustrated example, the storage capacitance line 530 may be formed along the boundary between the transmission region A and the reflection region B, to suppress occurrence of light leakage around the groove structure 515a that may be placed along the boundary between the transmission region A and the reflection region B.

The reflective electrode 511b of the transflective LCD device of this embodiment has the surface of an uneven shape, and thus exhibits excellent diffuse reflection characteristics. The uneven shape of the surface of the reflective electrode 511b is a reflection of an uneven shape given to the surface of the interlayer insulating film 515.

The interlayer insulating film 515, having the groove structure 515a, also has a region having an essentially flat surface (called a "first region" in some cases) and a region having an uneven surface (called a "second region" in some cases). The transparent electrode 511a is formed on the first region having a flat surface, and the reflective electrode 511b is formed on the second region having an uneven surface. Such an interlayer insulating film 515a having the groove structure 515a and an uneven portion 515a can be formed from a single photosensitive resin film in a series of photolithography steps, as will be described later, and thus the fabrication process can be simpler than the conventional ones.

The pixel electrode 511 overlaps the gate signal line 502 for the next row via the gate insulating film 509. The TFT 504 has a multilayer structure including the gate insulating film 509, a semiconductor layer 512s, a channel protection layer 512c and an n+-Si layer 511sd (source/drain electrodes) formed in this order on a gate electrode 510 branched from the gate signal line 502.

The illustrated TFT is of a bottom gate type. The TFT is not limited to this type, but a top gate type TFT can also be used. Any switching elements other than the TFT (for example, MIM) may also be used.

As described above, like the LCD 400, the LCD 500 having the construction shown in FIGS. 15A and 15B has the effect that the alignment of liquid crystal molecules can be stabilized sufficiently with a comparatively simple construction having the axisymmetric alignment regulating structure formed on only one substrate (that is, the openings 513, the cuts 514 and the groove structure 515a formed on the pixel electrodes 511). As in the transmissive LCD device 400' shown in FIG. 14C, the transflective LCD device 500 may be provided with an alignment regulating structure also on the counter substrate, to thereby further stabilize the alignment. Note however that for the reason described above, the alignment regulating structure provided on the counter substrate preferably includes only openings for fixing the center axes of the axisymmetric alignment.

Also, in the LCD device 500, the display brightness and color purity in both the transmission mode and the reflection mode can be improved by forming the transparent dielectric layer 534 and/or the color filter layer 530 in the manner described above.

Hereinafter, an example of the entire arrangement of the groove structure 515a in the display region will be described with reference to FIG. 18.

The interlayer insulating film 515 is formed over the entire surface of the transparent substrate 510a, except for the contact holes for electrically connecting the pixel electrodes 511 formed on the interlayer insulating film 515 to the drain electrodes of the corresponding TFTs. The interlayer insulating film 515 covers the circuit elements (such as the TFTs, the gate signal lines and the source signal lines) formed on the transparent substrate 510a as described above. The groove structure 515a is formed at least to surround the pixel electrodes 511 arranged in a matrix. In the illustrated example, the groove structure 515a is of a lattice shape having grooves extending in the directions crossing each other (some extend in parallel with the source signal lines and the others extend in parallel with the gate signal lines). Although not shown in FIG. 18, the groove structure 515a may also be placed along the boundary between the transparent electrode 511a and the reflective electrode 511b of each pixel as described above. In this case, in which the groove structure 515a exists also inside each pixel, the groove structure 515a is preferably placed to extend along above a metal line such as the storage capacitance line to suppress occurrence of light leakage around the groove structure 515a.

The thickness of the interlayer insulating film 515 is preferably in the range of 2.0 μm to 3.5 μm, and the depth of the groove structure 515a is preferably 0.5 μm or more to ensure sufficient alignment regulating force. It is preferred to secure a thickness of 2.0 μm or more for the portions of the interlayer insulating film 515 located above the source signal lines and the gate signal lines. With this thickness, a parasitic capacitance that may be formed between such a signal line and the pixel electrode 511 can be kept sufficiently small even when the pixel electrode 511 is formed to extend down to on the side slope of the groove structure 515a, and thus will not adversely affect the display. The angle of the side slope of the groove structure 515a (angle with respect to the substrate surface) is preferably in the range of 5° to 70°. The side slope having an angle in this range permits stable formation of the vertical alignment film thereon and also enables effective tilt alignment of liquid crystal molecules during voltage application.

Next, referring to FIGS. 19A to 19F, a method for forming the interlayer insulating film 515 having the groove structure 515a will be described in detail. Note that in FIGS. 19A to 19F, the transparent substrate 510a and the circuit elements such as the TFTs and the signal lines formed on the transparent substrate 510a are collectively called a "circuit substrate 510A".

Figure 19A:
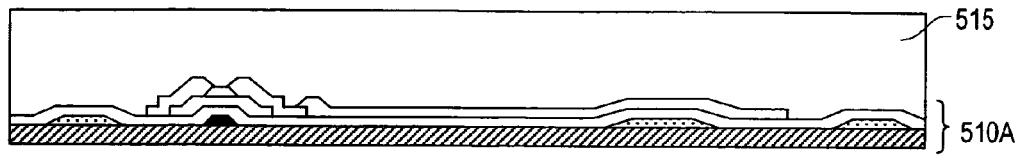
FIGS. 19A to 19F are diagrammatic views for demonstrating a fabrication method for the active matrix substrate.

First, as shown in FIG. 19A, the circuit substrate 510A having predetermined circuit elements such as TFTs formed therein is prepared, and a positive photosensitive resin film 515 (for example, OFPR-800 from Tokyo Ohka Kogyo Co., LTD.) is formed to a thickness of 4.5 μm, for example, to cover the circuit elements.

Figure 19B:
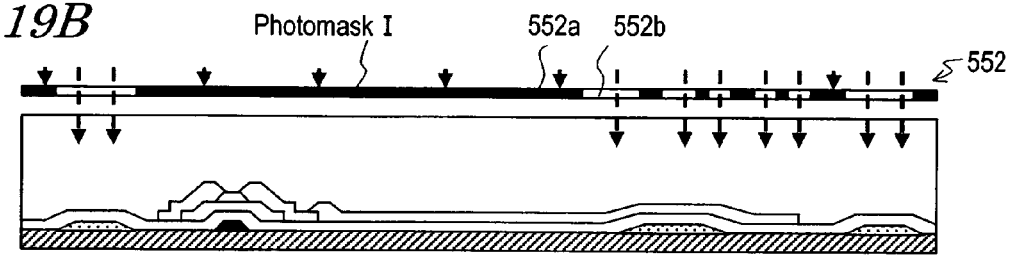

As shown in FIG. 19B, the photosensitive resin film is exposed to light. In this light exposure, regions having different exposures are formed in the photosensitive resin film. That is, the exposure is changed among regions that are to be the groove structure 515a (for example, regions shaded with source signal lines, gate signal lines and the like), regions of which the surfaces are made uneven (regions on which the reflective electrodes are formed), and regions in which the contact holes are formed.

Specifically, the photosensitive resin film 515 is exposed to light via a photomask 552 having shading portions 552a and transmitting portions 552b. The shading portions 552a correspond to projections (projections of the uneven surfaces) formed in the reflection regions and the flat portions of the transmission regions. The transmitting portions 552b correspond to the groove structure 515a and the remaining portions of the reflection regions including depressions of the uneven surface. The shading portions 552a for projections in the reflection regions, each in the shape of a circle or a polygon, for example, are arranged randomly at predetermined inter-center intervals (5 to 30 μm) at a predetermined density. The arrangement of projections should be to such a degree of randomness that will not cause an interference color. An extra-high voltage mercury lamp (for example, i-line illuminance: 20 to 50 mW), for example, is used as the light source, to perform uniform exposure (illumination time: 1 to 4 seconds). The exposure is preferably about 20 to 100 mJ/cm$^2$. Also, the transmittance of the transmitting portions 552b is preferably adjusted so that the exposure for the positions corresponding to the groove structure 515a is made different from the exposure for the positions corresponding to the depressions formed in the reflection regions. For example, while the exposure for the positions corresponding to the depressions in the reflection regions is set at a comparatively low value of about 50 mJ/cm$^2$ in terms of i lines, the exposure for the positions corresponding to the groove structure is set at about 100 mJ/cm$^2$, to enable formation of the groove structure that is deeper than the depressions formed in the reflection regions.

Figure 19C:
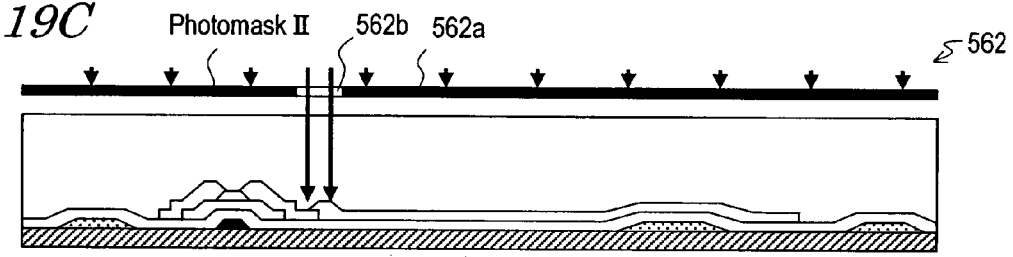

As shown in FIG. 19C, the photosensitive resin film 515 is uniformly exposed to light via a photomask 562 having transmitting portions 562b corresponding to the contact holes and shading portions 562a for the remaining portions (illumination time: 10 to 15 seconds). The exposure is preferably about 200 to 500 mJ/cm$^2$.

Figure 19D:
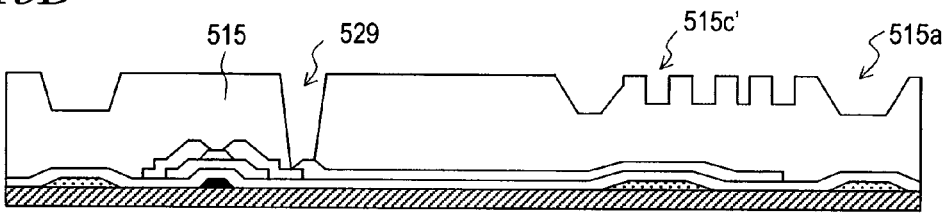

As shown in FIG. 19D, the photosensitive resin film 515 is developed with a tetramethylammonium hydroxide (TMAH) developer, for example, under predetermined conditions. For example, the regions of the resin film subjected to a high exposure are completely removed (the contact holes are formed), the regions of the resin film subjected to no exposure are left by about 90% (the flat portions and the projections are formed), and the regions of the resin film subjected to a low exposure are left by about 40% (the groove structure 515a and the depressions in the reflection regions are formed).

Figure 19E:
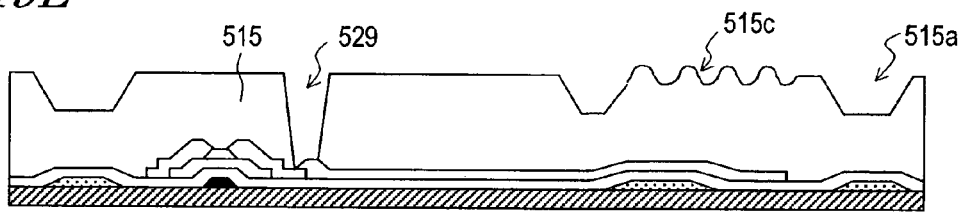

As shown in FIG. 19E, the resultant photosensitive resin film 515 are dried and baked as required. The baking is made at 200° C., for example. With this baking, the portions of the resin in the reflection regions having a plurality of minute projections, denoted by 515c', are changed to the mildly uneven portions 515c by thermal deformation and the like. The reflective electrodes 511b having such a mildly uneven surface can suppress occurrence of an interference color and thus exhibit good diffuse reflection characteristics.

As described above, by performing the combined continuous exposure steps and the subsequent development step, obtained is the interlayer insulating film 515 having the groove structure 515a, the uneven portions 515c having fine projections and depressions, and the contact holes 529.

In the exposure steps described above, the regions having different exposures were formed by adjusting the illumination time with regions and using the photomasks having transmitting portions and shading portions. Alternatively, the exposure may be made with a grayscale mask having a continuously varying gradation pattern, to form an interlayer insulating film of which the surface has a continuously varying shape.

Otherwise, in the exposure steps, exposure for formation of the groove structure may be performed with a third photomask having transmitting portions only at positions corresponding to the groove structure, immediately before the exposure step for formation of the contact holes.

Figure 19F:
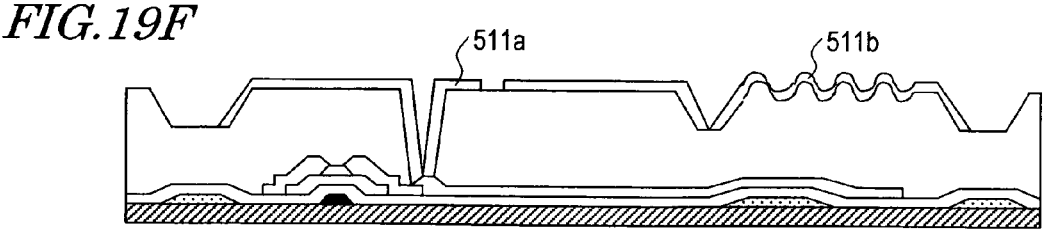

As shown in FIG. 19F, the pixel electrodes 511 are formed on the interlayer insulating film 515 formed in the steps described above. For example, the transparent electrodes 511a are formed by depositing a transparent conductive film (for example, an ITO film) to a predetermined thickness (for example, 100 nm) by sputtering and patterning the deposited film. The reflective electrodes 511b are formed by depositing a reflective electrode film (for example, an Al thin film) to a predetermined thickness (for example, 180 nm) by sputtering and patterning the deposited film. During the formation of the electrodes 511a and 511b, the openings and/or the cuts are formed.

In this embodiment, the groove structure 515a and the fine projections and depressions in the reflection regions are formed on the interlayer insulating film 515, and the pixel electrodes are formed on this film. It is therefore possible to place the pixel electrodes on the groove structure 515a, in particular, on the side slopes of the groove structure 515a on the pixel side.

A transparent electrode film may be formed on each reflective electrode 511b as required. Formation of such a transparent electrode film can reduce a difference in potential difference (electrode potential difference) between the reflection regions and the transmission regions. The material used for such a transparent electrode film is preferably the same as that for the transparent electrodes 511a.

As described above, in the fabrication method of this embodiment, the uneven surfaces for giving the diffuse reflection characteristics and the groove structure as the alignment control structure can be formed by only performing the photolithography process for a single photosensitive resin film. Thus, effective cost reduction is attained.

Vertical alignment films are formed on the thus-obtained active matrix substrate and the counter substrate (color filter substrate) under predetermined conditions. These substrates are then bonded together via a sealing resin, and a liquid crystal material having negative dielectric anisotropy is sealed in the gap between the substrates, to obtain the LCD device of the present invention. Known methods can be employed to implement these fabrication steps, and thus description thereof is omitted here.

The fabrication method for the transflective LCD device was exemplified to describe the fabrication method of the present invention. Naturally, the technology of forming the groove structure, as an alignment regulating structure for liquid crystal domains, the contact holes and the like together during formation of the interlayer insulating film in combined continuous process steps can also be applied to the fabrication of transmissive LCD devices and reflective LCD devices. By adopting this technology, the process can be made simpler than conventionally attained, providing the effects such as cost reduction and reduction of the tact time.

[Operation Principle]

The reason why the LCD device having a vertically aligned liquid crystal layer of Embodiment 2 of the present invention has excellent wide viewing angle characteristics will be described with reference to FIGS. 20A and 20B.

Figure 20A:
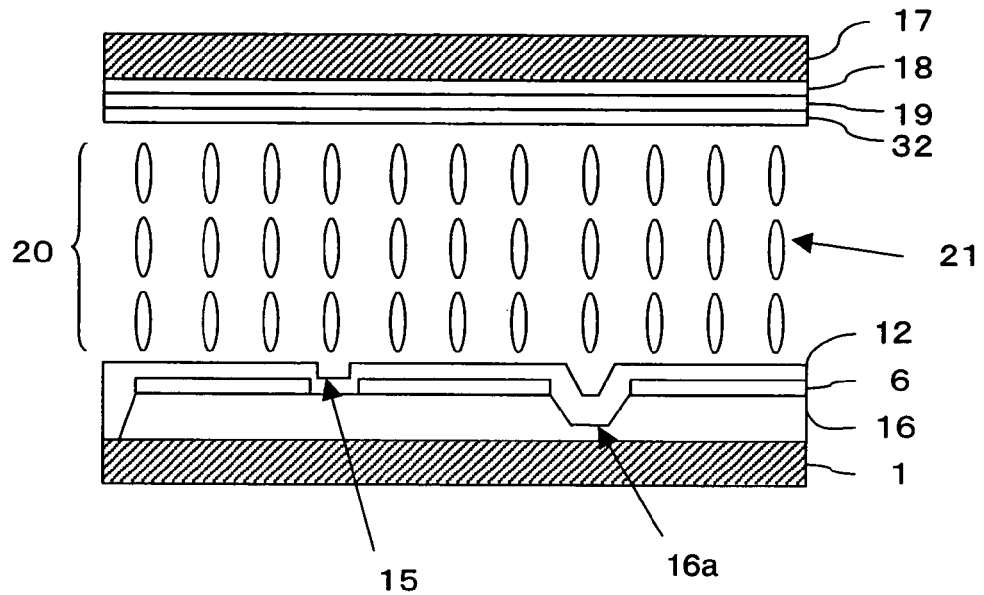
Figure 20B:
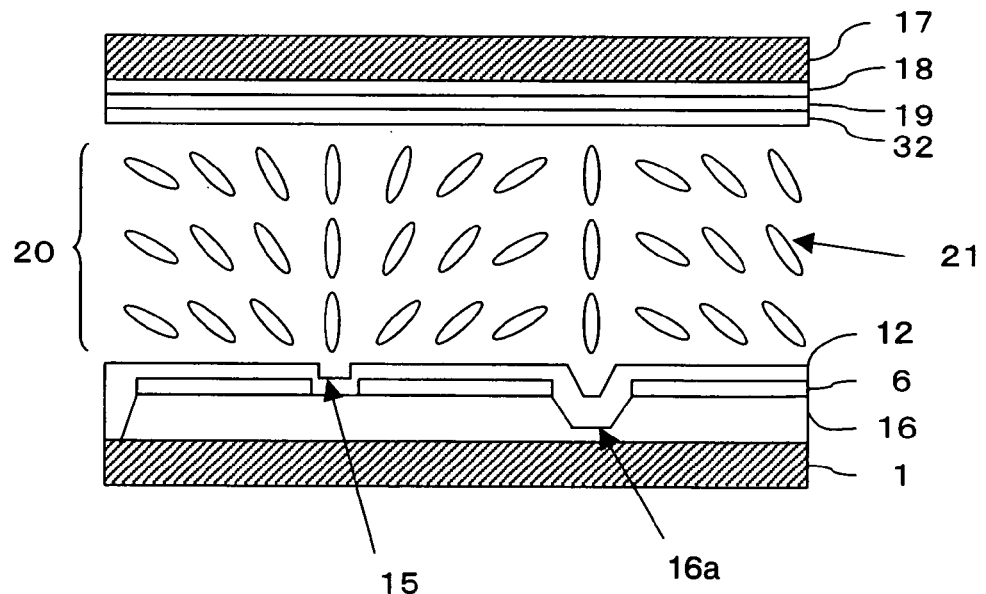

FIGS. 20A and 20B are views for demonstrating how the alignment regulating force of a groove structure 16a formed on an interlayer insulating film 16 and an opening 15 formed in a pixel electrode 6 act, in which FIG. 20A diagrammatically shows the aligned state of liquid crystal molecules during non-voltage application and FIG. 20B diagrammatically shows that during voltage application. The state shown in FIG. 20B is for display of a grayscale level.

The LCD device shown in FIGS. 20A and 20B includes the interlayer insulating film 16 having the groove structure 16a, the pixel electrode 6 having the opening 15 and an alignment film 12 formed in this order on a transparent substrate 1. Circuit elements (not shown) such as switching elements are formed on the transparent substrate 1. The LCD device also includes a color filter layer 18, a counter electrode 19 and an alignment film 32 formed in this order on another transparent substrate 17. A liquid crystal layer 20 interposed between the two substrates includes liquid crystal molecules 21 having negative dielectric anisotropy.

As shown in FIG. 20A, during non-voltage application, the liquid crystal molecules 21 are aligned roughly vertical to the substrate surface with the alignment regulating force of the vertical alignment films 12 and 32. Although omitted in FIG. 20A for simplification, the liquid crystal molecules located near the side slopes of the groove structure 16a are aligned to tilt toward the centerline of the groove structure 16a with the alignment regulating force of the side slopes of the groove structure 16a. Since the vertical alignment film 12 is formed to cover the groove structure 16a, the liquid crystal molecules 21 are regulated to align vertical to the side slope face of the groove structure 16a. The liquid crystal molecules 21 located near the opening 15 are also regulated with the alignment regulating force of steps formed in correspondence with the opening 15 (steps formed on the surface of the alignment film 12), to tilt slightly toward the opening 15.

As shown in FIG. 20B, during voltage application, the liquid crystal molecules 21 having negative dielectric anisotropy attempt to make their major axes vertical to the electric line of force, and thus the directions in which the liquid crystal molecules 21 fall are defined with a tilt electric field generated around the opening 15. Therefore, for example, the liquid crystal molecules 21 are aligned axisymmetrically around the opening 15 as the center. In the thus-formed axisymmetrically aligned domain, liquid crystal directors are aligned in all directions (directions in the substrate plane), and thus, excellent viewing angle characteristics can be obtained. At this time, the liquid crystal molecules 21 located in and near the groove structure 16a tilt toward the liquid crystal molecules 21 located above the centerline of the groove structure 16a that are aligned vertical to the substrate surface. The directions of the tilt of the liquid crystal molecules 21 shown in FIG. 20B are the same as the tilt directions defined with the alignment regulating force of the side slopes of the groove structure 16a and the steps corresponding to the opening 15 during non-voltage application.

Although the action of the tilt electric field generated around the opening 15 was referred to in the above description, a tilt electric field is also generated around a cut formed at an edge of the pixel electrode 6, and the directions of tilt of the liquid crystal molecules 21 are defined with this tilt electric field.

The LCD device of Embodiment 2 of the present invention can also have the concrete construction shown in FIG. 11. In this embodiment, as the liquid crystal panel 50, a liquid crystal panel having the same construction as that of the LCD device 500 shown in FIGS. 15A and 15B may be used.

Hereinafter, a specific example of Embodiment 2 of the present invention will be described.

EXAMPLE 3

Figure 18:
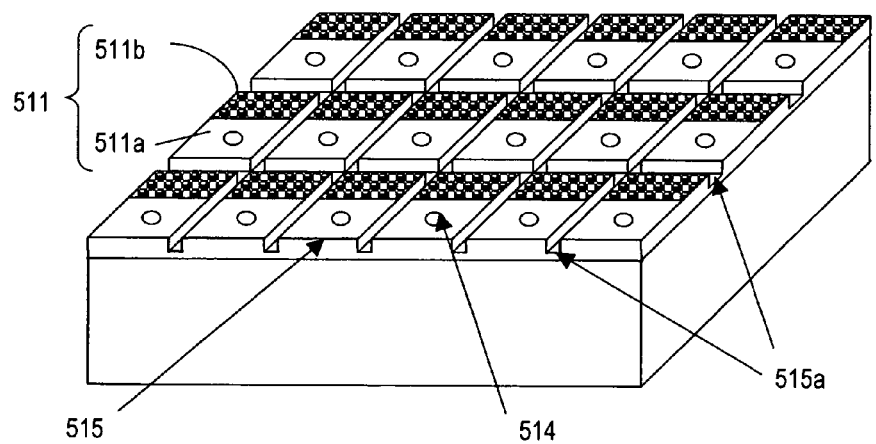
FIG. 18 is a perspective view diagrammatically showing an example of the entire arrangement of a groove structure in a display region of a transflective LCD device of Embodiment 2 of the present invention.

An LCD device was fabricated using an active matrix substrate having the construction shown in FIG. 18 and a color filter substrate having a color filter layer, transparent dielectric layers 534 and a counter electrode placed to face the active matrix substrate.

In the active matrix substrate in this example, the interlayer insulating film having the groove structure was formed in the process described above under the following exposure conditions.

The first exposure step for forming the uneven shape and the groove structure on a positive photosensitive resin film was executed under a low exposure condition (80 mJ/cm$^2$) using the first photomask 52. The second exposure step for forming the contact holes was executed under a high exposure condition (350 mJ/cm$^2$) using the second photomask 62. Thereafter, the series of steps described above were executed to obtain the active matrix substrate in this example.

In the color filter substrate, the transparent dielectric layers were formed to give steps in the reflection regions. Supports (dielectric) for defining the thickness of the liquid crystal layer were formed in the shading region outside the pixels used for display.

The vertical alignment films were formed on the active matrix substrate and the color filter substrate under predetermined conditions (no rubbing was made). The two substrates were then bonded together via a sealing resin, and a liquid crystal material having negative dielectric anisotropy (refractive index anisotropy $\Delta n$: 0.1, dielectric constant anisotropy $\Delta\in$: −4.5) was injected and sealed in the space between the substrates, to obtain a liquid crystal display panel. In this example, the thickness dt of the liquid crystal layer in the transmission regions was 4 μm, and the thickness dr thereof in the reflection regions was 2.1 μm.

Optical films were then placed on both surfaces of the liquid crystal display panel in the manner described below, to obtain an LCD device.

The LCD device of this example had a multilayer structure composed of a polarizing plate (observer side), a quarter wave plate (phase plate 1), a phase plate having negative optical anisotropy (phase plate 2 (NR plate)), the liquid crystal layer (on the upper and lower sides thereof, the color filter substrate and the active matrix substrate were respectively placed), a phase plate having negative optical anisotropy (phase plate 3 (NR plate)), a quarter wave plate (phase plate 4), and a polarizing plate (backlight side) in the order from the observer side. The upper and lower quarter wave plates (phase plates 1 and 4) were placed so that the slower axes thereof were orthogonal to each other, and had a phase difference of 140 nm. The phase plates having negative optical anisotropy (phase plates 2 and 3) had a phase difference of 135 nm. The two polarizing plates were placed so that the absorption axes thereof were orthogonal to each other.

A drive signal was applied to the thus-obtained LCD device (4V was applied across the liquid crystal layer) to evaluate the display characteristics.

The resultant visual angle-contrast characteristics in the transmission display were as shown in FIG. 12 as in Embodiment 1. The viewing angle characteristics in the transparent display were roughly symmetric in all directions, the range of CR>10 was as large as up to ±80°, and the transmission contrast was as high as 300:1 or more at the front.

As for the characteristics of the reflection display, the reflectance evaluated with a spectral colorimeter (CM2002 from Minolta Co., Ltd.) was about 8.6% (value in terms of the aperture ratio of 100%) with respect to a standard diffuse plate as the reference. The contrast value of the reflection display was 21, indicating that the contrast was high compared with the case of the conventional LCD devices.

Comparative Example 2

An ECB mode homogeneously aligned liquid crystal display panel having substantially the same construction as the liquid crystal panel of Example 3 was fabricated. The liquid crystal panel of Comparative Example 2 has neither a groove structure nor openings/cuts of the pixel electrodes. Also, in the liquid crystal panel of Comparative Example 2, horizontal alignment films were formed in place of the vertical alignment films in the liquid crystal panel of Example 3, and a liquid crystal material having positive dielectric anisotropy ($\Delta n$: 0.07, $\Delta \in$: 8.5) was injected in the liquid crystal layer to form a homogeneously aligned liquid crystal layer. The thickness dt of the liquid crystal layer in the transmission regions was 4.3 μm, and the thickness dr thereof in the reflection regions was 2.3 μm.

Optical films each formed of a plurality of optical layers including a polarizing plate and a phase plate such as a quarter wave plate were placed on both surfaces of the liquid crystal display panel, to obtain an LCD device of Comparative Example 2.

A drive signal was applied to the LCD device of Comparative Example 2 (4V was applied across the liquid crystal layer) to evaluate the display characteristics by the same evaluation method as that described in Example 3.

As the viewing angle characteristics in the transmission display, the range of CR>10 was up to ±30°, and reverse gradation was eminent. The transmission contrast was 140:1. As for the characteristics of the reflection display, the reflectance was about 9.3% (value in terms of the aperture ratio of 100%) with respect to a standard diffuse plate as the reference. The contrast value of the reflection display was 8, and the display image was white-blurred and low in contrast compared with Example 3 of the vertical alignment mode.

As described above, in the LCD devices of Embodiment 2 of the present invention, in which the vertical alignment mode is applied to transmission display and reflection display, a good contrast ratio can be obtained both in the transmission display and the reflection display, compared with the conventional homogeneously aligned LCD devices and the conventionally known technologies.

In addition, in Embodiment 2 of the present invention, the alignment regulating structure for liquid crystal domains (the groove structure and openings and/or cuts) is placed only on one substrate (in the illustrated examples, the active matrix substrate). Moreover, the groove structure can be formed on the interlayer insulating film in a series of steps combined with the formation of fine projections and depressions in the reflection portions and the formation of the contact holes, and this simplifies the fabrication process. With the alignment regulating force of the groove structure and the openings and/or cuts, the directions in which liquid crystal molecules fall during voltage application can be regulated in a non-rubbing process. As exemplified in Embodiment 2 of the present invention, by providing the alignment regulating structure for liquid crystal domains, a plurality of liquid crystal domains each exhibiting axisymmetric alignment during voltage application are formed for each pixel, and thus all-direction wide viewing angle characteristics can be attained.

Naturally, substantially the same effect can be obtained by using both the wall structure in Embodiment 1 and the groove structure in Embodiment 2.

As described above, according to the present invention, an LCD device of excellent display quality can be implemented with a comparatively simple construction. The present invention is suitably applied to transmissive LCD devices and transflective (transmissive/reflective) LCD devices. In particular, transflective LCD devices are suitably used as display devices for mobile equipment such as mobile phones.

While the present invention has been described in preferred embodiments, it will be apparent to those skilled in the art that the disclosed invention may be modified in numerous ways and may assume many embodiments other than that specifically set out and described above. Accordingly, it is intended by the appended claims to cover all modifications of the invention that fall within the true spirit and scope of the invention.

This non-provisional application claims priority under 35 USC §119(a) on Patent Applications No. 2003-379078 filed in Japan on Nov. 7, 2003, No. 2003-405225 filed in Japan on Dec. 3, 2003 and No. 2004-077503 filed in Japan on Mar. 8, 2004, the entire contents of which are hereby incorporated by reference.

What is claimed is:

1. A liquid crystal display device comprising
a first substrate, a second substrate placed to face the first substrate, a liquid crystal layer interposed between the first substrate and the second substrate, a first electrode formed on the first substrate, a second electrode formed on the second substrate, an interlayer insulating film placed between the first electrode and the first substrate, and a wall structure formed integrally with the interlayer insulating film,
wherein the liquid crystal display device has a plurality of pixels each including the first electrode, the second electrode and the liquid crystal layer interposed between the first electrode and the second electrode, a shading region is provided to surround each of the plurality of pixels, and the wall structure is placed regularly in the shading region,
wherein the interlayer insulating film and the wall structure are formed of a single photosensitive resin film; and
wherein the wall structure surrounds at least one of the pixels.

2. The liquid crystal display device of claim 1, further comprising a plurality of switching elements formed on the first substrate, each of the switching elements being electrically connected to the first electrode, wherein at least part of each of the switching elements is covered with the interlayer insulating film.

3. The liquid crystal display device of claim 1, wherein the first electrode included in each of the plurality of pixels includes a transparent electrode and a reflective electrode.

4. The liquid crystal display device of claim 1, wherein the wall structure has an inclined side face, and the first electrode extends up to on the side face.

5. The liquid crystal display device of claim 1, wherein the liquid crystal layer is a vertically aligned liquid crystal layer, and when at least a predetermined voltage is applied, at least one liquid crystal domain including liquid crystal molecules aligned in different directions is formed in the liquid crystal layer of each pixel.

6. The liquid crystal display device of claim 1, wherein the first electrode and/or the second electrode of each pixel have a plurality of openings and/or cuts formed at predetermined positions.

7. The liquid crystal display device of claim 6, wherein the first electrode and/or the second electrode of each pixel have at least two openings and at least one cut formed at predetermined positions.

8. The liquid crystal display device of claim 6, wherein the plurality of openings and/or cuts are formed in only the first electrode.

9. The liquid crystal display device of claim 6, wherein the liquid crystal layer is a vertically aligned liquid crystal layer, at least two liquid crystal domains each having axisymmetric alignment are formed in the liquid crystal layer of each pixel when at least a predetermined voltage is applied, and the center axes of the axisymmetric alignment of the at least two liquid crystal domains are formed in or near the plurality of openings.

10. The liquid crystal display device of claim 1, wherein the wall structure has walls isolated from each other with a wall gap.

11. The liquid crystal display device of claim 10, wherein the length of the wall gap existing along the circumference of one pixel is 40% or less of the length of the circumference of the pixel.

12. The liquid crystal display device of claim 1, wherein supports for defining the thickness of the liquid crystal layer are placed regularly in the shading region.

13. The liquid crystal display device of claim 12, wherein the wall structure has walls isolated from each other with wall gaps, and the supports are placed in the wall gaps.

14. The liquid crystal display device of claim 12, wherein a placement density D defined by WL×N/PL, where WL (μm) is the diameter of the supports, N (pcs.) is the number of supports placed per regular unit (0.12 mm²), and PL (μm) is the pitch of the plurality of pixels in the longitudinal direction, satisfies the relationship $0.01 \leq D \leq 0.3$.

15. The liquid crystal display device of claim 1, wherein the liquid crystal layer is a vertically aligned liquid crystal layer, and at least when a predetermined voltage is applied, at least one liquid crystal domain having axisymmetric alignment is formed in the liquid crystal layer of each pixel, and the wall structure has an inclined side face, and the cross section of the wall structure and the interlayer insulating film in the plane vertical to the first substrate gives a continuous shape having its bottom in a region in which the center axis of axisymmetric alignment of the at least one liquid crystal domain is formed.

16. The liquid crystal display device of claim 1, wherein the wall structure has an inclined side face, and the tilt angle of the inclined side face with respect to the surface of the first substrate is 45° or less.

17. The liquid crystal display device of claim 1, further comprising: a pair of polarizing plates placed to face each other via the first substrate and the second substrate; and at least one biaxial optical anisotropic medium layer placed between the first substrate and/or the second substrate and the pair of polarizing plates.

18. The liquid crystal display device of claim 1, further comprising: a pair of polarizing plates placed to face each other via the first substrate and the second substrate; and at least one uniaxial optical anisotropic medium layer placed between the first substrate and one of the pair of polarizing plates and/or between the second substrate and the other polarizing plate.

19. A liquid crystal display device comprising a first substrate, a second substrate placed to face the first substrate, a liquid crystal layer interposed between the first substrate and the second substrate, a first electrode formed on the first substrate, a second electrode formed on the second substrate, and an interlayer insulating film placed between the first electrode and the first substrate, the interlayer insulating film having a groove structure, wherein the liquid crystal display device has a plurality of pixels each including the first electrode, the second electrode and the liquid crystal layer interposed between the first electrode and the second electrode, a shading region is provided to surround each of the plurality of pixels, and the groove structure is formed regularly at least in the shading region, wherein the liquid crystal layer is a vertically aligned type liquid crystal layer, and when at least a predetermined voltage is applied at least one liquid crystal domain including liquid crystal molecules aligned in different directions is formed in the liquid crystal layer of each pixel, and wherein the groove structure defines a boundary of the at least one liquid crystal domain located near an outer edge of each pixel, and wherein the groove structure is formed along all sides of each of a plurality of the pixels.

20. The liquid crystal display device of claim 19, further comprising a plurality of switching elements formed on the first substrate, each of the switching elements being electrically connected to the first electrode, wherein at least part of each of the switching elements is covered with the interlayer insulating film.

21. The liquid crystal display device of claim 19, wherein the first electrode and/or the second electrode of each pixel have a plurality of openings and/or cuts formed at predetermined positions.

22. The liquid crystal display device of claim 21, wherein the first electrode and/or the second electrode of each pixel have at least two openings and at least one cut formed at predetermined positions.

23. The liquid crystal display device of claim 21, wherein the plurality of openings and/or cuts are formed in only the first electrode.

24. The liquid crystal display device of claim 21, wherein at least two liquid crystal domains each having axisymmetric alignment are formed in the liquid crystal layer of each pixel at least when a predetermined voltage is applied, and the center axes of the axisymmetric alignment of the at least two liquid crystal domains are formed in or near the plurality of openings.

25. The liquid crystal display device of claim 19, wherein at least two liquid crystal domains each having axisymmetric alignment are formed in the liquid crystal layer of each pixel at least when a predetermined voltage is applied, and the groove structure is also formed along the boundary between a pair of adjacent liquid crystal domains among the at least two liquid crystal domains.

26. The liquid crystal display device of claim 25, wherein an additional shading region is formed in each of the plurality of pixels, and the groove structure formed along the boundary is in the additional shading region.

27. The liquid crystal display device of claim 19, wherein the first electrode in each of the plurality of pixels includes a transparent electrode defining a transmission region and a reflective electrode defining a reflection region.

28. The liquid crystal display device of claim 27, wherein the groove structure is also formed along the boundary between the transmission region and the reflection region.

29. The liquid crystal display device of claim 19, further comprising: a pair of polarizing plates placed to face each other via the first substrate and the second substrate; and at least one biaxial optical anisotropic medium layer placed between the first substrate and one of the pair of polarizing plates and/or between the second substrate and the other polarizing plate.

30. The liquid crystal display device of claim 19, further comprising: a pair of polarizing plates placed to face each other via the first substrate and the second substrate; and at least one uniaxial optical anisotropic medium layer placed between the first substrate and one of the pair of polarizing plates and/or between the second substrate and the other polarizing plate.

31. A liquid crystal display device comprising
a first substrate, a second substrate placed to face the first substrate, a liquid crystal layer interposed between the first substrate and the second substrate, a first electrode formed on the first substrate, a second electrode formed on the second substrate, and an interlayer insulating film placed between the first electrode and the first substrate, the interlayer insulating film having a groove structure,
wherein the liquid crystal display device has a plurality of pixels each including the first electrode, the second electrode and the liquid crystal layer interposed between the first electrode and the second electrode, a shading region is provided to surround each of the plurality of pixels, and the groove structure is formed regularly at least in the shading region,
wherein the liquid crystal layer is a vertically aligned type liquid crystal layer, and when at least a predetermined voltage is applied at least one liquid crystal domain including liquid crystal molecules aligned in different directions is formed in the liquid crystal layer of each pixel,
wherein the groove structure defines a boundary of the at least one liquid crystal domain located near an outer edge of each pixel, and wherein the grooves surround the pixels, and
wherein a support structure extending between the substrates is provided in at least part of the groove.

* * * * *